(12) United States Patent
Allen et al.

(10) Patent No.: US 10,973,321 B2
(45) Date of Patent: Apr. 13, 2021

(54) WORKSPACE SYSTEM AND COMPONENTS AND METHOD FOR THE USE THEREOF

(71) Applicant: Steelcase Inc., Grand Rapids, MI (US)

(72) Inventors: John A. Allen, Grand Rapids, MI (US); Charles Beasley, Zeeland, MI (US); William Bennie, Rockford, MI (US); Justin G. Beitzel, Baltimore, MD (US); Antonio Caballero, Munich (DE); Rachel Dekker, Grandville, MI (US); Sean M. Derrick, Kalamazoo, MI (US); Kristi Hooper, Alto, MI (US); Brandon Johnson, Bryon Center, MI (US); Daniel Perez Marin, Munich (DE); Alban Moriniere, Munich (DE); Jessica Napper, Munich (DE); Eric A. Otto, Grand Rapids, MI (US); Penghao Shan, Munich (DE); Thomas Siffer, Munich (DE)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 16/560,469

(22) Filed: Sep. 4, 2019

(65) Prior Publication Data
US 2020/0069052 A1 Mar. 5, 2020

Related U.S. Application Data

(60) Provisional application No. 62/726,775, filed on Sep. 4, 2018.

(51) Int. Cl.
*A47B 83/00* (2006.01)
*A47B 87/00* (2006.01)
(Continued)

(52) U.S. Cl.
CPC ............ *A47B 83/001* (2013.01); *A47B 21/02* (2013.01); *A47B 21/04* (2013.01); *A47B 21/06* (2013.01);
(Continued)

(58) Field of Classification Search
CPC ............ A47B 21/00; A47B 2200/0066; A47B 2200/008; A47B 2021/0076;
(Continued)

(56) References Cited

U.S. PATENT DOCUMENTS

| 90,588 A | 5/1869 | Rutschman |
|---|---|---|
| 145,145 A | 12/1873 | Baggs |

(Continued)

FOREIGN PATENT DOCUMENTS

| AT | 517838 A4 | 5/2017 |
|---|---|---|
| BE | 525113 | 1/1954 |

(Continued)

OTHER PUBLICATIONS ezoBord, "Curved Desk Screen Installation Guide", located on the Internet at: http://www.ezobord.com/products-amphi-curved-screen.html, publically available prior to Sep. 14, 2018, 3 pgs.

(Continued)

*Primary Examiner* — Jose V Chen
(74) *Attorney, Agent, or Firm* — Brinks Gilson & Lione

(57) ABSTRACT

A workspace system includes different base components, different accessory interfaces and different accessories. Different accessory interfaces may be fixed to different base components, and different accessories may be releasably engaged by different, or the same accessory interfaces. The same accessories may be engaged by different accessory interfaces. The base components and accessories may be (Continued)

reconfigured to define different workspaces. Methods of assembling and reconfiguring the workspaces are also provided.

24 Claims, 40 Drawing Sheets

(51) Int. Cl.
| | |
|---|---|
| *A47B 21/06* | (2006.01) |
| *A47B 21/02* | (2006.01) |
| *A47B 21/04* | (2006.01) |
| *B62B 3/00* | (2006.01) |

(52) U.S. Cl.
CPC ...... *A47B 87/002* (2013.01); *A47B 2021/066* (2013.01); *A47B 2083/006* (2013.01); *A47B 2200/12* (2013.01); *B62B 3/005* (2013.01)

(58) Field of Classification Search
CPC . A47B 83/001; A47B 21/04; A47B 2021/066; A47B 2083/006; A47B 2200/12; B62B 3/005
USPC ...... 108/50.01, 50.02, 64; 312/223.3, 223.2; 52/36.1
See application file for complete search history.

(56) References Cited

U.S. PATENT DOCUMENTS

| | | | |
|---|---|---|---|
| 396,459 A | 1/1889 | Bertrand | |
| 756,922 A | 4/1904 | Willets | |
| 1,019,302 A | 3/1912 | Butcher | |
| 1,059,764 A | 4/1913 | Ringer | |
| 1,207,778 A | 12/1916 | McMaster | |
| 1,425,582 A | 8/1922 | Feigler | |
| 1,940,117 A | 12/1933 | Carpos | |
| 2,347,821 A | 5/1944 | Goldner | |
| D166,048 S | 8/1949 | Turulis | |
| 2,562,426 A | 7/1951 | Hunter | |
| 2,574,330 A | 11/1951 | Judd | |
| 2,638,375 A | 5/1953 | Jewell | |
| 2,650,795 A | 9/1953 | Bell | |
| 2,744,346 A | 5/1956 | Auerbach-Levy | |
| 2,798,327 A | 7/1957 | Dibb | |
| 2,838,351 A | 6/1958 | Siconolfi et al. | |
| 2,981,578 A | 4/1961 | Saarinen | |
| 3,100,459 A | 8/1963 | Liss et al. | |
| 3,117,533 A | 1/1964 | Martland | |
| 3,146,502 A | 9/1964 | Reiss, Sr. et al. | |
| 2,733,785 A | 2/1965 | Beatty | |
| 3,182,613 A | 5/1965 | Hagan | |
| 3,192,099 A | 6/1965 | Beckman et al. | |
| 3,223,467 A | 12/1965 | Jafelice | |
| 3,327,656 A | 6/1967 | Schwartz | |
| 3,571,999 A | 3/1971 | Downing | |
| 3,665,629 A | 5/1972 | Shore | |
| 3,669,227 A | 6/1972 | Alford | |
| 3,705,556 A | 12/1972 | Kelly | |
| 3,722,026 A | 3/1973 | Wilhelmi | |
| 3,971,327 A | 7/1976 | Critchett | |
| 3,977,048 A | 8/1976 | Benedetti | |
| 4,068,440 A | 1/1978 | Lillethorup | |
| D249,300 S | 9/1978 | Szabo et al. | |
| D270,391 S | 8/1983 | Berquist et al. | |
| 4,400,032 A | 8/1983 | dePolo | |
| 4,402,118 A | 8/1983 | Benedetti | |
| D272,286 S | 1/1984 | Sroub | |
| D273,337 S | 4/1984 | Semerjian et al. | |
| 4,480,715 A | 11/1984 | Brooks | |
| 4,505,501 A | 3/1985 | Fuchs et al. | |
| 4,528,914 A | 7/1985 | Montet | |
| 4,571,907 A * | 2/1986 | DeFouw | A47B 83/001 52/239 |
| D283,856 S | 5/1986 | Elmaleh | |
| 4,606,394 A | 8/1986 | Bannister | |
| D285,853 S | 9/1986 | Hubert | |
| 4,623,111 A | 11/1986 | Prader | |
| 4,635,418 A | 1/1987 | Hobgood | |
| 4,635,613 A | 1/1987 | Tucker et al. | |
| 4,644,612 A | 2/1987 | Osterland | |
| D288,880 S | 3/1987 | Favaretto et al. | |
| D291,851 S | 9/1987 | Salvato | |
| 4,723,743 A | 2/1988 | Jenkins et al. | |
| 4,752,986 A | 6/1988 | Rivkin et al. | |
| 4,821,787 A | 4/1989 | Swanson | |
| D301,652 S | 6/1989 | Roberts | |
| D302,062 S | 7/1989 | Sable | |
| 4,865,505 A | 9/1989 | Okada | |
| D304,111 S | 10/1989 | Mehalick | |
| 4,884,988 A | 12/1989 | McMurray | |
| 4,914,873 A * | 4/1990 | Newhouse | A47B 13/003 312/198 |
| D311,104 S | 10/1990 | Smith et al. | |
| D311,802 S | 10/1990 | Getto | |
| D313,878 S | 1/1991 | Rinkewich | |
| 5,007,473 A | 4/1991 | Evensen | |
| 5,037,164 A * | 8/1991 | Weissenbach | H02B 1/04 108/50.02 |
| D323,252 S | 1/1992 | Anske | |
| 5,078,055 A | 1/1992 | Bellini et al. | |
| 5,125,202 A | 6/1992 | Kissinger | |
| D330,651 S | 11/1992 | Battaglia | |
| D333,895 S | 3/1993 | Niemeyer | |
| D335,889 S | 5/1993 | Gibran | |
| D342,843 S | 1/1994 | Kuntz | |
| D344,746 S | 3/1994 | Yomo | |
| D345,472 S | 3/1994 | Sheftel | |
| 5,291,700 A | 3/1994 | Chew | |
| D345,839 S | 4/1994 | Senese | |
| 5,353,716 A | 10/1994 | Wilbert | |
| 5,355,651 A | 10/1994 | Correia | |
| D352,585 S | 11/1994 | Binning | |
| D353,927 S | 12/1994 | Maddux | |
| D354,186 S | 1/1995 | Grosfillex | |
| 5,379,537 A | 1/1995 | Roy | |
| 5,384,935 A | 1/1995 | Maier-Hunke et al. | |
| 5,386,364 A | 1/1995 | Tyler | |
| D357,102 S | 4/1995 | Tate | |
| D357,605 S | 4/1995 | Kellen | |
| D360,725 S | 7/1995 | Snell | |
| 5,433,409 A | 7/1995 | Knopp | |
| D360,781 S | 8/1995 | Hill et al. | |
| D361,188 S | 8/1995 | Perelli | |
| D361,419 S | 8/1995 | Snell | |
| D361,422 S | 8/1995 | Coates | |
| D363,590 S | 10/1995 | Kazmerchek et al. | |
| D364,287 S | 11/1995 | Jurasinski | |
| D371,879 S | 7/1996 | Linder | |
| 5,567,074 A | 10/1996 | Dovak et al. | |
| D376,935 S | 12/1996 | Nourse | |
| 5,636,408 A | 6/1997 | Dichtel | |
| 5,638,758 A | 6/1997 | Carr | |
| D381,168 S | 7/1997 | Delmerico et al. | |
| D386,870 S | 11/1997 | Halvorson, Jr. et al. | |
| D387,585 S | 12/1997 | Shields | |
| 5,704,298 A * | 1/1998 | Corpuz, Jr. | A47B 17/065 108/50.01 |
| D391,031 S | 2/1998 | Egan et al. | |
| 5,743,193 A | 4/1998 | Kakuta et al. | |
| 5,774,949 A | 7/1998 | Cornell et al. | |
| D399,625 S | 10/1998 | Murphy et al. | |
| D400,334 S | 10/1998 | Hawkins | |
| D400,676 S | 11/1998 | Good | |
| D405,580 S | 2/1999 | Vanderminden | |
| 5,878,673 A * | 3/1999 | Kramer | A47B 87/002 108/50.02 |
| 5,890,325 A * | 4/1999 | Corcorran | A47B 21/00 52/36.1 |
| 5,890,782 A | 4/1999 | Alberts | |
| 5,896,710 A | 4/1999 | Hoyle | |
| D409,019 S | 5/1999 | Crinion | |

(56) References Cited

U.S. PATENT DOCUMENTS

| | | | |
|---|---|---|---|
| 5,899,025 A * | | 5/1999 | Casey .................. E04B 2/7453 108/50.02 |
| 5,901,513 A * | | 5/1999 | Mollenkopf .......... A47B 21/06 108/182 |
| D410,578 S | | 6/1999 | Tisbo et al. |
| D411,045 S | | 6/1999 | Morandi |
| 5,980,002 A | | 6/1999 | Alexander et al. |
| 5,988,076 A * | | 11/1999 | Vander Park .......... A47B 21/06 108/50.02 |
| 6,053,461 A | | 4/2000 | Goss |
| D425,280 S | | 5/2000 | vom Braucke |
| 6,074,150 A | | 6/2000 | Shinozaki et al. |
| D427,783 S | | 7/2000 | Luedke |
| 6,125,567 A | | 10/2000 | Roy |
| 6,145,448 A | | 11/2000 | Marschand et al. |
| D436,270 S | | 1/2001 | Kane |
| 6,170,410 B1 | | 1/2001 | Gioacchini et al. |
| D440,370 S | | 4/2001 | Keshishian |
| 6,213,191 B1 | | 4/2001 | Nitzsche |
| 6,220,186 B1 * | | 4/2001 | Scharer ................ A47B 83/001 108/153.1 |
| D444,001 S | | 6/2001 | Minami |
| D445,229 S | | 7/2001 | Stravitz et al. |
| D445,984 S | | 7/2001 | Dickinson et al. |
| D446,376 S | | 8/2001 | Vanderbyl |
| D447,649 S | | 9/2001 | Mason |
| D447,888 S | | 9/2001 | Chao |
| D447,893 S | | 9/2001 | Simonelli et al. |
| 6,308,763 B1 | | 10/2001 | Moeckl |
| 6,327,758 B1 | | 12/2001 | Petrakis et al. |
| D459,623 S | | 7/2002 | Tramontina |
| 6,418,566 B1 | | 7/2002 | Auer |
| 6,435,468 B1 | | 8/2002 | Simchoni |
| D462,196 S | | 9/2002 | Holub et al. |
| 6,448,498 B1 * | | 9/2002 | King ...................... A47B 21/06 108/50.02 |
| D465,102 S | | 11/2002 | Seiffarth |
| D469,591 S | | 1/2003 | Vanderminden |
| D470,344 S | | 2/2003 | Stanton |
| D472,027 S | | 3/2003 | Walter |
| 6,553,724 B1 | | 4/2003 | Bigler |
| 6,568,031 B1 | | 5/2003 | Polevoy et al. |
| D478,199 S | | 8/2003 | Presnell et al. |
| 6,619,610 B1 | | 9/2003 | Genovese |
| 6,622,771 B2 | | 9/2003 | Plockmeyer |
| D480,527 S | | 10/2003 | Kollen |
| D481,188 S | | 10/2003 | DiGiacomo, Jr. et al. |
| 6,662,731 B2 | | 12/2003 | Teppo et al. |
| 6,665,914 B2 | | 12/2003 | Ogawa |
| D485,410 S | | 1/2004 | Van Landingham, Jr. et al. |
| D486,618 S | | 2/2004 | Crosco, Sr. |
| D487,605 S | | 3/2004 | Laverdière |
| D492,076 S | | 6/2004 | Kollen |
| 6,749,480 B1 | | 6/2004 | Hunts |
| 6,769,747 B2 | | 8/2004 | Chan et al. |
| D495,536 S | | 9/2004 | Lucht |
| D497,232 S | | 10/2004 | McDiarmid |
| 6,820,847 B2 | | 11/2004 | Camarota et al. |
| D499,273 S | | 12/2004 | Chang |
| D501,336 S | | 2/2005 | Lin |
| D502,786 S | | 3/2005 | Cheung |
| D504,000 S | | 4/2005 | Underbrink et al. |
| 6,918,162 B2 | | 7/2005 | Bodo |
| 6,928,705 B2 | | 8/2005 | Osterland et al. |
| 7,032,523 B2 | | 4/2006 | Forslund, III et al. |
| D521,279 S | | 5/2006 | Bouroullec et al. |
| 7,051,408 B2 | | 5/2006 | De Azevedo et al. |
| 7,053,148 B2 | | 5/2006 | Dirschl et al. |
| D523,202 S | | 6/2006 | Willison |
| D523,607 S | | 6/2006 | Huguet |
| D525,794 S | | 8/2006 | Ball et al. |
| D527,856 S | | 9/2006 | Tropepe |
| D530,876 S | | 10/2006 | Wyse |
| D531,839 S | | 11/2006 | Lade |
| 7,154,363 B2 | | 12/2006 | Hunts |
| 7,216,381 B1 | | 5/2007 | Setzer |
| 7,272,903 B2 | | 9/2007 | Roy |
| D554,323 S | | 10/2007 | Roth |
| D581,705 S | | 12/2008 | Li |
| D585,621 S | | 1/2009 | Taillon |
| D588,322 S | | 3/2009 | Tilk et al. |
| D589,671 S | | 3/2009 | Rolim De Oliveira et al. |
| 7,506,414 B2 | | 3/2009 | Dubost et al. |
| D593,778 S | | 6/2009 | Muhich |
| D598,623 S | | 8/2009 | Zang Wentz Pho et al. |
| 7,628,360 B2 | | 12/2009 | Anthes et al. |
| D608,071 S | | 1/2010 | Presnell |
| 7,641,962 B2 | | 1/2010 | Sutton |
| D611,737 S | | 3/2010 | Miller et al. |
| D613,096 S | | 4/2010 | Stoepker |
| 7,690,158 B2 | | 4/2010 | Kelly |
| D616,551 S | | 5/2010 | Fallon et al. |
| 7,730,695 B2 | | 6/2010 | Brady |
| 7,789,025 B2 | | 9/2010 | Michaud, II et al. |
| 7,827,920 B2 * | | 11/2010 | Beck ...................... A47B 83/001 108/50.02 |
| 7,843,297 B2 | | 11/2010 | Fullerton et al. |
| 7,849,657 B2 | | 12/2010 | Schnepf et al. |
| 7,862,341 B2 | | 1/2011 | Durand et al. |
| 7,913,459 B2 * | | 3/2011 | Ball ...................... E04B 2/7425 52/36.1 |
| D636,550 S | | 4/2011 | Molayem |
| D642,828 S | | 8/2011 | Unterrainer et al. |
| D644,857 S | | 9/2011 | Unterrainer et al. |
| D648,960 S | | 11/2011 | Starck et al. |
| D650,613 S | | 12/2011 | Starck |
| D651,028 S | | 12/2011 | Grimaldi |
| D656,345 S | | 3/2012 | Grimaldi |
| D657,110 S | | 4/2012 | Schlomann |
| D668,464 S | | 10/2012 | Du |
| 8,281,544 B2 | | 10/2012 | Brady |
| D671,339 S | | 11/2012 | Nakamura |
| D671,772 S | | 12/2012 | Lee et al. |
| 8,339,226 B2 | | 12/2012 | Fullerton et al. |
| D675,394 S | | 1/2013 | Pedersen |
| 8,370,999 B2 | | 2/2013 | Camus |
| D678,641 S | | 3/2013 | Es |
| D683,168 S | | 5/2013 | Abel et al. |
| 8,458,863 B2 | | 6/2013 | Hunts |
| 8,458,937 B2 | | 6/2013 | Fritsche et al. |
| 8,550,014 B1 | | 10/2013 | Mariani |
| 8,561,666 B2 | | 10/2013 | MacAllen et al. |
| D697,684 S | | 1/2014 | Tiilikainen |
| D703,412 S | | 4/2014 | Snider et al. |
| 8,684,327 B2 | | 4/2014 | Caswell |
| 8,875,348 B2 | | 11/2014 | Kossett |
| D722,413 S | | 2/2015 | Crow |
| 8,973,645 B1 | | 3/2015 | Cannova |
| D741,073 S | | 10/2015 | Keen et al. |
| 9,194,121 B2 | | 11/2015 | Gosling et al. |
| 9,211,015 B2 | | 12/2015 | Larzelere |
| D747,837 S | | 1/2016 | Chang |
| D748,359 S | | 1/2016 | Lustig et al. |
| D750,861 S | | 3/2016 | Alletto, Jr. |
| 9,227,813 B2 | | 3/2016 | Nelson et al. |
| 9,309,670 B2 | | 4/2016 | Reinecke |
| 9,339,229 B2 | | 5/2016 | Taylor |
| D758,776 S | | 6/2016 | McKenna et al. |
| D758,777 S | | 6/2016 | McKenna et al. |
| D772,620 S | | 11/2016 | Dahlstrom et al. |
| 9,494,258 B2 | | 11/2016 | Flynn |
| D779,238 S | | 2/2017 | Kamata |
| 9,683,386 B1 | | 6/2017 | Morrison |
| D794,273 S | | 8/2017 | Abel et al. |
| 9,728,110 B2 | | 8/2017 | Taylor et al. |
| 9,737,142 B2 | | 8/2017 | Cho |
| D798,520 S | | 9/2017 | Walter et al. |
| 9,797,134 B2 | | 10/2017 | MacAllen et al. |
| 9,840,840 B2 | | 12/2017 | Plikat et al. |
| D808,183 S | | 1/2018 | Ono |
| D809,730 S | | 2/2018 | Churchvara et al. |
| D810,380 S | | 2/2018 | Sommerfield et al. |
| D814,735 S | | 4/2018 | Rockwell et al. |

(56) References Cited

U.S. PATENT DOCUMENTS

| | | | |
|---|---|---|---|
| 2002/0040668 A1* | 4/2002 | Pang Chan | A47B 17/003 108/157.1 |
| 2002/0043183 A1* | 4/2002 | Insalaco | A47B 21/06 108/50.02 |
| 2002/0062933 A1 | 5/2002 | Insalaco et al. | |
| 2002/0129746 A1* | 9/2002 | Donnelly | A47B 21/00 108/25 |
| 2004/0011930 A1 | 1/2004 | Toyhy, III et al. | |
| 2005/0051682 A1 | 3/2005 | Touhy et al. | |
| 2005/0126446 A1 | 6/2005 | Nobles et al. | |
| 2005/0186021 A1 | 8/2005 | Savas | |
| 2006/0254471 A1 | 11/2006 | Luchetti et al. | |
| 2006/0283112 A1 | 12/2006 | Militzer | |
| 2008/0040982 A1* | 2/2008 | Durand | A47B 83/001 52/36.1 |
| 2008/0042528 A1 | 2/2008 | Durand et al. | |
| 2008/0116346 A1 | 5/2008 | McCarthy | |
| 2008/0134601 A1 | 6/2008 | Cruz | |
| 2009/0293773 A1* | 12/2009 | Miller | A47B 21/00 108/28 |
| 2009/0310291 A1* | 12/2009 | Willburn | A47B 21/06 361/679.22 |
| 2010/0196686 A1 | 8/2010 | Van Dam | |
| 2010/0226709 A1 | 9/2010 | Gosling et al. | |
| 2012/0112475 A1 | 5/2012 | Francois et al. | |
| 2013/0011170 A1 | 1/2013 | Tachibana et al. | |
| 2014/0026788 A1* | 1/2014 | Kallio, III | A47B 21/007 108/6 |
| 2014/0123882 A1* | 5/2014 | Kassanoff | A47B 41/06 108/26 |
| 2014/0158024 A1 | 6/2014 | Henriott | |
| 2014/0312754 A1 | 10/2014 | Hecht et al. | |
| 2015/0076304 A1 | 3/2015 | Hattori | |
| 2016/0115732 A1 | 4/2016 | Alexander et al. | |
| 2016/0128469 A1 | 5/2016 | Matthai et al. | |
| 2016/0161050 A1 | 6/2016 | Trebesius et al. | |
| 2016/0245005 A1 | 8/2016 | Tsuchiyama et al. | |
| 2016/0333578 A1 | 11/2016 | Ng et al. | |
| 2016/0348358 A1 | 12/2016 | Udagawa et al. | |
| 2016/0356079 A1 | 12/2016 | Gauvin et al. | |
| 2017/0084208 A1 | 3/2017 | Durant | |
| 2017/0318958 A1 | 11/2017 | Asante | |
| 2018/0171628 A1 | 6/2018 | Udagawa et al. | |
| 2019/0357676 A1* | 11/2019 | Matthai | H01R 25/006 |

FOREIGN PATENT DOCUMENTS

| | | | | |
|---|---|---|---|---|
| CA | 2974145 A1 * | 1/2018 | | A47B 87/002 |
| CH | 662601 A5 | 10/1987 | | |
| CN | 203138935 U | 8/2013 | | |
| DE | 1153498 | 8/1963 | | |
| DE | 3438404 C1 | 3/1986 | | |
| DE | 4212975 A1 | 10/1992 | | |
| DE | 9411470 | 1/1995 | | |
| DE | 10152761 A1 | 5/2003 | | |
| DE | 10201077 A1 | 7/2003 | | |
| DE | 10230658 A1 | 1/2004 | | |
| DE | 202004016237 U1 | 2/2005 | | |
| EP | 0402346 A1 | 12/1990 | | |
| EP | 0807723 A1 | 11/1997 | | |
| GB | 845581 | 8/1960 | | |
| GB | 903771 | 8/1962 | | |
| GB | 1405374 | 9/1975 | | |
| GB | 1423134 | 1/1976 | | |
| JP | H06225813 A | 10/1997 | | |
| WO | WO 00/21817 A1 | 4/2000 | | |
| WO | WO-02067723 A1 * | 9/2002 | | A47B 13/10 |
| WO | WO-02082948 A1 * | 10/2002 | | A47B 21/007 |
| WO | WO 2012/055524 A1 | 5/2012 | | |
| WO | WO 2013/183040 A1 | 12/2013 | | |
| WO | WO 2017/089619 A1 | 6/2017 | | |
| WO | WO-2018127686 A1 * | 7/2018 | | A47B 21/00 |

OTHER PUBLICATIONS

Abeharts, "Flexible Privacy Screens That Act As Sound Absorber", downloaded from the Internet on Mar. 6, 2018 at: http://anekarts.com/flex-privacy-screens-that-act-as-sound-absorber/, 6 pgs.

Corbett Inc., Human Centered design: The Benefits of Height Adjustable-Screens in Work Spaces, located on the Internet at: https://www.corbettinc.com/all-blog-posts/2017/9/26/human-centered-design-introducing-height-adjustable-screens, publically available prior to Sep. 14, 2013, 6 pgs.

Swivel Ring ("D" Ring), European Counsel Decision regarding the Customs Convention on the International Transport of Goods, dated May 28, 2009, available from the Internet at: http://eur-lex.europea.eu/legal-content/EN/TXT/?uri=CELEX%3A02009D0477-20170101, 1 pg.

\* cited by examiner

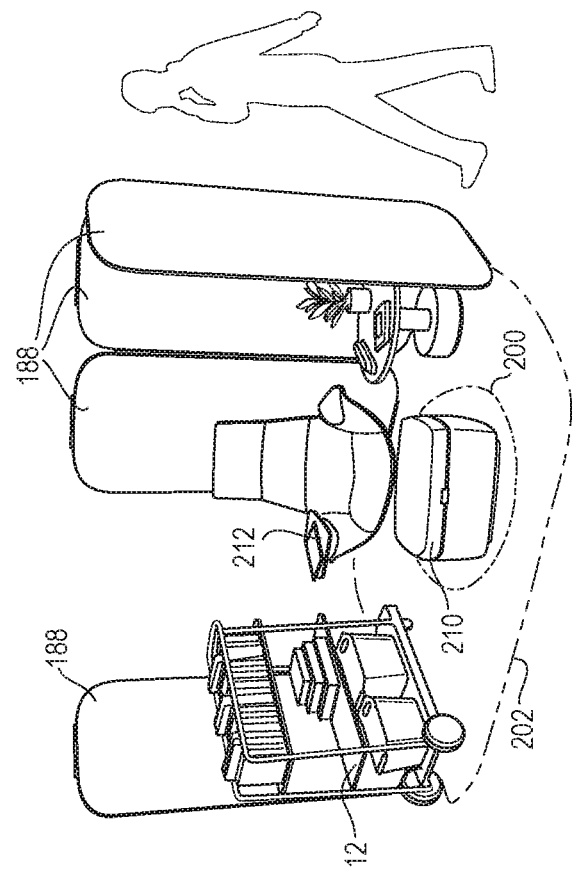
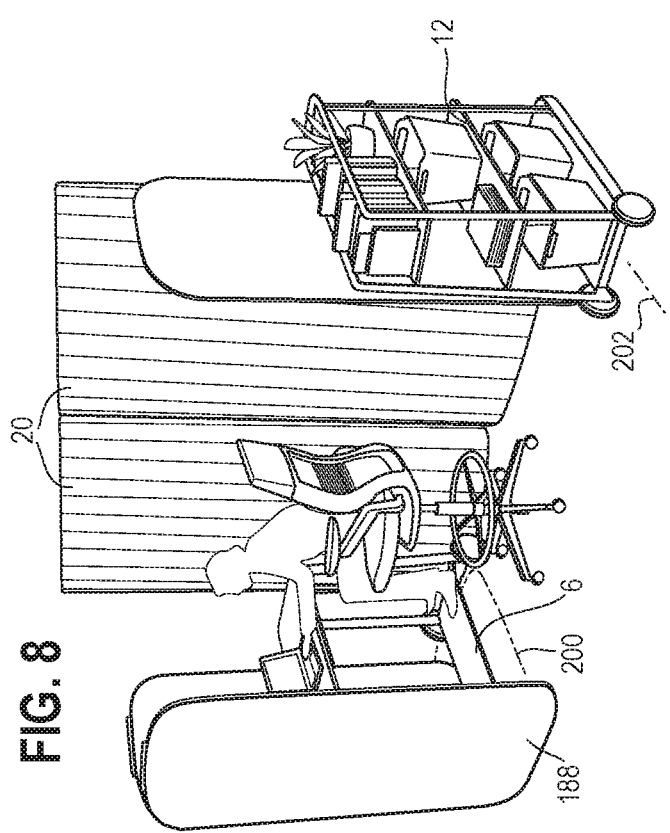

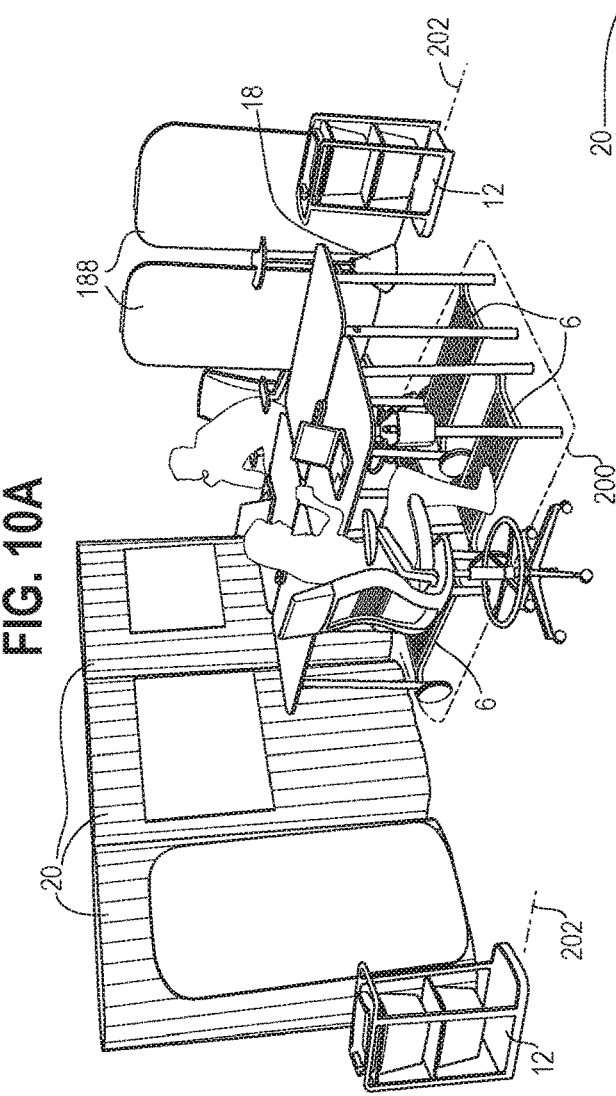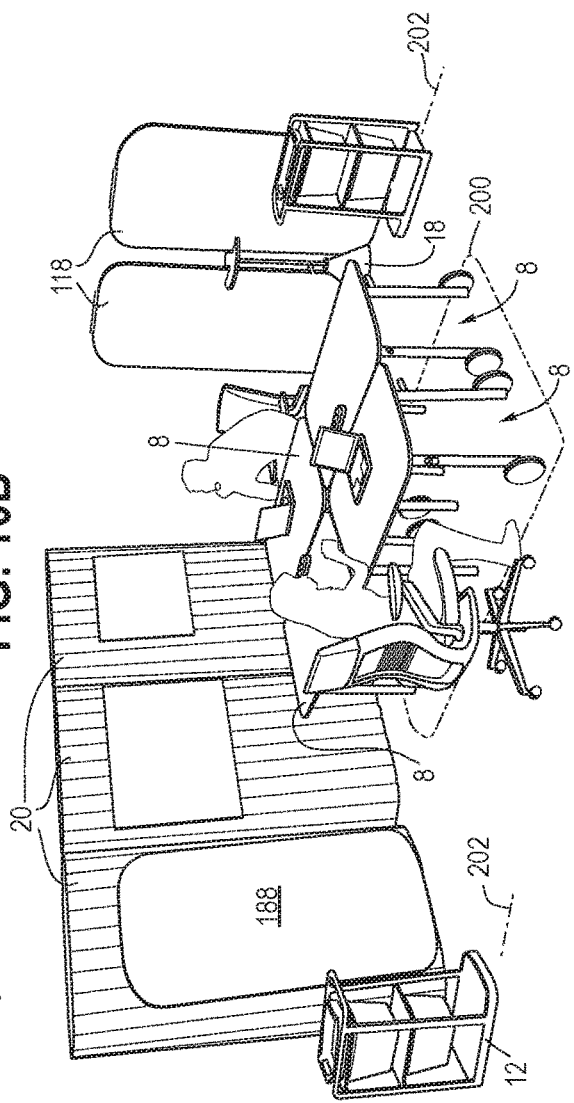

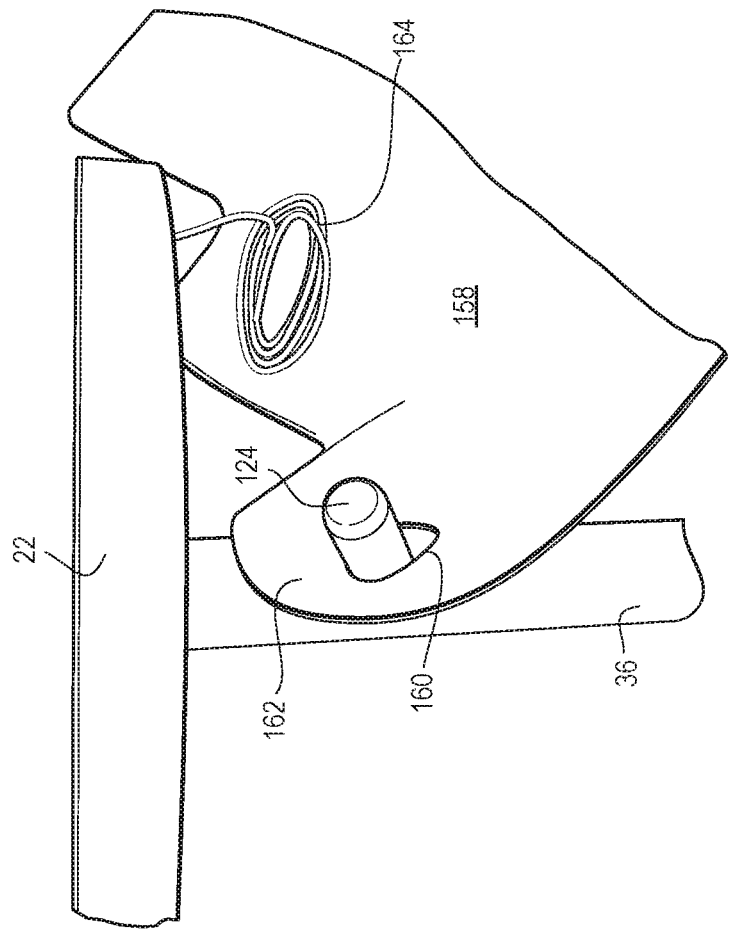

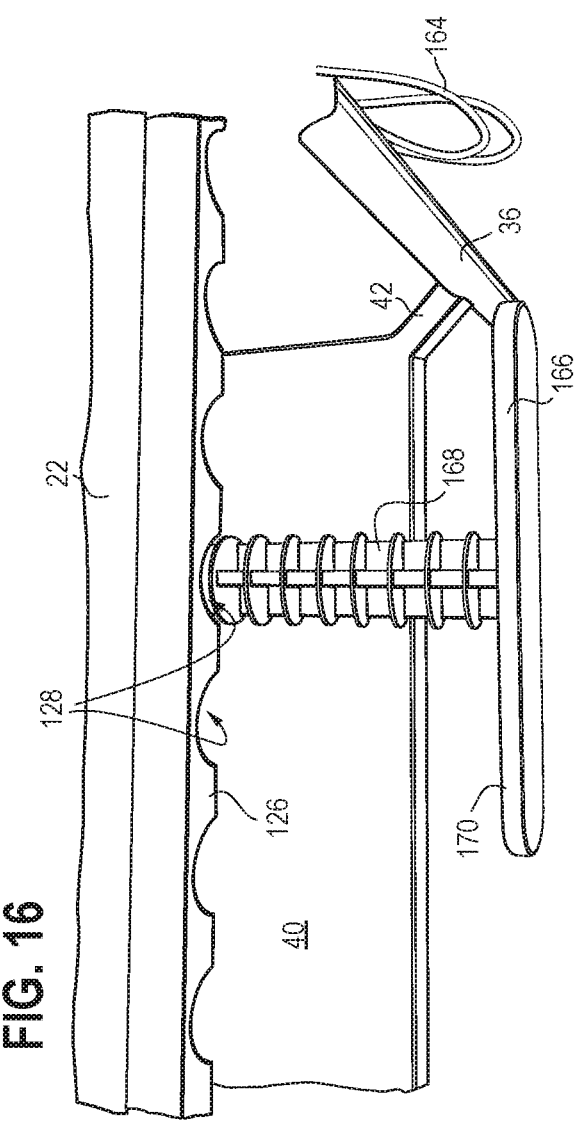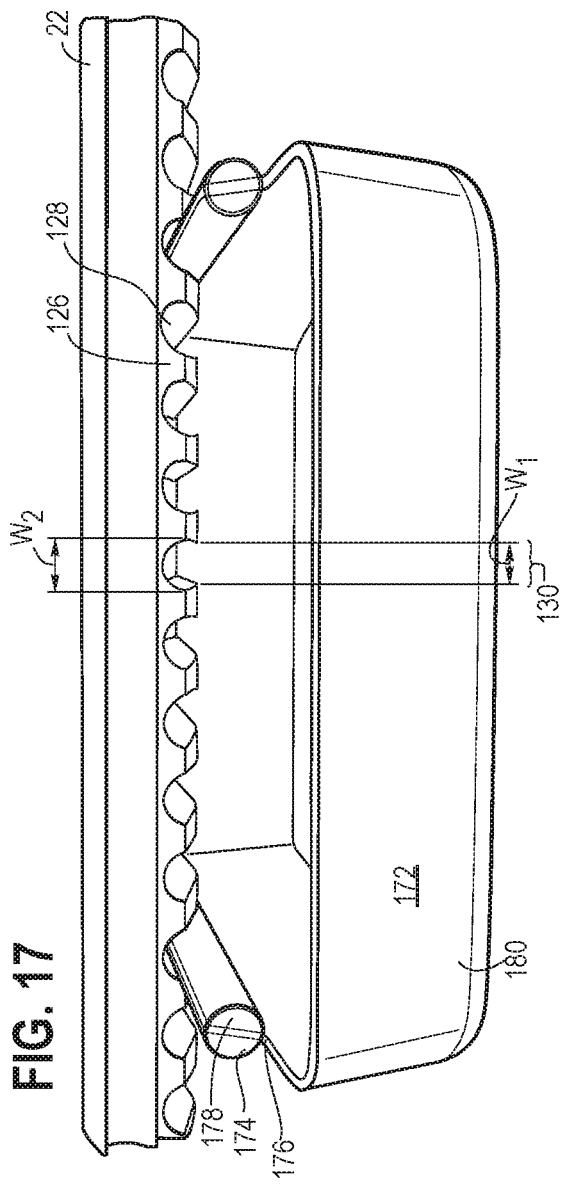

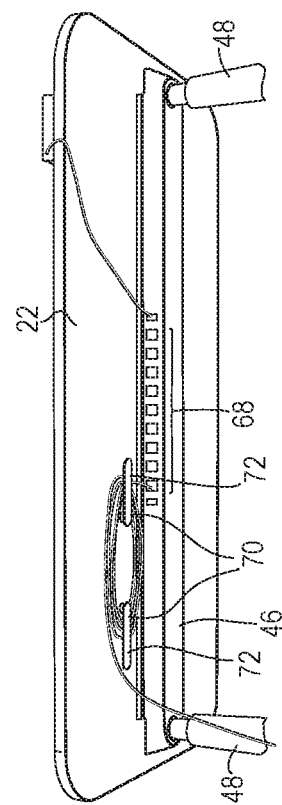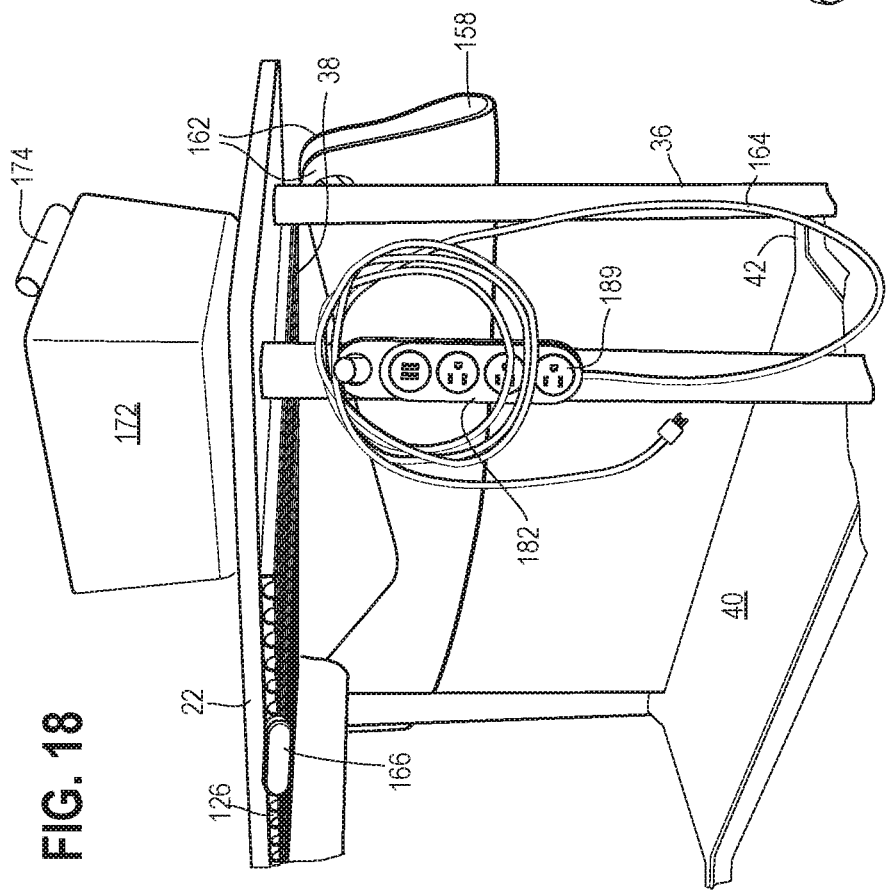

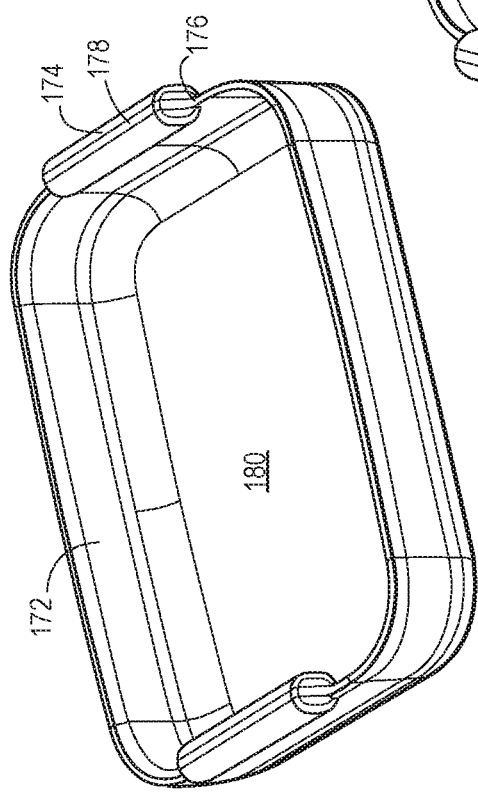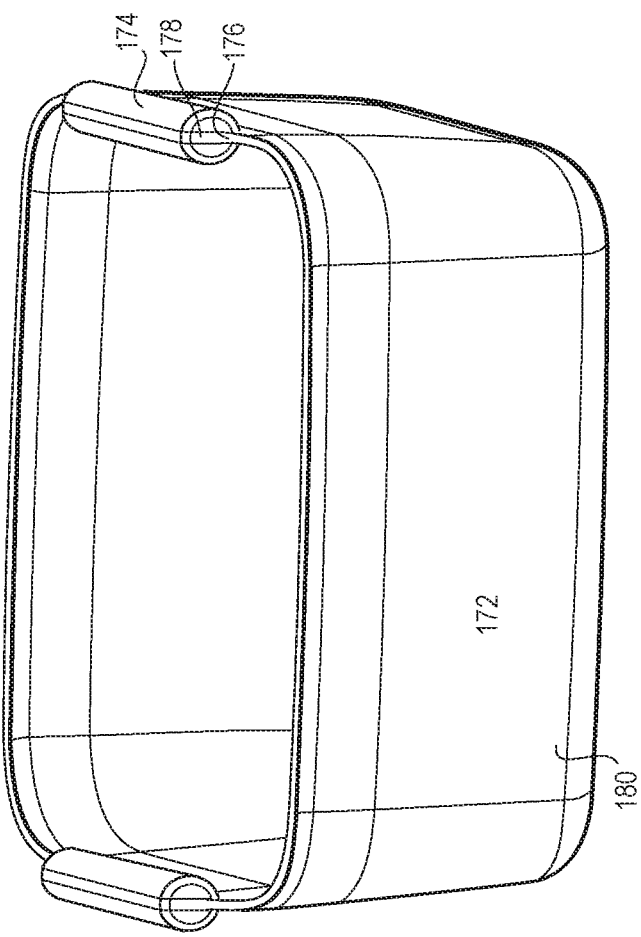

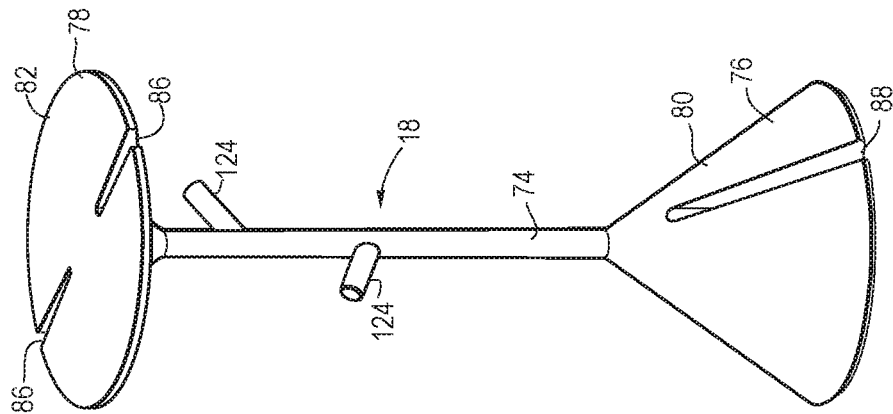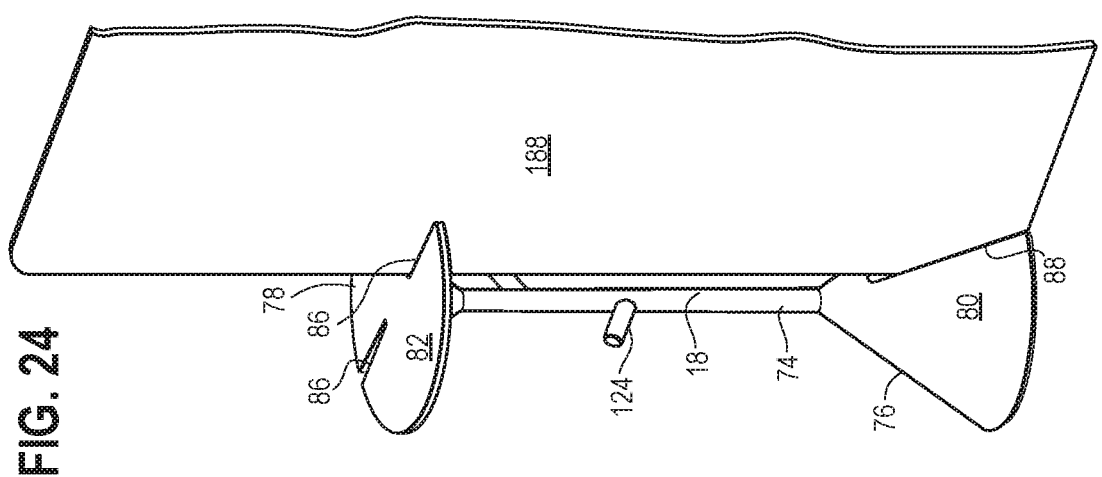

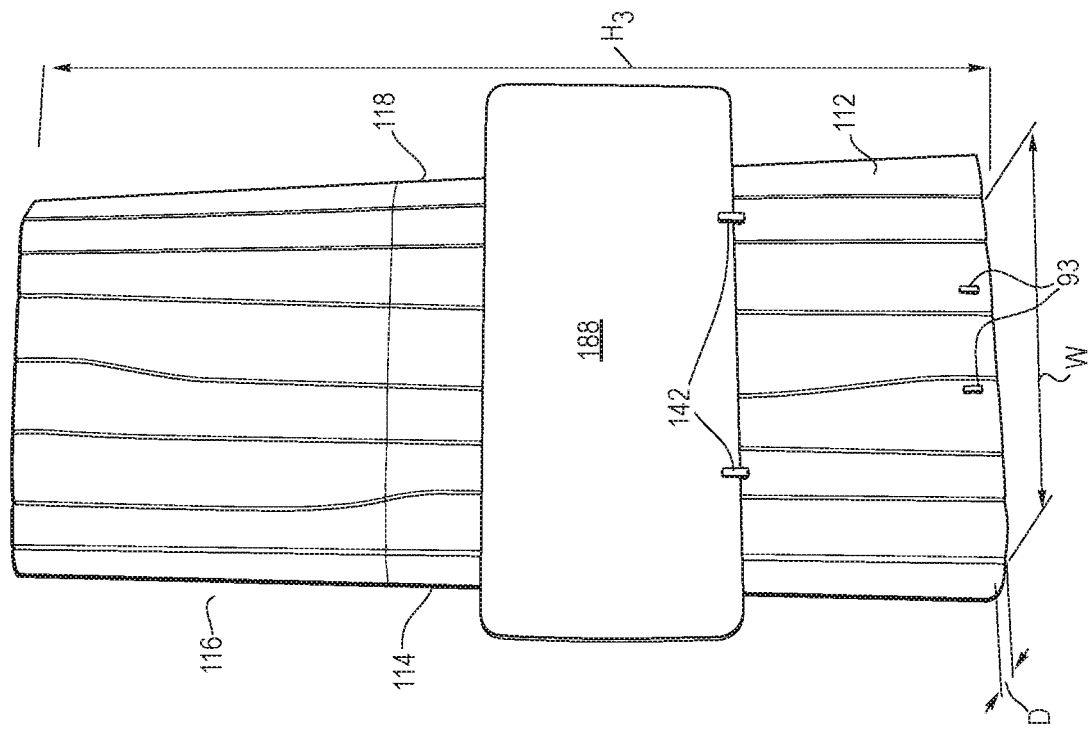
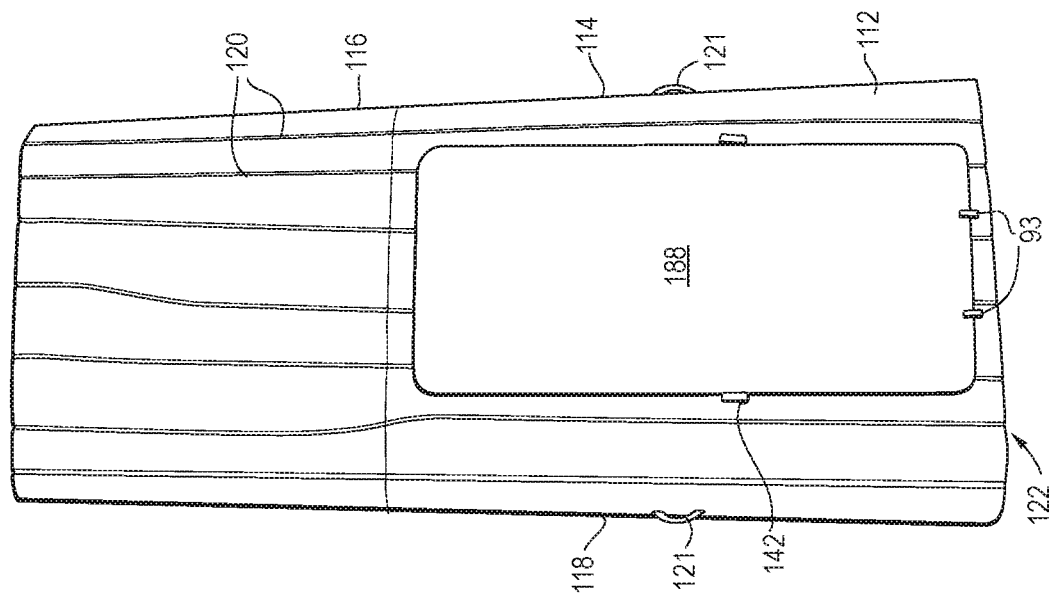

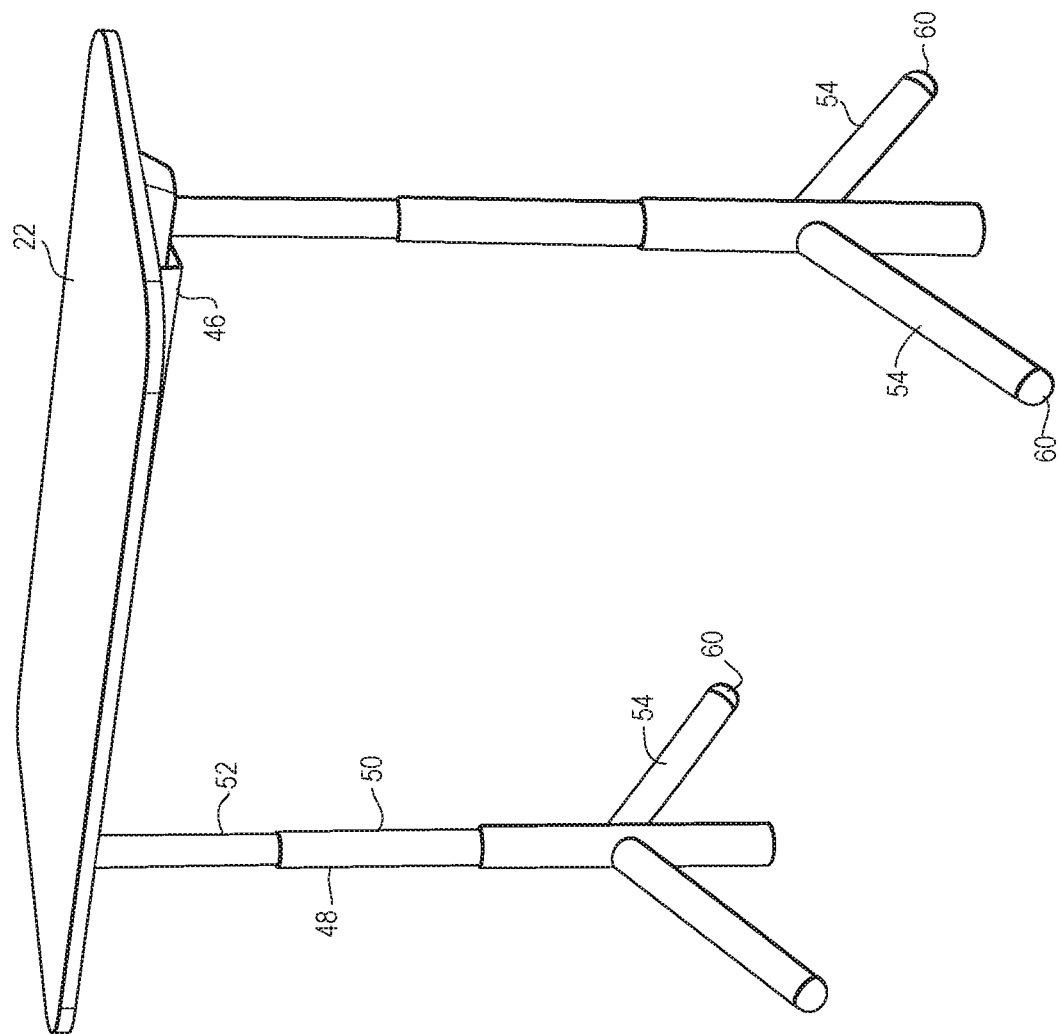

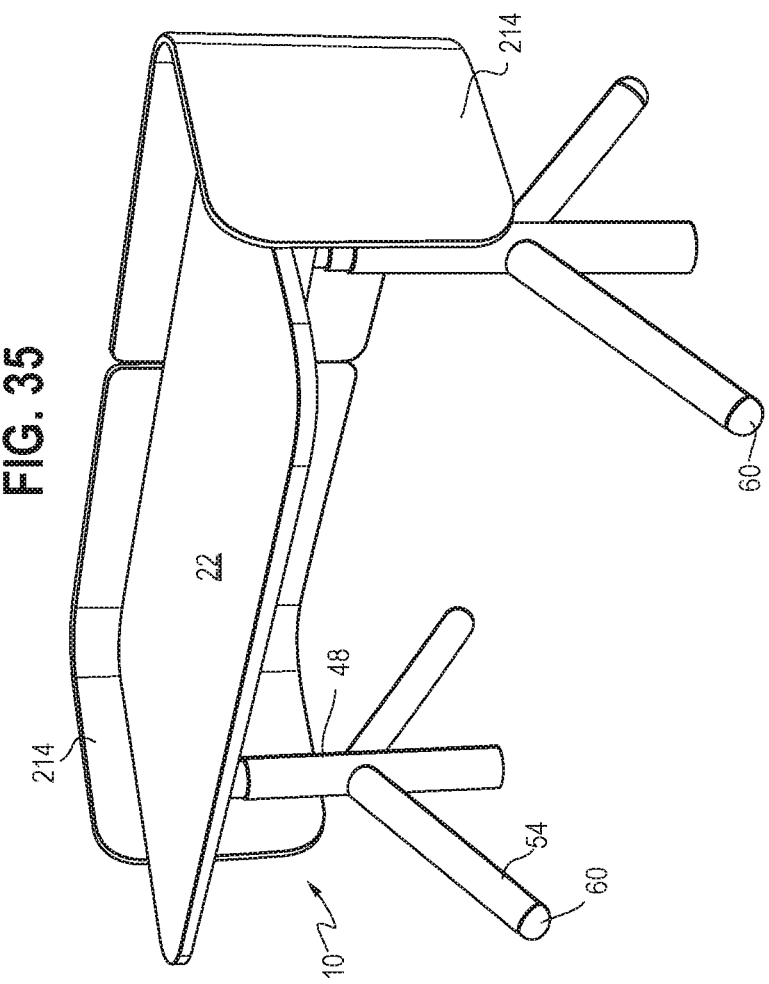
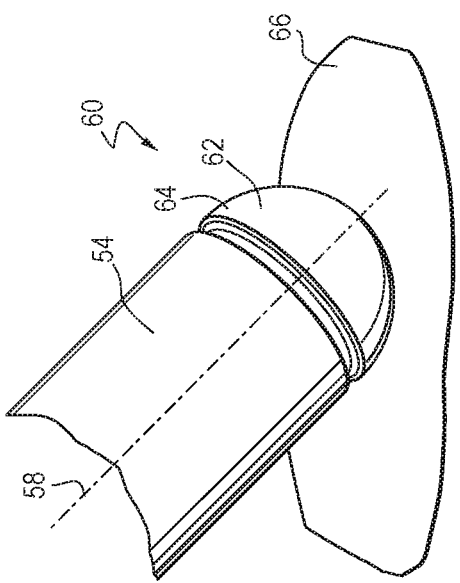

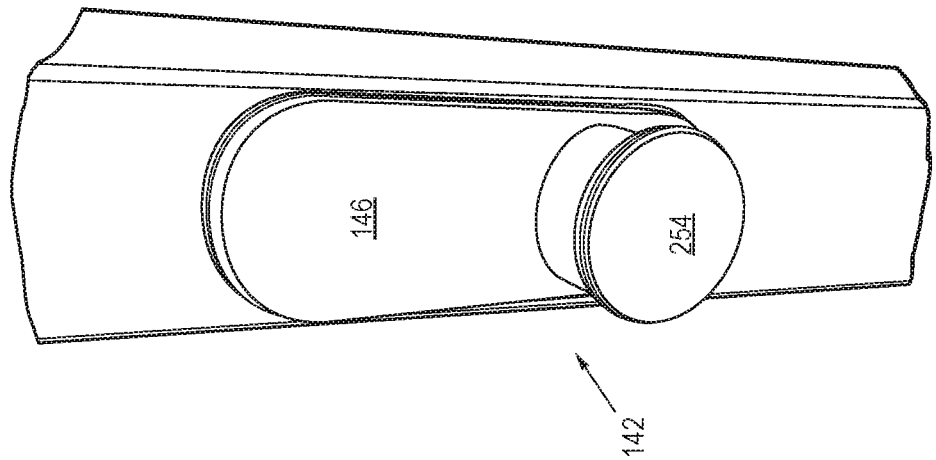
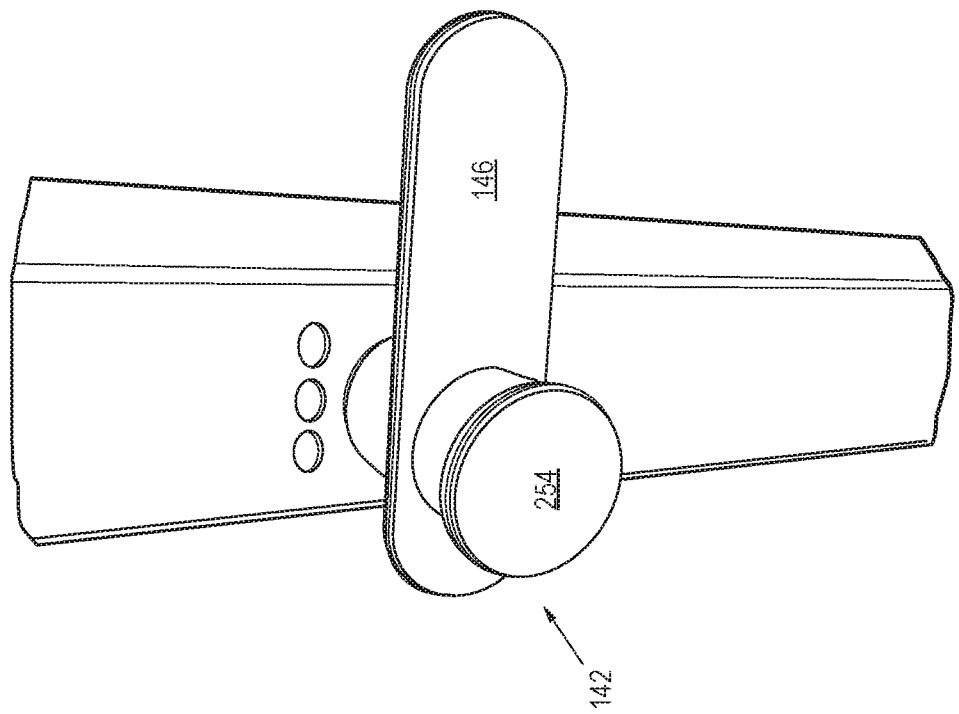

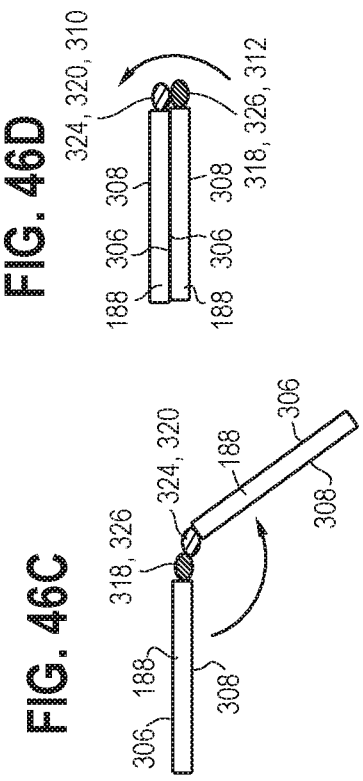
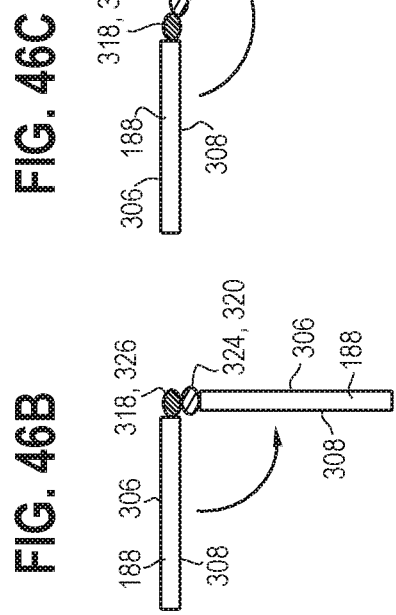
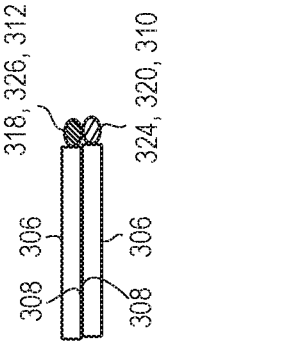
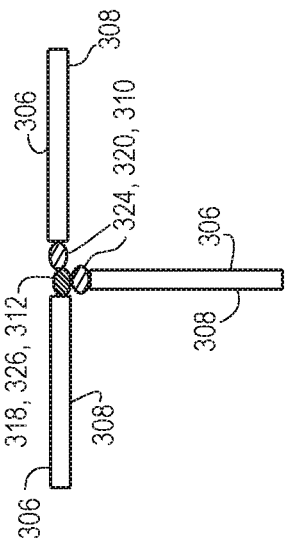
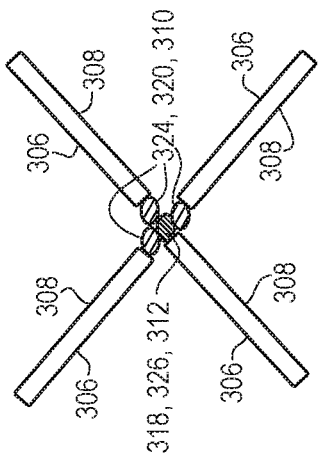
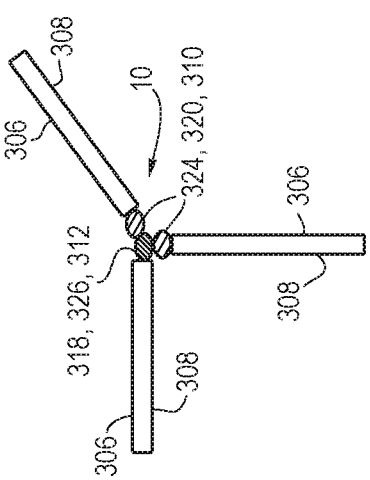
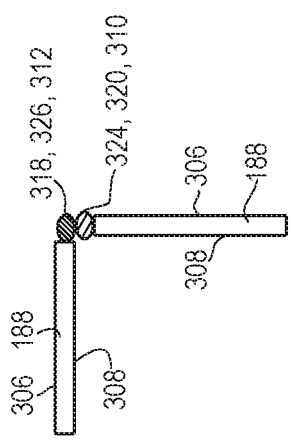

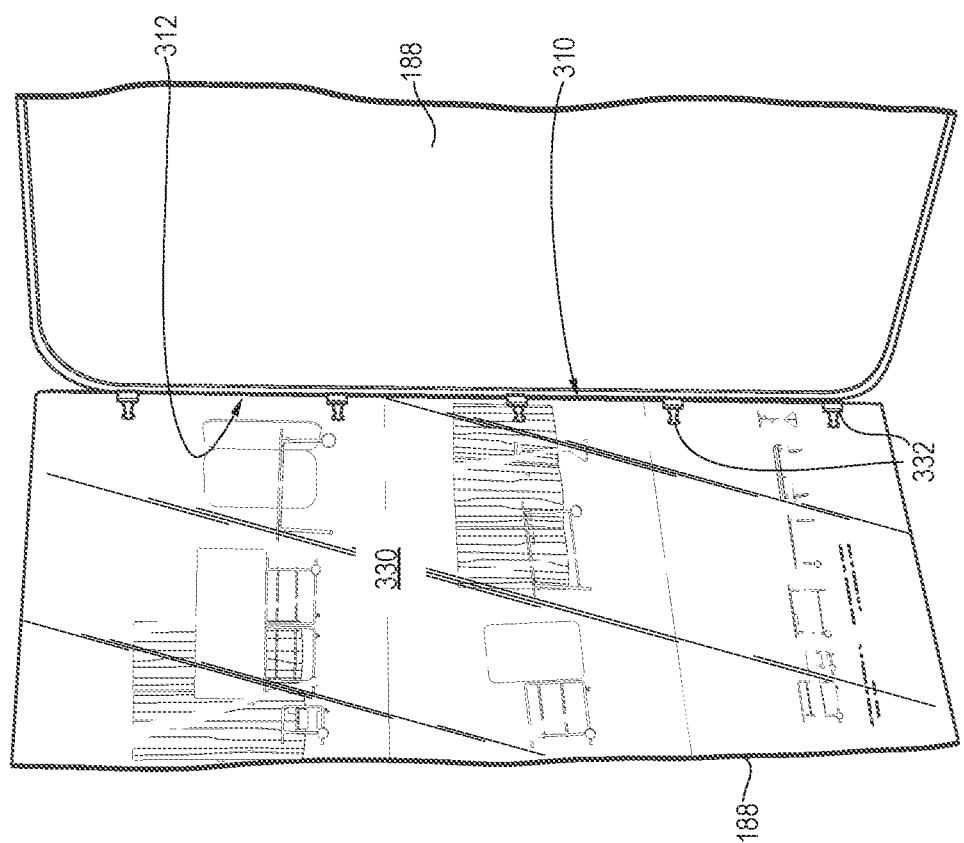
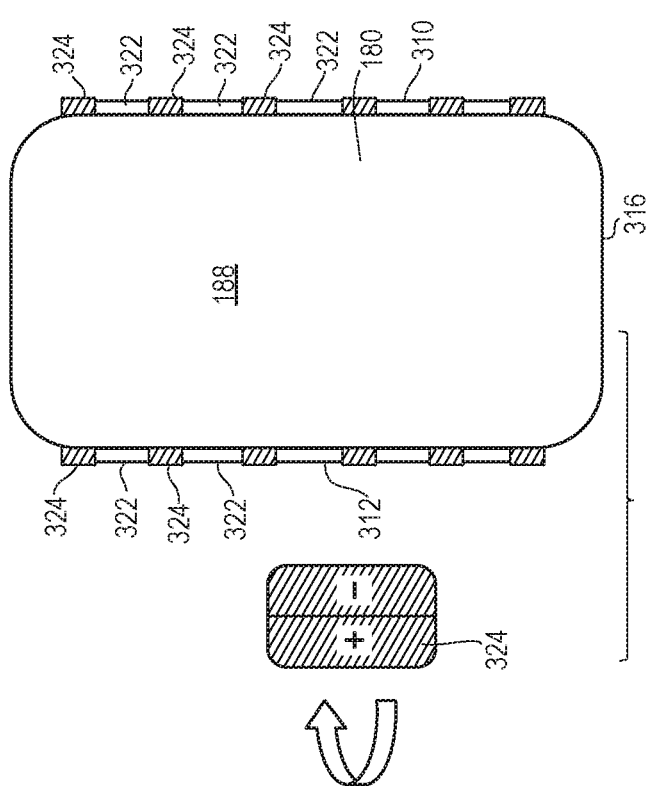

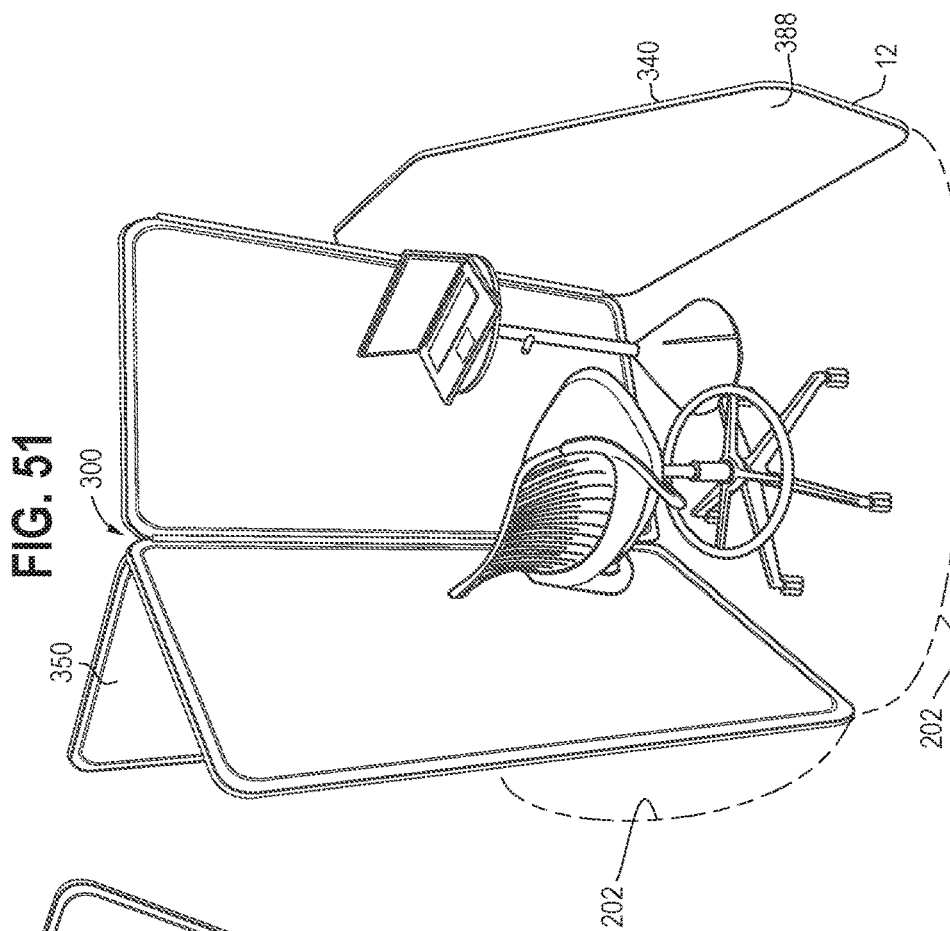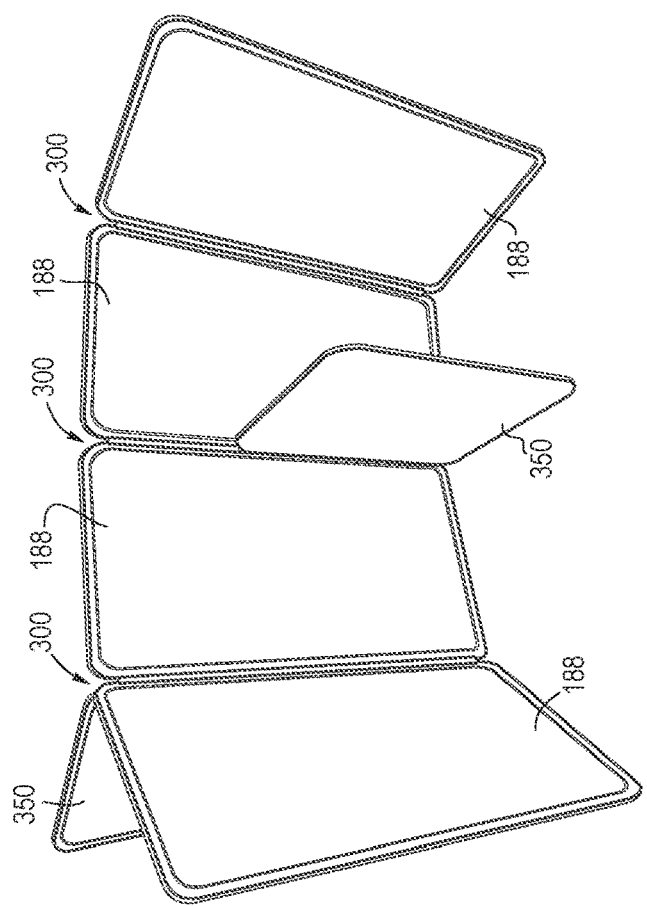

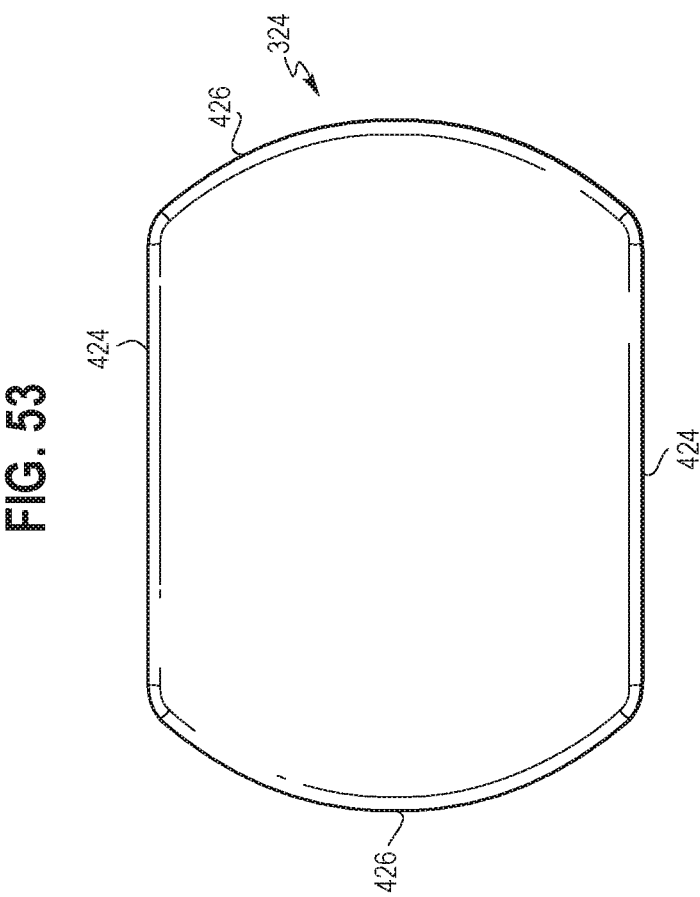
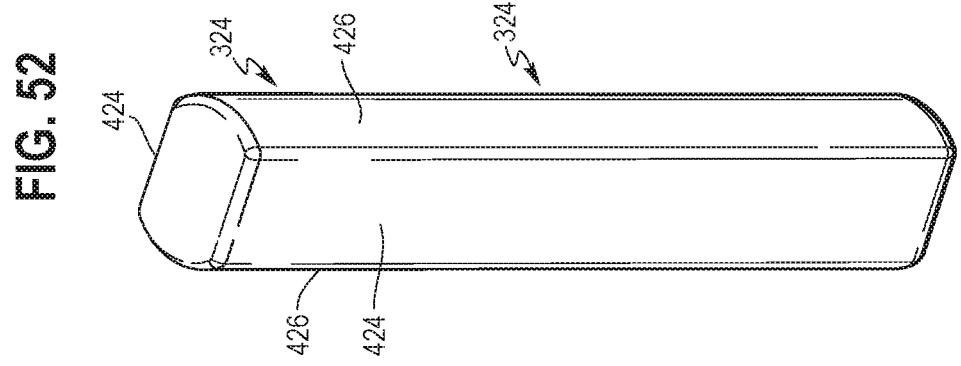

WORKSPACE SYSTEM AND COMPONENTS AND METHOD FOR THE USE THEREOF

CROSS-REFERENCE TO RELATED APPLICATIONS

This application claims the benefit of U.S. Provisional Patent Application No. 62/726,775, entitled "Workspace System and Components and Method for the Use Thereof," filed on Sep. 4, 2018, the entirety of which provisional application is hereby incorporated herein by reference.

FIELD OF THE INVENTION

The present disclosure relates generally to a workspace system and components, and methods for the use, assembly and reconfiguration thereof.

BACKGROUND

Workspace systems are often configured with walls or panels defining a workspace, with desks and storage arranged within with the workspace and/or fixed to the walls. Often, the walls, panels, desks and storage are not configured with wheels, casters or other floor interfaces allowing for easy portability and reconfiguration. This lack of portability may hamper the ability of the end user to easily reconfigure the space to accommodate evolving functionality of the workspace, for example to accommodate different personnel and/or team function. Moreover, even if the systems are reconfigurable to define alternative workspaces, the disassembly and reassembly may be time consuming and require trained facility management personnel and specialized tools.

In addition, the various base components of the workspaces may not be integrated, or compatible to interface with common accessories, such as various storage and power/utility devices. As such, the user must inventory different types of accessories for each base component, which leads to increased costs and possible confusion during assembly.

In addition, such systems may limit the mobility of end users, which may find it useful to transport individual accessories, such as storage containers assigned to them, between different base components and workspace systems.

SUMMARY

The present invention is defined by the following claims, and nothing in this section should be considered to be a limitation on those claims.

In one aspect, one embodiment of a workspace system includes a first base component having opposite ends and sides, a first frame, a first uppermost horizontal worksurface supported by the first frame, and a first pair of wheels connected to the first frame at one of the ends of the first base component. The wheels are adapted to permit movement of the first base component relative to a support surface. A second base component include opposite ends and sides, a second frame, a second uppermost horizontal worksurface supported by the second frame, wherein the second uppermost horizontal worksurface is vertically spaced from the first uppermost horizontal worksurface, and a second pair of wheels connected to the second frame at one of the ends of the second base component. Again, the wheels are adapted to permit movement of the second base component relative to the support surface. At least one first accessory interface having a first shape is fixedly connected to the first base component, and at least one second accessory interface having a second shape is fixedly connected to each of the first and second base components, wherein the second shape is different than the first shape. At least one first accessory is configured to be releasably engaged with the at least one first accessory interface connected to the first base component, wherein the at least one first accessory has a first structure, and at least one second accessory is configured to be releasably engaged with the at least one first accessory interface connected to the first base component, wherein the at least one second accessory has a second structure different than the first structure. At least one third accessory is configured to be releasably engaged with any of the at least one second accessory interfaces connected to the first and second base components. The at least one third accessory has a third structure different than the first and second structures.

In yet another aspect, another embodiment of a workspace system includes at least one first accessory interface fixedly connected to each of the first and second base components, wherein each of the at least one first accessory interfaces has a first shape and at least one second accessory interface fixedly connected to each of the first and second base components, wherein each of the at least one second accessory interfaces has a second shape, wherein the second shape is different than the first shape. At least one first accessory, having a first structure, is configured to be releasably engaged with either of the at least one first accessory interfaces connected to the first and second base components, and at least one second accessory, having a second structure, is configured to be releasably engaged with either of the at least one second accessory interfaces connected to the first and second base components, wherein the second structure is different than the first structure.

In another embodiment, a workspace system includes a plurality of tables each having opposite ends and sides, a first frame, a first uppermost horizontal worksurface supported by the first frame, and a first pair of wheels connected to the first frame at one of the ends of the table. At least two of the plurality of tables are arranged end-to-end and/or side-by-side in a central location of a workspace. A plurality of perimeter base components, such as a table and/or cart, each have opposite ends and sides, a second frame, a shelf or worksurface supported by the second frame, and a second pair of wheels connected to the second frame at one of the ends of the perimeter base component and adapted to permit movement of the perimeter base component relative to the support surface. At least two of the perimeter base components are spaced apart from the central location to define a perimeter of the workspace. A storage container is configured to be releasably connected to any of the perimeter base components or tables, and a screen is releasably connected to at least one of the perimeter base components.

In another aspect, a method of reconfiguring a workspace system includes providing a first base component having opposite ends and sides, wherein the first base component comprises a first frame, a first uppermost horizontal worksurface supported by the first frame, and a first pair of wheels connected to the first frame at one of the ends of the first base component, moving the first base component to a first location by rolling the first pair of wheels on a support surface, providing a second base component having opposite ends and sides, wherein the second base component comprises a second frame, a second uppermost horizontal worksurface supported by the second frame, wherein the second uppermost horizontal worksurface is vertically spaced from the first uppermost horizontal worksurface, and a second pair of wheels connected to the second frame at one of the ends of the second base component, and moving the second base component to a second location by rolling the second pair of wheels on the support surface. The method further includes releasably engaging a first accessory interface fixedly connected to each of the first and second base components with a first accessory, wherein each of the first accessory interfaces has a first shape and the first accessories have a first structure, and releasably engaging a second accessory interface fixedly connected to each of the first and second base components with a second accessory, wherein each of the second accessory interfaces has a second shaped different that the first shape and the second accessories have a second structure different than the first structure.

In another embodiment, a method of reconfiguring a workspace system includes releasably engaging a second accessory interface fixedly connected to each of the first and second base components with a third accessory, wherein each of the second accessory interfaces has a second shaped different that the first shape and the third accessories have a second structure different than the first structure.

In another aspect, a table includes a worksurface having a front, user facing side, opposite ends and a rear side, wherein a longitudinal direction is defined between the opposite ends a lateral direction is defined between the front and rear sides. A support leg has an upper portion and lower floor engaging portion defining a rotation axis forming an acute angle with a horizontal plane. The rotation axis is disposed in a vertical plane extending in the lateral direction. The upper portion of the support leg is coupled to the worksurface. A wheel is rotatably mounted to the lower floor engaging portion about the rotation axis, wherein the wheel is rotatable when the worksurface is moved in the longitudinal direction, and wherein the wheel is non-rotatable when the worksurface is moved in the lateral direction.

In another aspect, one embodiment of a screen includes a panel having opposite first and second sides and opposite first and second side edges. Each of the first and second side edges is configured with a sheath, wherein the first side edge comprises a first magnet disposed in the sheath and the second side edge comprises a first attractive component disposed in the sheath.

In another aspect, one embodiment of a screen arrangement includes a first screen having opposite first and second side edges configured with a sheath, wherein the first side edge comprises a first magnet disposed in the sheath and the second side edge comprises a first attractive component disposed in the sheath. A second screen includes opposite first and second side edges configured with a sheath, wherein the first side edge of the second screen comprises a second magnet disposed in the sheath and the second side edge of the second screen comprises a second attractive component disposed in the sheath. The first and second screens are arranged such that the first magnet is magnetically coupled to the second attractive component. The screens may be quickly and easily engaged with each other, or with adjacent structures, without the need for tools or fasteners.

The various embodiments of the workspace system, and methods for the configuration and use thereof, provide significant advantages over other workspace systems, and components used therein. For example and without limitation, the disclosed components allow for quick, easy and tool free reconfiguration of different workspace systems. The base components are portable and easily movable by a single user without any disassembly. In this way, the base components may be quickly and easily rearranged, or reconfigured, to define different workspaces depending on the immediate needs of the workspace users.

In addition, the base components are configured with common accessory interfaces which allow for releasable engagement by different accessories. Conversely, the same accessory, e.g., storage, may be releasably engaged by accessory interfaces on different base components, thereby allowing for greater modularity, less overall inventory of accessories and greater mobility of the end user.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

BRIEF DESCRIPTION OF THE DRAWINGS

FIG. 8 is a perspective view of an eighth workspace configuration.

FIG. 9 is a perspective view of a ninth workspace configuration.

FIGS. 10A and B are perspective views of a tenth workspace configuration, configured with different height tables.

FIG. 15 is a partial side view showing an accessory being applied to an accessory interface on a table base component.

FIG. 16 is a top view of an accessory being applied to an accessory interface on a table base component.

FIG. 17 is a front view of an accessory being applied to an accessory interface on a table base component.

FIG. 18 is front perspective view of a table base component configured with a plurality of accessory interfaces and a plurality of accessories.

FIG. 19 is a partial bottom view of a table base component with an accessory arranged thereon.

FIG. 22 is a top perspective view of a first tray accessory.

FIG. 23 is a top perspective view of a first tray accessory.

FIG. 24 is a front perspective view of a pedestal table base component with a plurality of accessory interfaces and a screen accessory engaged therewith.

FIG. 25A is a front perspective view of a pedestal table base component with a plurality of accessory interfaces.

FIG. 31 is a front view of a tower base component with an accessory supported thereon in a first configuration.

FIG. 32 is a front view of the tower base component with an accessory supported thereon in a second configuration.

FIG. 34 is a perspective view of an adjustable height table base component in a raised configuration.

FIG. 35 is a perspective view of an adjustable height table base component in a lowered configuration with a screen accessory supported thereon.

FIG. 36 is a partial, enlarged view of an end of a support leg.

FIGS. 40A and B are front views of the clip in a horizontal and vertical position respectively.

FIGS. 46A-D are top views of a pair of screens in different connected arrangements.

FIGS. 47A-D are top views of different screen arrangements.

FIG. 48 is a front view of an alternative screen embodiment.

FIG. 49 is a front view of screen arrangement with a document magnetically secured to the screen.

FIG. 50 is a perspective view of an exemplary embodiment of a screen arrangement.

FIG. 51 is a perspective view of another exemplary embodiment of a screen arrangement and workstation.

FIG. 52 is a perspective view of one embodiment of a magnet.

FIG. 53 is an end view of the magnet shown in FIG. 52.

DETAILED DESCRIPTION OF THE PRESENTLY PREFERRED EMBODIMENTS

It should be understood that the term "plurality," as used herein, means two or more. The terms "longitudinal" as used herein means of or relating to length or the lengthwise direction 2, for example between the opposite ends of a table. The terms "lateral" and "transverse" as used herein, means situated on, directed toward or running from side to side, and refers to a lateral direction 4 transverse to the longitudinal direction. The term "coupled" means connected to or engaged with whether directly or indirectly, for example with an intervening member, and does not require the engagement to be fixed or permanent, although it may be fixed or permanent (or integral), and includes both mechanical and electrical connection. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. For example, a "first" base component may be later referred to as a "second" base component depending on the order in which they are referred. It should also be understood that designation of "first" and "second" does not necessarily mean that the two components or values so designated are different, meaning for example a first base component may be the same as a second base component, with each simply being applicable to separate but identical components.

Figure 12:
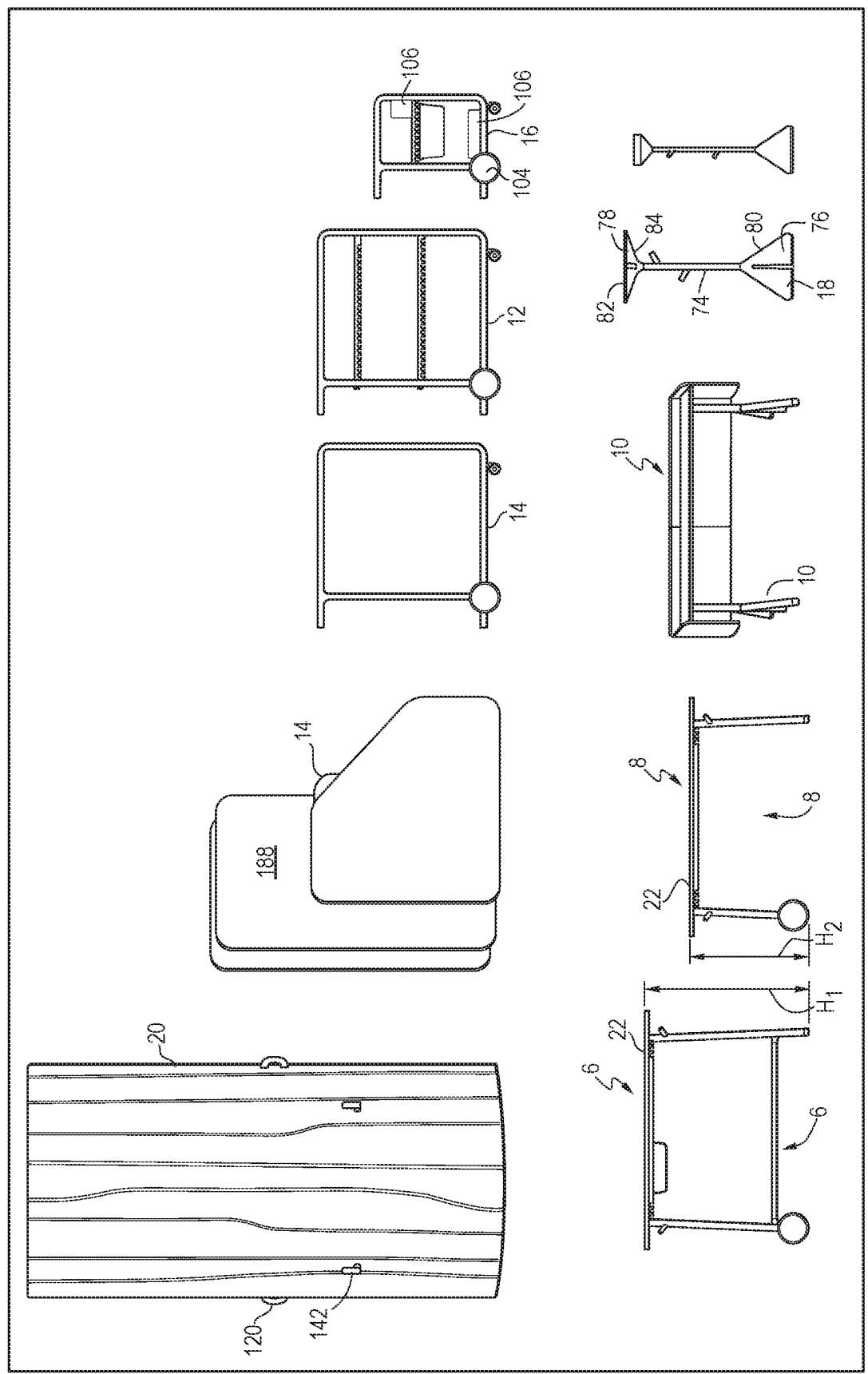
FIG. 12 is a front view of a plurality of base components that may be arranged to define the various workspace configurations.
Figure 13:
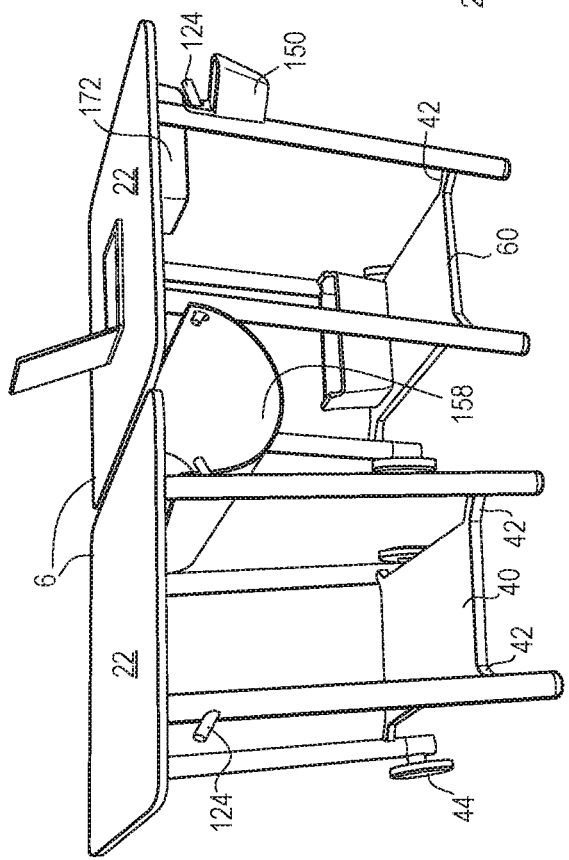
FIG. 13 is a perspective view showing a pair of table base components configured with various accessory interfaces and accessories.
Figure 14:
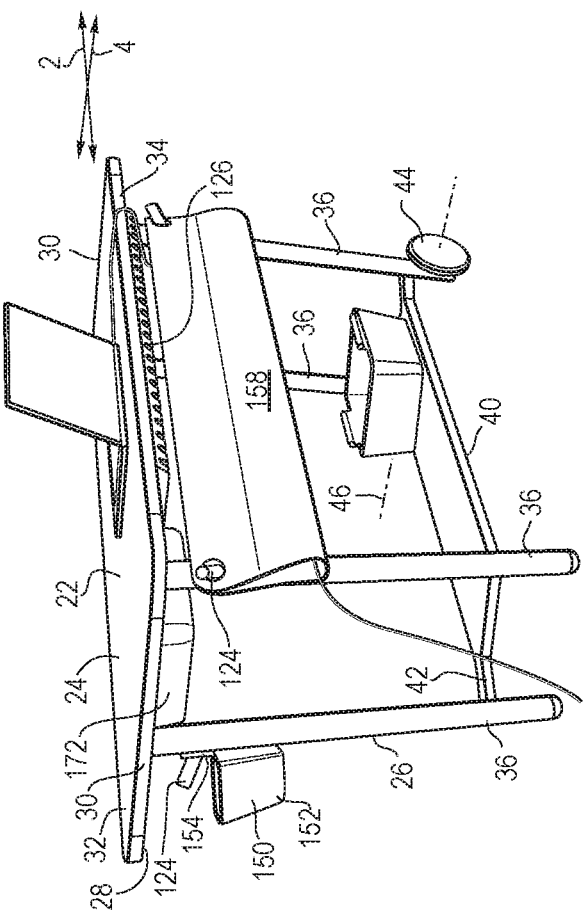
FIG. 14 is rear perspective view of a table base component configured with a plurality of accessory interfaces and a plurality of accessories.

Base Components:

Referring to FIG. 12, a variety of different base components are shown, including various table base components 6, 8, 10, 18, cart base components 12, 14, 16 and a tower base component 20. Referring to FIGS. 13, 14 and 18, one embodiment of a table base component 6, 8 includes an uppermost, horizontal worksurface 22 having an upper surface 24 configured to receive various personal and office related items, such as computers, documents, telephones, storage items and the like, while providing a suitable surface for writing. The worksurface is supported by a frame 26, which is secured to a bottom surface 28 of the worksurface. The worksurface has opposite ends 30 spaced apart in the longitudinal direction 2, a front, user facing side 32, and an opposite rear side 34, which is spaced apart from the front side in the lateral direction 4. The worksurface 22 is made for example and without limitation from particle board with HPL, LOP or veneer exterior, plywood, plywood with Forbo linoleum, or combinations thereof. The frame 26 is made of steel, wood or combinations thereof. In one embodiment, the frame includes four support legs 36 extending downwardly from the worksurface in a vertical direction. The upper portions of the support legs are joined by longitudinally and laterally extending members defining an undercarriage 38, which supports the worksurface. The frame 26 has a perimeter that defines a footprint in a horizontal plane, while the perimeter of the uppermost worksurface defines a footprint that is larger than the frame footprint, meaning it has a greater area, and extends outwardly from the frame footprint in all directions in one embodiment.

The table base component further includes a second, lower horizontal worksurface 40 positioned below the uppermost worksurface 22, with the lower horizontal worksurface being positioned adjacent a lower portion of the frame 26, and functioning as a shelf. The lower worksurface 40 is made of metal, such as steel, or plastic. The lower worksurface has a perimeter defining a horizontal foot print that is smaller than the foot print of the upper worksurface and smaller than the footprint of the frame 26. The lower worksurface is connected to the frame with diagonal support members 42, with the support members 42 and lower worksurface 40 defining an X-shape and lying in a horizontal plane.

A pair of wheels 44 are rotatable coupled to one pair of the support legs, located at either end of the table. The wheels are rotatable about a laterally extending axis 46, meaning the table may roll on the wheels in the longitudinal direction 2, but the wheels are not rotatable in the lateral direction 4. In operation, a user may lift an opposite end of the table and roll the table in the longitudinal direction, or turn the table by rotating the wheels at differential speeds and/or directions, and move the table from a first to a second location. The wheels each have a diameter of between 7 and 8 inches.

Referring to FIG. 12, in another embodiment, a second table base component 8 is similar to the first table base component, but with the lower worksurface being omitted, and with the uppermost worksurface being located at a lower height than the worksurface of the first table base component. For example in one embodiment, the upper surface 24 of the worksurface 22 of the second table base component 8 is located at a height H2 of 28.5 inches or 750 mm in one embodiment, while the upper surface 24 of the worksurface of the first table base component 6 is located at a height H1 of 41.3 inches.

Referring to FIGS. 12 and 33-36, a third table base component 10 is shown as including an upper worksurface 22 having opposite ends, a front side and a rear side. A central spine member 47 is secured along a centerline of the bottom surface of the worksurface. A pair of height adjustable support legs 48 include a telescoping vertical portion, which may be configured with two or three stages 50, 52, with an upper portion or stage secured to the spine and/or worksurface. A pair of lower floor engaging portions 54 extend outwardly within a vertical plane 56 extending in the lateral direction. The floor engaging portions each define a rotation axis 58 lying in the plane 56 and forming an acute angle with a horizontal plane. A wheel 60 is rotatably mounted to the lower floor engaging portion about the rotation axis 58. The wheel has a cylindrical portion 64 terminating in a dome shape (spherical) end 62. The wheel is rotatable about the axis 58 when the worksurface is moved in the longitudinal direction 2. The wheel 60 is non-rotatable about the axis 58 when the worksurface is moved in the lateral direction 4, but instead functions as a glide, with the dome shaped end 62 sliding along the floor. In this way, the table, and worksurface, is not easily moveable away from the user, for example if the user applies a force to the front side 32 when working at the table. At the same time, the table may be easily moved in the longitudinal direction 2 by rotating the wheels 60 about the axes 58 and rolling the wheels on the floor 66. The height of the worksurface may be adjusted by extending or contracting the height-adjustable leg, for example moving the worksurface 22 between first and second heights. The worksurface is infinitely adjustable to and between lowermost and uppermost heights (22.6 to 48.7 inches). A shroud 95, or utility raceway, may be secured to a bottom side of the worksurface to gather and route various power and utility lines.

As shown in FIG. 19, the central spine member may be configured with a plurality of outlets 68. A cord holder, configured with a pair of spaced apart tabs facing away from each other and being spaced below the bottom surface of the worksurface, may be secured to the bottom of the worksurface.

Referring to FIGS. 24 and 25A, a fourth table base component 18 is configured as a pedestal table having a vertical post member 74, a lower base 76 coupled to the lower end of the post and an upper worksurface 78 coupled to an upper end thereof. The base 76 has an inverted conical outer surface 80. The worksurface has a planar uppermost surface 82, and a conical bottom surface 84. The worksurface and base each have a pair (first and second sets) of grooves 86, 88 extending radially inwardly from a peripheral edge, with the grooves 86, 88 in the worksurface and base being vertically aligned. The first and second sets of grooves 86, 88 in each of the worksurface and base are oriented 180 degrees relative to each other.

FIGS. 25B-25G show some different embodiments of a table base component, providing various configurations for holding accessories (e.g., screens) upright, as well as the ability of providing easy access to power/data through outlets and/or providing light to the accessories through lighting components. Each of these figures provides some features that may be incorporated into a table base component to perform desired functions. It should be understood that the features in these different embodiments of the table base component may be combined together to achieve other embodiments of a table base component.

Figure 25B:
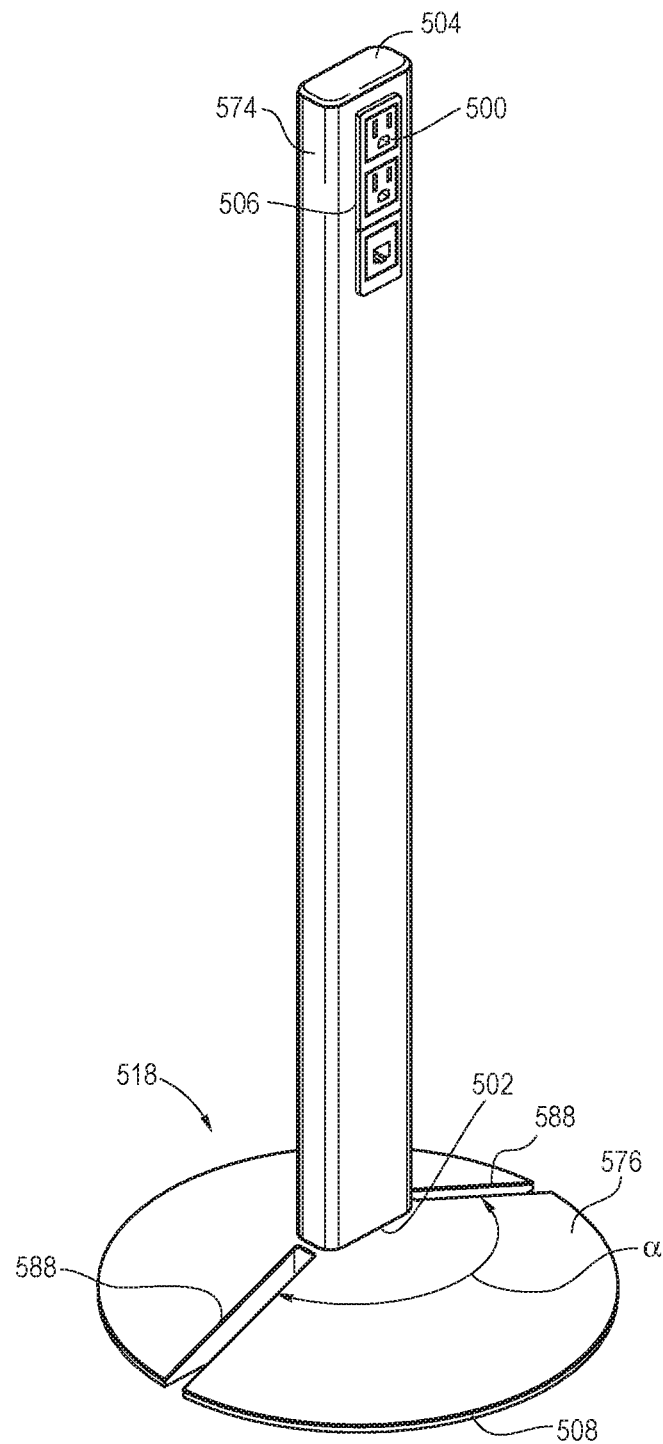
FIG. 25B is a perspective view of an embodiment of a base component with an outlet.

In some embodiments, as shown in FIG. 25B, the table base component 518 may include a lower base 576 and a post member 574. The post member 574 may extend vertically between a lower post end 502 and an upper post end 504. The lower post end 502 may be connected to the lower base 576. The post member 574 may have a generally rectangular cross section with chamfered corners, as shown in FIG. 25B, with the lower post end 502 having a smaller dimension than the upper post end 504. It will be appreciated that the cross section may have any suitable configuration with desired dimension, including, but not limited to, oval, circular, square, triangular, and combinations thereof.

The lower base 576 may have a generally circular configuration, as shown in FIG. 25B, but it will be appreciated that any suitable configuration may be possible. The lower base 576 may include one or more slots, such as two slots 588 as shown in FIG. 25B. The two slots 588 may extend radially outwardly from the lower post end 502 to an outer edge 508 of the lower base 576. The two slots 588 may be oriented an angle α relative to each other. In some embodiments, as shown in FIG. 25B, the angle α may be about 180 degrees, while in other embodiments, the angle α may be other degrees as desired and/or needed. The term "about" is specifically defined herein to include the specific value referenced as well as a dimension that is within 5% of the dimension both above and below the dimension.

One or more outlets 500 (e.g., power outlet or data outlet) may be disposed at a predetermined height on the post member 574 (e.g., disposed in the upper portion 506 of the post member 574). The length of the post member 574 and the height of the outlets 500 may be configured to provide easy access (e.g., providing elevated utility outlets such that a user does not need to bend to use them) to power and/or data according to human factors and ergonomics. For example, in some embodiments, the table base component 518 may have a height of about 30 inches, where the lowest outlet 500 disposed thereon may be located at a height of about 22 inches. In some other embodiments, the table base component 518 may have a height of about 37⅛ inches, where the lowest outlet 500 disposed thereon may be located at a height of about 28 inches.

Figure 25C:
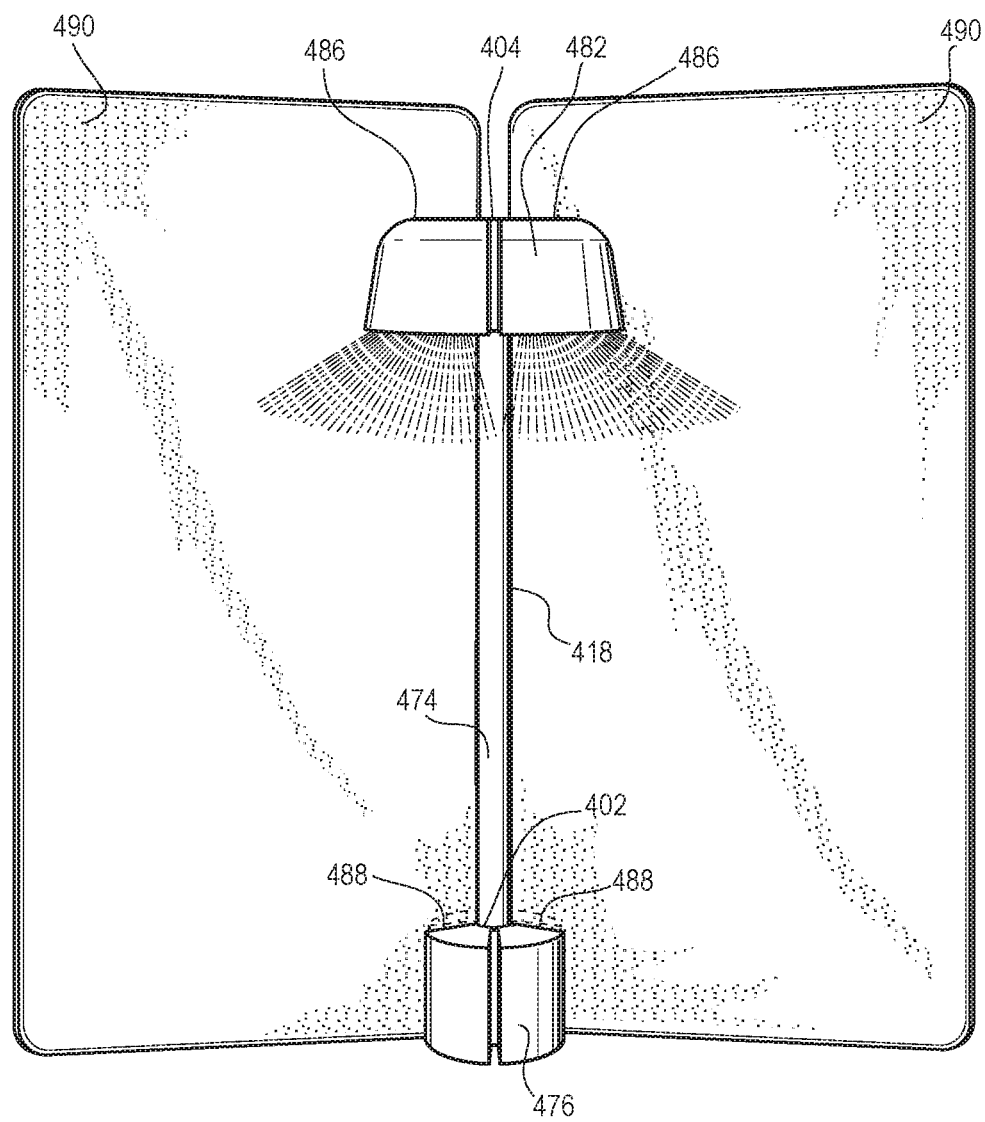
FIG. 25C is a perspective view of an embodiment of a base component with a lighting component.

In some embodiments, as shown in FIG. 25C, the table base component 418 may include a lower base 476 and a post member 474. The lower base 476 may have a generally cylindrical configuration, while other configurations may also be possible. The post member 474 may extend vertically between a lower post end 402 and an upper post end 404. The lower post end 402 may be connected to the lower base 476.

The table base component 418 may also include a lighting component 482 coupled to the upper post end 404 of the post member 474. The lighting component 482 and the lower base 476 may each have at least one pair (first and second sets) of grooves 486, 488 extending radially inwardly from a peripheral edge, with the grooves 486, 488 in the lighting component 482 and the lower base 476 being vertically aligned. The first and second sets of grooves 486, 488 in each of the lighting component 482 and the lower base 476 may be oriented about 180 degrees relative to each other.

The pair (first and second sets) of vertically aligned grooves 486, 488 each may be configured to receive an edge of an accessory component therein and hold the accessory component upright. As shown in FIG. 25C, for example, a pair (first and second) of screens 490 may be received within respective first and second sets of vertically aligned grooves 486, 488. The lighting component may be configured to provide light to the first and second screens 490 received within the grooves.

Figure 25D:
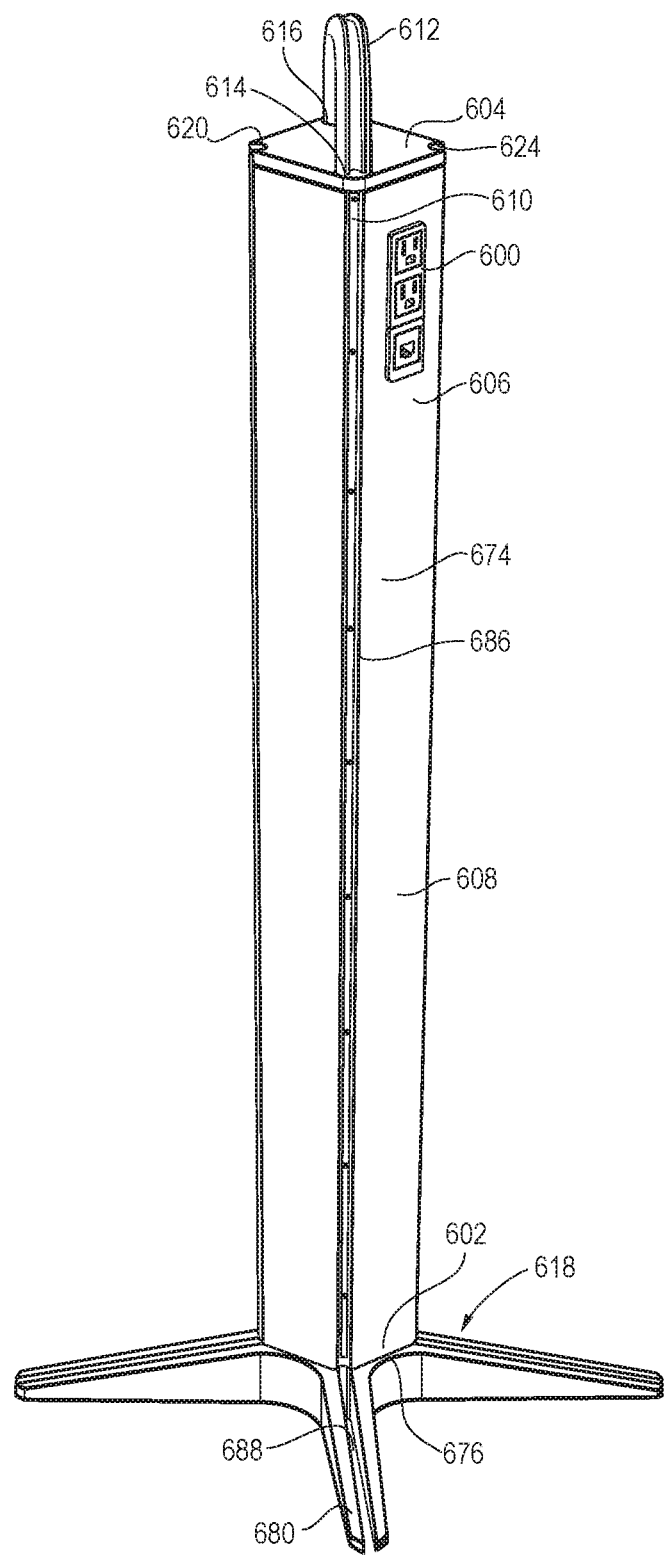
FIG. 25D is a perspective view of an embodiment of a base component with an outlet and an attractive component disposed on the post member of the base component.

In some embodiments, as shown in FIG. 25D, the table base component 618 may include a lower base 676 and a post member 674. The post member 674 may extend vertically between a lower post end 602 and an upper post end 604. The lower post end 602 may be connected to the lower base 676. The post member 674 and the lower base 676 may include at least one set (a pair) of vertically aligned slots 686, 688, where the set of vertically aligned slots may include a vertically extending slot 686 disposed along a length of the post member 674 and a horizontally extending slot 688 that is disposed in the lower base 676 and extends radially outwardly from the lower post end 602.

One or more outlets 600 (e.g., power outlet or data outlet) may be disposed at a predetermined height on the post member 674 (e.g., disposed in the upper portion 606 of the post member 674). The length of the post member 674 and the height of the outlets 600 may be configured to provide easy access to power and/or data according to human factors and ergonomics.

The post member 674 may have any suitable configurations. As shown in FIG. 25D, for example, the post member 674 may have a generally square cross section with four vertically extending side panels 608. Adjacent two side panels 608 may be respectively connected at four corners. In this embodiment, the post member 674 and the lower base 676 may include four sets (first, second, third, and fourth sets) of vertically aligned slots 686, 688 respectively disposed at the four corners. Two sets (first and third sets) of vertically aligned slots that are respectively disposed in the two corners (e.g., corners 614, 616) that are not located between adjacent side panels 608 may be aligned in a first plane. The other two sets (second and fourth sets) of vertically aligned slots that are respectively disposed in the other two corners (e.g., corners 620, 624) that are not located between adjacent side panels 608 may be aligned in a second plane. In some embodiments, each pair of the adjacent two side panels 608 may be perpendicular to each other such that the first plane may be perpendicular to the second plane.

In some embodiments, the lower base 676 may include one or more arms 680 that extend radially outwardly from the lower post end 602, with a slot disposed along the arm. In the embodiment as shown in FIG. 25D, for example, the lower base 676 may include four arms 680 that extend radially outwardly from the lower post end 602 at the four corners respectively.

In some embodiments, the table base component 618 may include a handle 612 connected to the upper post end 604, which provides the ability for easy moving of the base component. As shown in FIG. 25D, for example, the handle 612 may have a generally arc-shaped configuration extending between two ends that are respectively connected to two corners of the upper post end 604. Any suitable configuration of the handle 612 may be possible without departing from the scope of the present invention.

In some embodiments, one or more (e.g., all) sets of the vertically aligned slots 686, 688 may include at least one attractive component 610 disposed along at least a portion of a length of the post member 674. As shown in FIG. 25D, for example, the attractive component 610 may be disposed in the corner 614 and extends from the lower post end 602 to the upper post end 604. The attractive component 610 may include at least one magnetic component (e.g., magnets or metal) such that an edge (with a corresponding magnetic component attached thereon) of an accessory component (e.g., a screen) may be received within the slot in the respective corner and be held upright through attractive force.

Figure 25E:
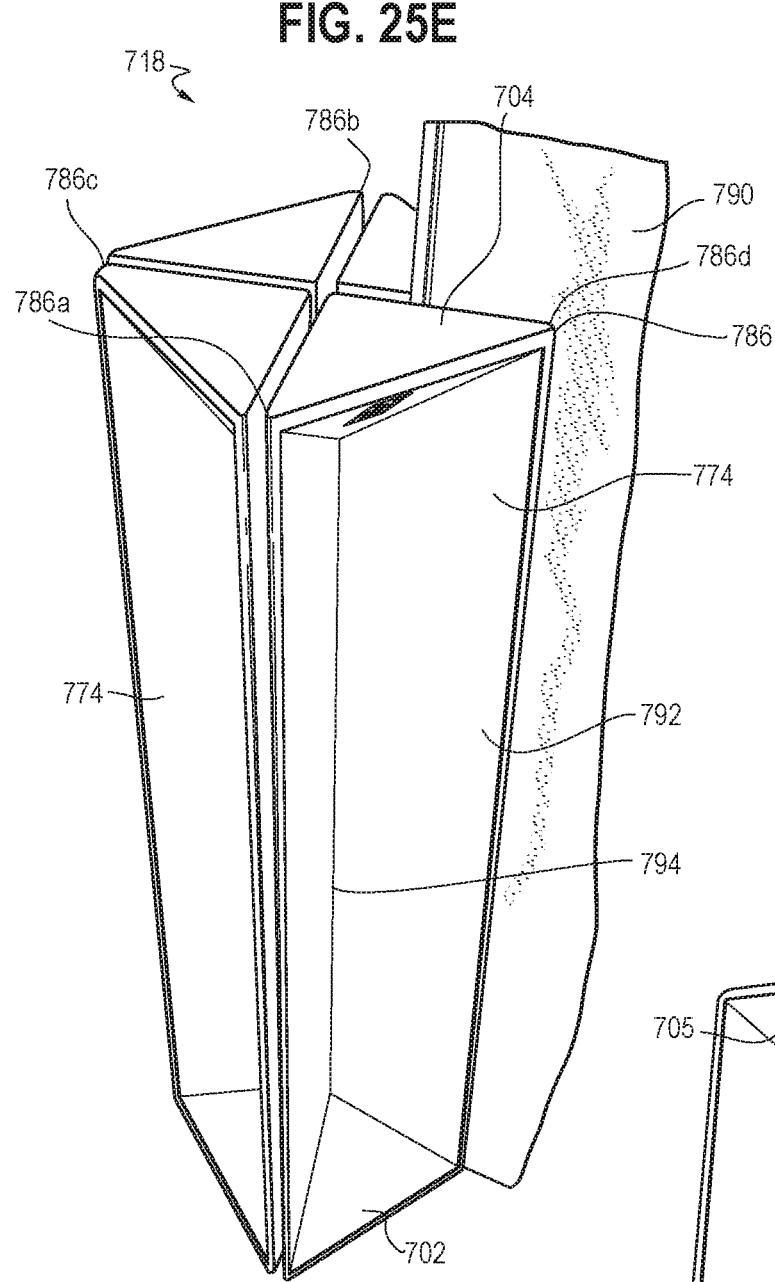
FIG. 25E is a perspective view of an embodiment of a base component with a plurality of posts.

In some embodiments, as shown in FIG. 25E, the table base component 718 may include at least two posts 774 extending vertically between their respective lower post ends 702 and upper post ends 704. In this embodiment, a lower base connected to the lower post end of the post member may be optional and the lower post ends 702 may serve the same purpose of the lower base to provide support when the base component is positioned on a surface. The at least two posts may be configured such that a slot may be vertically disposed therebetween along a length of the at least two posts. As shown in FIG. 25E, for example, the slot 786 may extend from the lower post end 702 to the upper post end 704 and may be configured to receive therein an edge of an accessory component 790 and hold the accessory component 790 upright between the at least two posts. The at least two posts may be connected such that they form a unitary configuration.

Figure 25F:
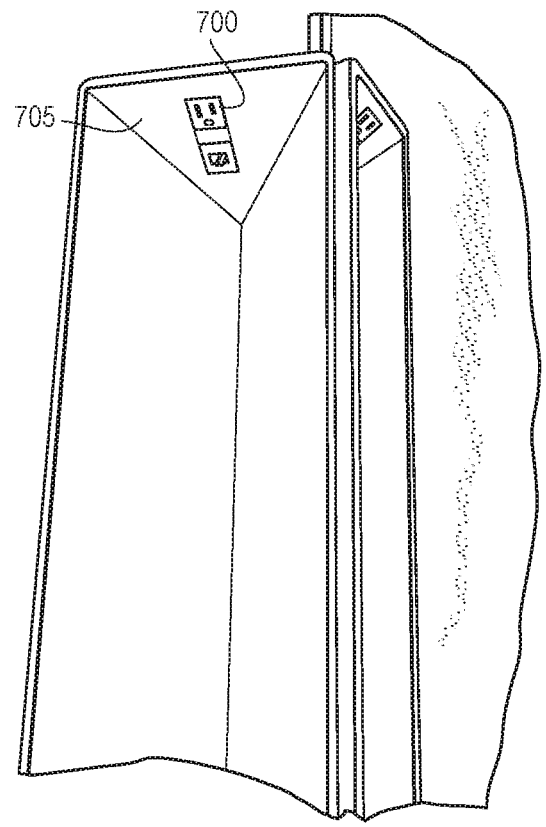
FIG. 25F is another perspective view of the the base component shown in FIG. 25E, with the outlets disposed on the post.

In some embodiments, each post may include a side panel 792 that extends between and connected to the respective lower post end 702 and upper post end 704, such that an opening 794 may be formed between the respective lower post end 702 and the upper post end 704. In some embodiments, the opening 794 may be bounded by the respective lower post end 702, the side panel 792, and the respective upper post end 704, as shown in FIG. 25E. In other embodiments, the opening 794 may extend along a portion of the length of the side panel 792. In some embodiments, as shown in FIG. 25F, the opening 794 may be configured such that the bottom surface 705 of the upper post end 704 may be reachable through the opening 794. One or more outlets 700 (e.g., power outlet or data outlet) may be disposed on the bottom surface 705 to provide easy access to power or data, as discussed above.

The number of posts and the configuration of each post (e.g., shape and dimension of the upper and lower post ends, the length of the post) may be varied, without departing from the scope of the present invention, to achieve desired holding purposes and/or other functions. As shown in FIG. 25E, for example, the table base component 718 may include four posts 774 that are connected together and extend vertically between their respective lower post ends 702 and upper post ends 704. Four slots 786 may be disposed between respective adjacent two posts 774 along a length of the adjacent two posts. Each slot 786 may be configured for receiving an edge of an accessory component and hold the accessory component upright between the respective adjacent two posts.

As shown in FIG. 25E, for example, the upper post end 704 and the lower post end 702 of each post 774 may have a generally triangular configuration. The four posts 774 may be positioned such that the upper post ends 704 of the four posts 774 may form a generally square surface having four corners. Four slots 786 may respectively extend radially inwardly from the four corners. In some embodiments, two of the four slots (e.g., 786a and 786b) may be aligned in a first plane, and the other two of the four slots (e.g., 786c and 786d) may be aligned in a second plane. The first plane may be perpendicular to the second plane.

Figure 25G:
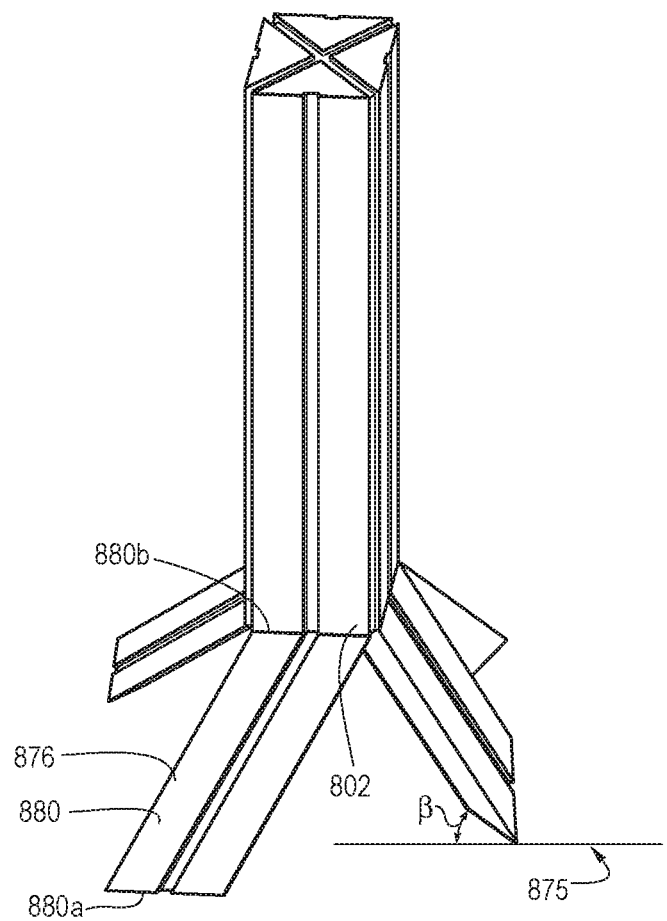
FIG. 25G is a perspective view of an embodiment of a base component with a lower base including a plurality of support members that extend at an angle relative to a planar surface.

In some embodiments, as shown in FIG. 25G, the lower base 876 may include a plurality of support members 880 that extend between their respective lower ends 880a and upper ends 880b. The upper ends 880b of the lower base 876 may be connected to the lower post end 802 such that when the lower ends 880a of the lower base 876 are placed on a planar surface, each of the support members 880 may extend upwardly at a predetermined angle 3 relative to the planar surface 875. The number and configuration of the support members and the angle 3 may be varied, without departing from the scope of the present invention, to achieve a desired stability and height of the base component. As shown in FIG. 25F, for example, the lower base 876 may have three support members 880 that are connected to the lower post ends 802 to provide support and stability when the base component is placed on the planner surface.

Referring to FIGS. 12, 26, 27A-C, 28 and 29, various cart base components 12, 14, 16 are shown. In a first embodiment, shown in FIG. 26, the cart base component 12 includes a plurality of vertically spaced horizontal worksurfaces 89, 90, 92 with the bottom worksurface 92 defining a floor portion of a frame 110. The frame further includes a plurality of vertical support members 94, which extend upwardly from the floor 92 and are secured to the four corners of the first and second upper worksurfaces 89, 90, or include horizontal cross bars 91 that support the ends of the worksurfaces. The worksurfaces 89, 90 or cross bars 91 include a post 93 extending outwardly therefrom, which functions as an accessory interface. The support members extend vertically above the uppermost worksurface 89 and includes a U-shaped upper rail 96 connected to the four support members. The end 98 of the rail overlies a corresponding bottom tray 100 portion of the floor, with the end of the rail and floor portion extending longitudinally outwardly from the support members. The end 98 of the rail provides a grippable handle for the user. At an end of the floor opposite the handle, a pair of larger wheels 102 are rotatably coupled to the frame, for example the floor 92. At the end of the floor adjacent the handle, a pair of casters 104 are coupled to the frame, for example the floor 92. The wheels are rotatable about a horizontal, lateral axis, while the casters are rotatable about a horizontal axis, which in turn is rotatable about a vertical axis.

Referring to FIGS. 27 B and C, the upper worksurfaces are omitted, with the cart base component 14 including only a bottom worksurface 92 defining the floor portion of the frame.

Figure 28:
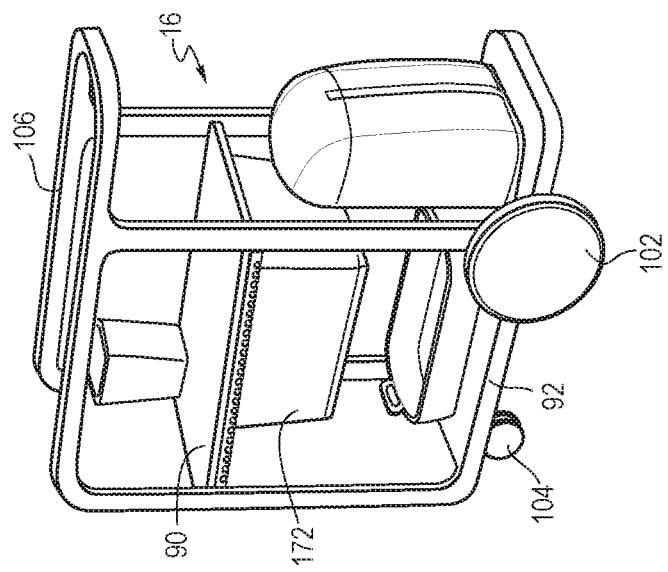
FIG. 28 is a perspective view of a third cart base component.

Referring to FIGS. 12 and 28, a cart base component 16 includes a single upper worksurface 90 and a lower worksurface 92. The cart has a frame 106. The frame 106 is shorter in length and height than the frame 110 of the first cart base component, but otherwise is configured with a pair of wheels 102 and a pair of casters 104.

Referring to FIGS. 12, 31 and 32, a tower base component 20 includes a plurality of stacking blocks 112, 114, 116 that are stacked one on top of the other to form the tower. The stacking blocks 112, 114, 116 are progressively tapered, from bottom to top (or vice versa), such that the height H3 of the overall tower has a tapered configuration. In addition, the depth (D) of each tower stacking block is at least 30% (and preferably about 40%) of the width (W) along any vertical location, or along the height of the block. In addition, the width (W) of the tower is between 70 and 120% of the width of the worksurface 22, measured between the opposite sides 30 thereof. The stacking blocks each define a horizontal interface 118. The tower stacking blocks are made of PET, and are tackable. Each block has a plurality of vertical lines 120, e.g., pleats, including at least some non-linear lines, which do not intersect, but rather are undulating, so as to provide a bark-like appearance. At the same time, the lines are aligned at the horizontal interfaces between the blocks. One or more handles 121 are secured to at least the lowermost block 112, and may be gripped to roll the tower on the floor via wheels 122 (e.g., casters) secured to the bottom of the lowermost block.

Accessory Interface Components:

Referring to FIG. 12, each base component is configured with a plurality of accessory interface components. For example, as shown in FIGS. 13 and 14, a first accessory interface component is configured as a post 124 that is fixedly connected to, and extends diagonally outwardly and upwardly from each support leg 36. The post functions as a grippable handle, and a post 124 is preferably connected to at least both of the support legs opposite the legs supported by the wheels 44, such that the table may be lifted at the end opposite the wheels and guided by the user to a desired location.

Referring to FIGS. 14, 16, 17 and 26, a second accessory interface component is configured as a rail 126, which is fixedly secured to the bottom side of one or more of the worksurfaces coupled to the cart and/or table base components. The rail includes a plurality of longitudinally spaced and laterally extending channels 128, preferably formed in a horizontal plane. In one embodiment, the channels have a cross section, and are open along the bottom, forming a mouth 130. The width W1 of the mouth is less than the cross-sectional width W2 of the channel 128, defined in one embodiment as a diameter of a circular cross-section. The mouth defines a track running the length of the rail 126 in the lateral direction.

Figure 30:
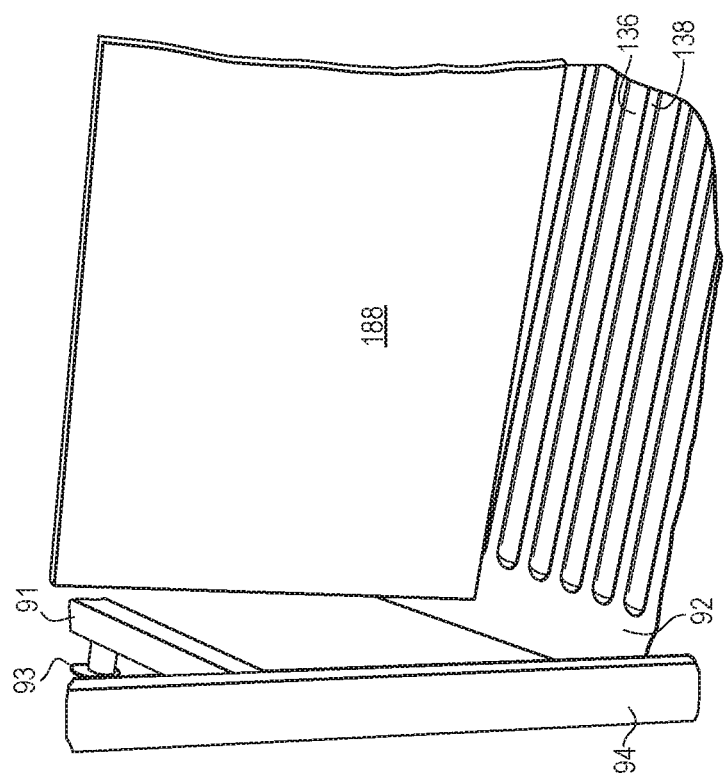
FIG. 30 is a partial view of a portion of the second cart base component configured with an accessory interface.
Figure 29:
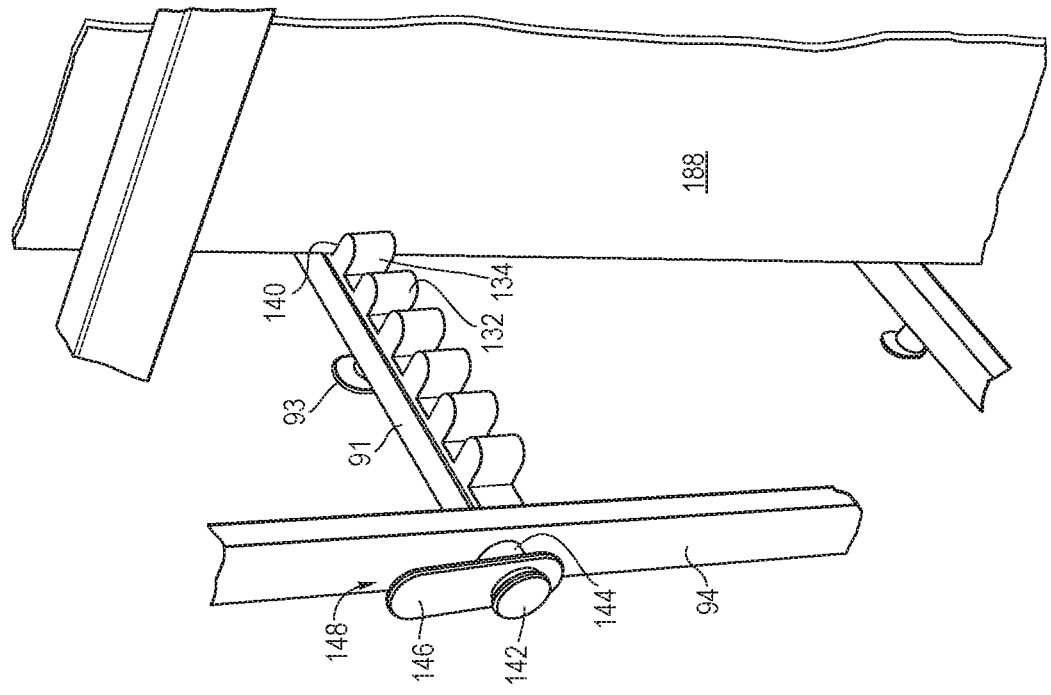
FIG. 29 is a partial view of a portion of the second cart base component configured with an accessory interface.
Figure 33:
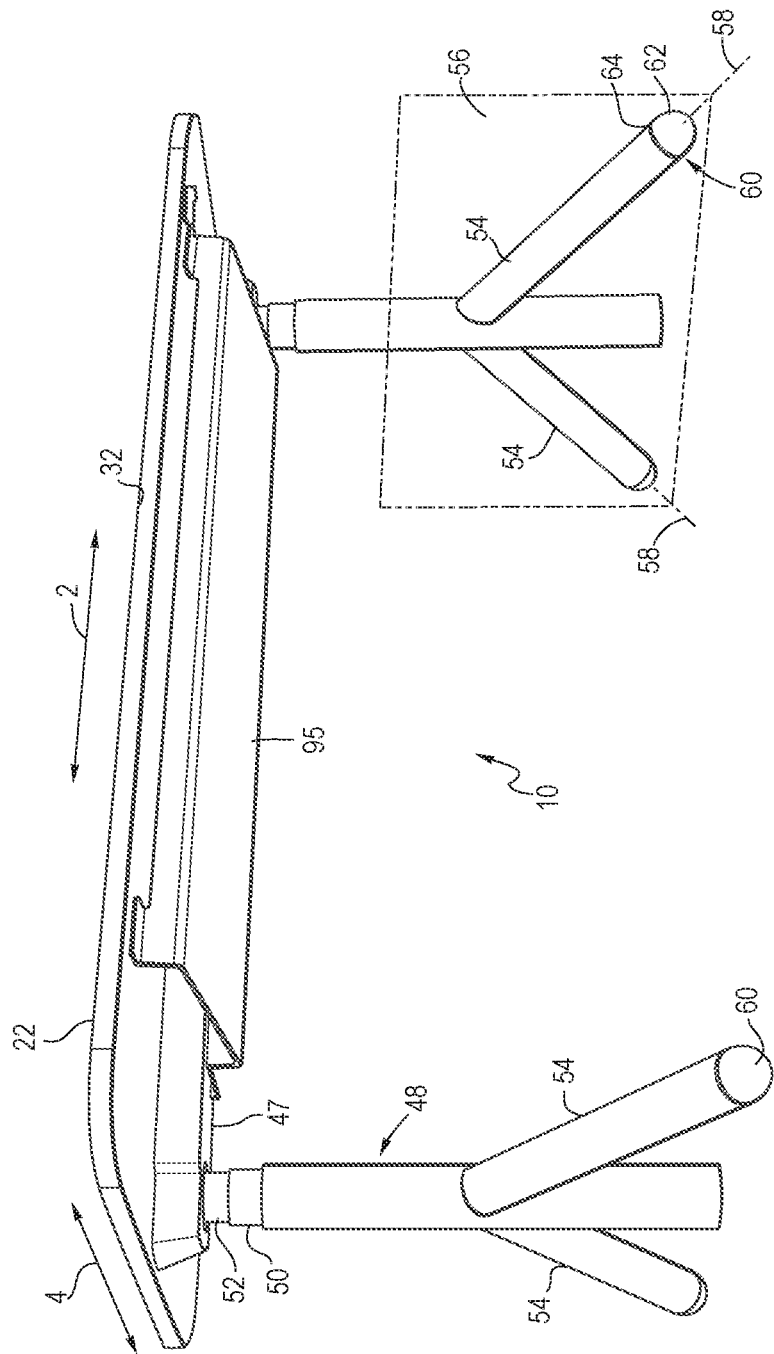
FIG. 33 is a perspective view of an adjustable height table base component in a lowered configuration.
Figure 38:
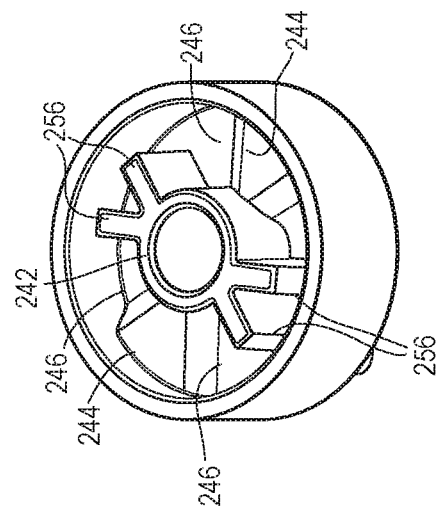
FIG. 38 is a top perspective view of a clip base.

Referring to FIGS. 29 and 30, other accessory interface components include a rail 140 having a plurality of laterally spaced and vertically oriented channels 134 defined by deformable fingers 132, and a plurality of longitudinally extending ribs 136 formed on an upper surface of the floor. The spaces 138 between adjacent ribs are aligned with the channels 134 of the rail 140.

Figure 26:
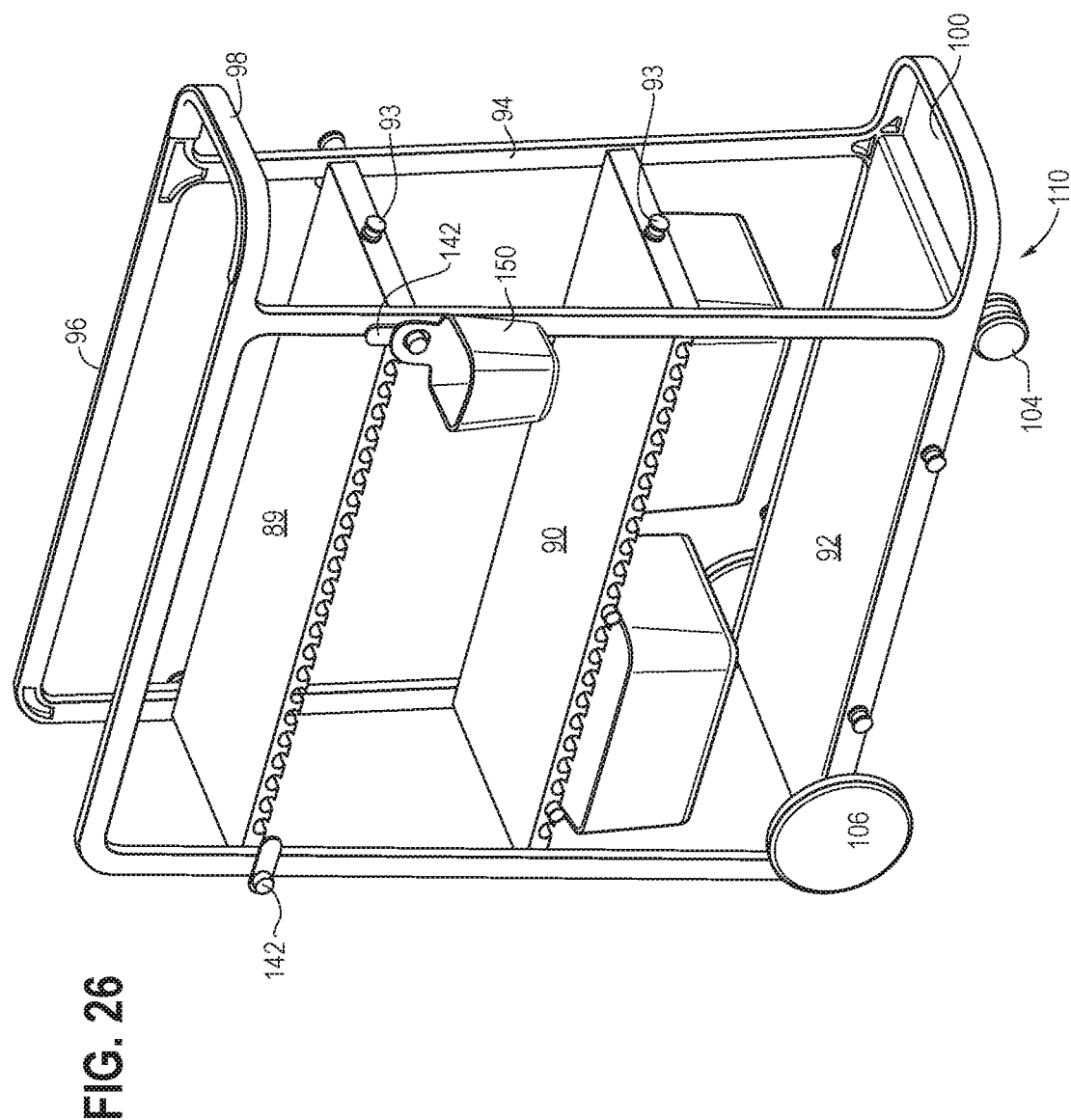
FIG. 26 is a perspective view of a first cart base component with a plurality of accessory interfaces and accessories applied thereto.

Referring to FIG. 26, another accessory interface component is configured as the first and second sets of grooves 86, 88 formed in the base and worksurface.

As shown in FIG. 29, another accessory interface component is configured as a rotatable clip member 142. The clip includes a base member 144 secured to the frame of the base component cart or wall, and a rotatable arm member 146 that may be rotated between at least a vertical and horizontal position. The arm portion defines a channel 148 opening either upwardly, when in the vertical position, or sidewardly, when in the horizontal position, as shown in FIGS. 40A and B.

Referring to FIGS. 37-40B, the base 144 is cylindrical, and is non-rotatably mounted to a base component, such as one of the carts, tower or tables. A clip/holding portion 232 has a cylindrical body 234 with an opening 236 that is axially aligned with the base. The arm 146 extends radially outwardly from the body 234. The end of the arm has an enlarged portion (bump) 238 extending axially in the direction of the base 144. The base 144 has an annular recess 240 with an X-shaped hub 242. On opposite sides of the hub, the bottom of the recess has a middle raised portion 244 flanked by a pair of pockets 246 adjacent the V-portions 256 of the X-shaped hub 242, with the V-portions acting as stops.

Figure 39:
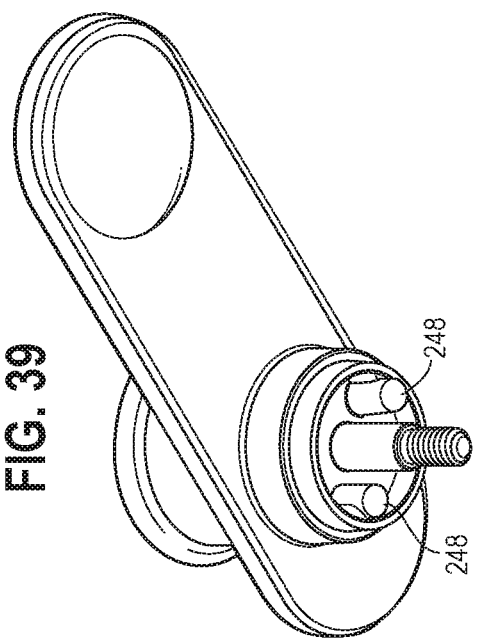
FIG. 39 is a bottom perspective view of a clip holding portion.
Figure 37:
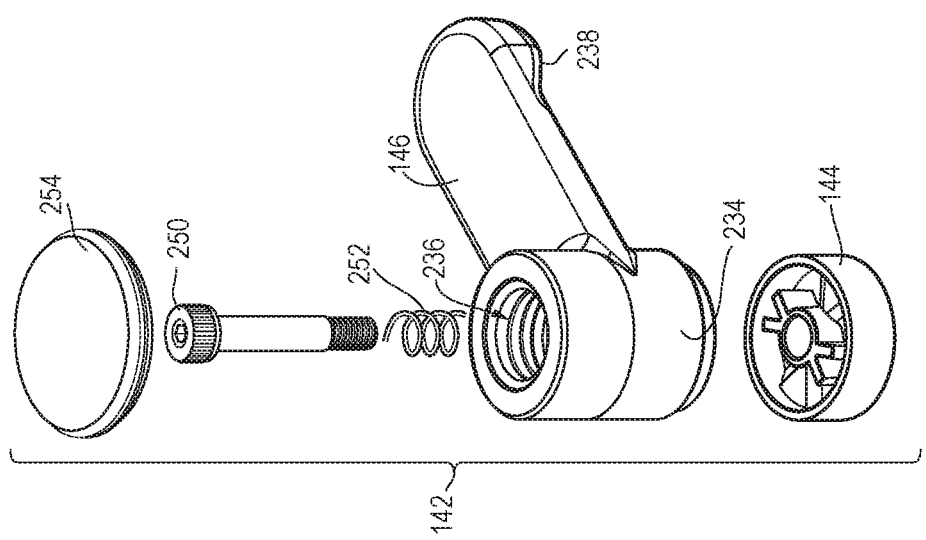
FIG. 37 is an exploded view of a clip accessory interface.

Referring to FIG. 39, the body of the clip has a pair of stops 248 extending axially from the body. The stops are received in the pockets on opposite sides of the X-shaped hub of the base 1. As shown in FIG. 37, a bolt 250 secures the clip to the base, with a spring 252 disposed between the body and the bolt head such that the body 234 may be drawn away from the base 144 against the biasing force of the spring 252. A cap 254 is screwed to the body 234 over the cavity in which the bolt is installed.

In operation, the stops 248 are disposed in a pair of opposing pockets 246. The user may lift the clip arm 146 axially away from the base 144 against the biasing force of the spring 252 and rotate the clip 90 degrees between first and second positions until the stops 248 are aligned over the other pair of opposing pockets 246, with the clip then being released. In this way, the clip may be rotated 90 degrees between a horizontal position (FIG. 40A), wherein the clip arm may engage various documents or hold the side of a screen, to a vertical position (FIG. 40B), wherein the clip arm may function as a hook to hold various items, or support the bottom of a screen.

The raised portion 244 and pockets 246 define detents, which interface with the stops 248 to lock the clip in place. Further rotation of the clip is limited by the stops 248 engaging the V-portions 256 of the hub (e.g., the range of motion is 90 degrees). The spring 252 maintains the clip in the two positions, and further applies a biasing force against the object being held. The clip may also simply be rotated, with the raised portion of the bottom of the recess acting as a cam to move the clip away from the base until the second position is reached, wherein the spring draws the stop back into the second pair of pockets. The enlarged portion/bump engages the object to be held.

In addition, posts 93 extend outwardly from the tower surface, or from the frame member 91, and function as accessory interfaces, for example to support screens or various storage containers and pouches. The posts 93 are configured with a cap or enlarged end portion, which holds or retains accessories on the post.

As shown and disclosed, each of the accessory interface components (posts, rail, channels, grooves, clips, etc.) has a different shape than the other accessory interfaces, meaning for example that a post 124 has a different shape than the rail 126. Conversely, accessory interfaces having the same shape, e.g., posts 124, may be fixed to different base components. The phrase "same shape" refers to a component having the same geometry and dimensions, while components with "different shapes" have different geometries and dimensions. It should be understood, however, that rails with a plurality of identical channels, but different overall lengths (i.e., different numbers of channels), are the same shape. In other embodiments, posts 93 having the same shape, clips 142 having the same shape, grooves 86, 88 having the same shape, and/or rails 124 having the same shape may be fixed to different base components. As disclosed, a plurality of accessory interface components having the same shape may be applied to a single base component.

Figure 20:
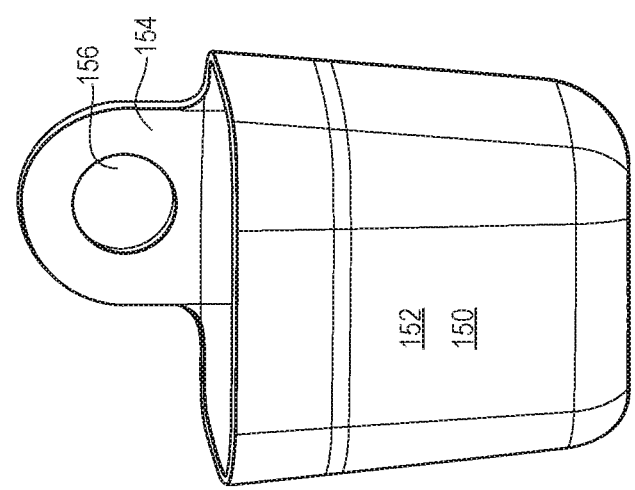
FIG. 20 is a front perspective view of a cup accessory.

Accessory Components:

Referring to FIGS. 13 and 14, various accessories, or accessory components, are shown with different structures configured to releasably engage one or more of the accessory interface components. For example, and referring to FIG. 20, a storage container or device is configured as a cup 150 having a bowl 152 portion and a hanger 154 extending upwardly from the bowl. The hanger has an opening 156 sized and shaped to receive the post 124 accessory interface, such that the cup may be releasably engaged on the post. The phrase "releasably engaged" means the accessory component is held or supported by the accessory interface component in a static relationship without other support from the user, but may be separated or disengaged from the accessory interface by lifting, sliding or other dynamic movement.

Referring to FIGS. 13-15, another storage device includes a pouch 158 accessory configured as a flexible sheet, defined in one embodiment as a rectangular sheet with openings 160 at the four corners thereof, with the openings sized and shaped to receive the post accessory interface 124. The sheet may be folded over with both corners 162 at each end of the sheet being disposed on a single post (see FIGS. 14 and 18) such that the sheet forms a pouch in which various utilities, such as data and power cords 164 and lines may be run and stored in a cavity formed by the pouch. Alternatively, the corners 162 may be secured to the posts 124 extending from the support legs of adjacent tables positioned back-to-back as shown in FIG. 13. Again, the sheet defines a pouch in which various utilities 164 may be stored or run.

Referring to FIGS. 16 and 18, a hanger 166 is shown as having a T-shape, with a post 168 sized and shaped to be inserted into one of the channels 128 defined by the rail accessory interface. The hanger may be rotated, with an end plate 170 preventing various items secured to the post from slipping off the hanger.

As shown in FIGS. 17, 22, 23 and 26, various storage container accessory components may be releasably engaged with the rail accessory interface. In one embodiment, the storage container is configured as a bin 172 with a substantially rectangular storage base, or tub 180, and a pair of handles 174 extending along opposite sides of the bin above the storage base. As shown in FIGS. 22 and 23, the storage bases may have different depths. The handles define guides 178 that have a neck portion 176 that is more narrow that the cross-section of the guide. The guide is sized and shaped to be received in the channels 128, while the neck is sized and shaped to be received in the mouth 130 defining a track. The bin is engaged with the rail by sliding the guide 178 in the channel 128 until the bin is secured beneath the worksurface.

The bin may be partially slid outwardly to expose the contents therein, while maintaining a connection with the rail.

Figure 21:
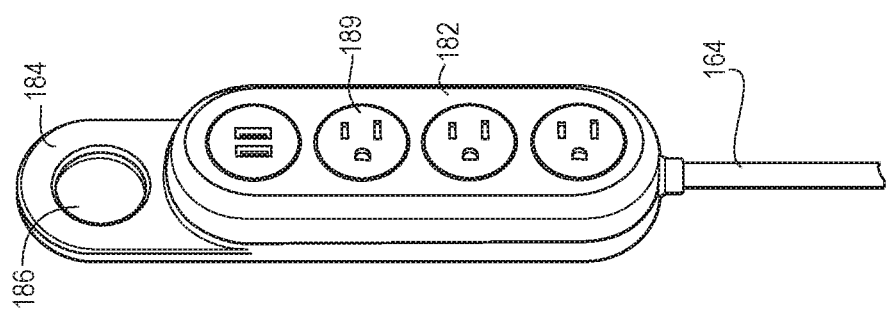
FIG. 21 is a front perspective view of a power block accessory.

Referring to FIGS. 18 and 21, a power block 182 includes a block portion having a plurality of outlets 189, which may be power or data (e.g., USB port) and a hanger 184 with an opening 186, which is also sized and shaped to receive the post 124, or may releasably engaged with post 93 or clip 142.

Figure 27A:
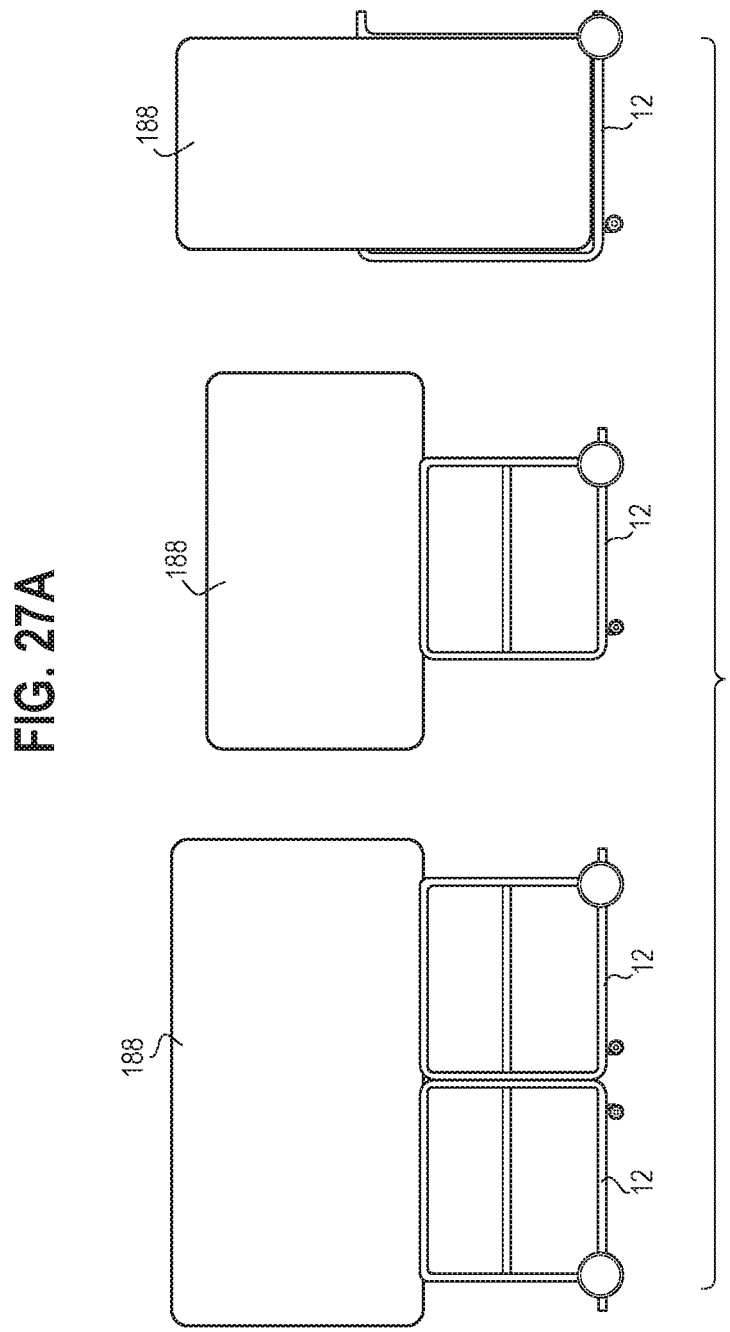
FIG. 27A shows a plurality of cart base components with various screen accessories being carried thereby.
Figure 27B:
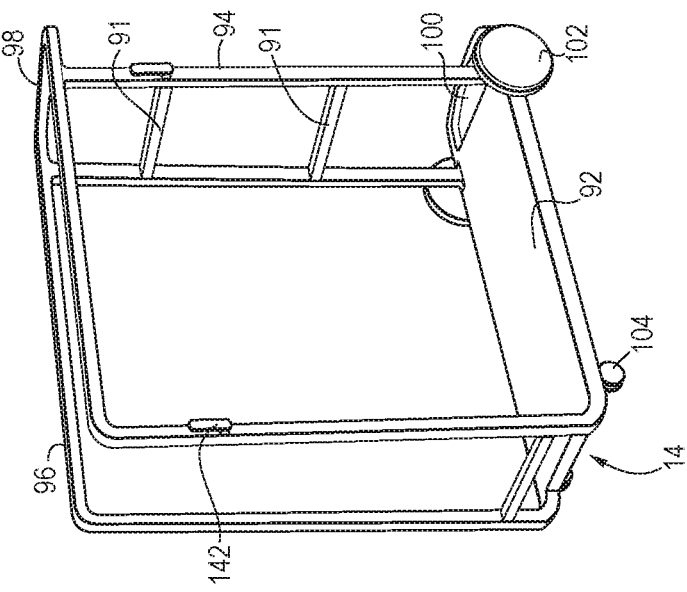
FIG. 27B shows a second base cart base component.
Figure 27C:
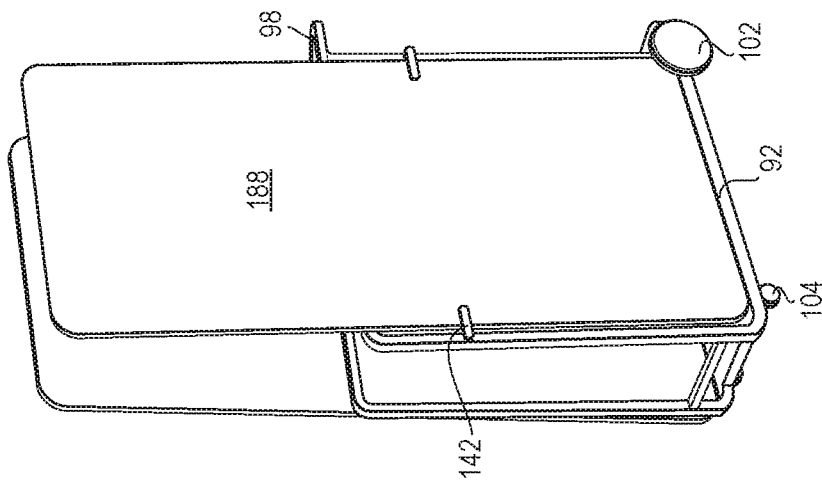
FIG. 27C shows the second cart base component with a plurality of screen accessories supported thereon.

Referring to FIGS. 24, 27A and 29-32, an accessory component is configured as a screen 188. The screen may have a rectangular shape, and may be arranged in a portrait or landscape orientation. The screen has a thickness allowing it to be supported by the clips 142, oriented in the vertical and horizontal position, with the screen received in the channels 148 formed thereby as shown in FIGS. 27A, 31 and 32. As shown in FIG. 24, the screen also has a thickness allowing it to be received in the sets of grooves 86, 88. As shown in FIG. 25C, a plurality of screens 490 may be configured such that the screens may be oriented in the vertical position and received within the vertically aligned grooves 486, 488. As shown in FIG. 25E, a plurality of screens 790 may be received in the slots 786 vertically disposed between adjacent posts 774 and be held upright. As shown in FIGS. 29 and 30, a plurality of screens may be received in the channels 134 and spaces 138 between the ribs 136, for example for storing or transporting the screens. The screens may have a writable and erasable outer surface, such as a white board, and may be tackable. In one embodiment, the screens are made of fiberglass. As shown in FIG. 35, a pair of flexible screens 215 may be disposed adjacent a rear and ends of the worksurface 22, with the screens being mounted directly to the edge of the worksurface via magnets, or to mounting brackets secured to the worksurface. The attachment points for the screens are not vertically symmetrical, such that the screens may be mounted in a privacy configuration (greater amount of screen above the worksurface) or a modesty configuration (greater amount of screen below the worksurface).

Referring to FIGS. 8, 9 and 41-49, a plurality of screens 188 may be connected with a connection arrangement 300 to form different and varying screen arrangements. The screen arrangements may be free-standing, meaning the screens support themselves in an upright position, or may be secured to adjacent base components. In some embodiments, as shown in FIGS. 25C and 25E, a plurality of screens may be secured to adjacent base components to form desired arrangements, such as two screens being oriented about 180 degrees relative to each other (e.g., as shown in FIG. 25C), two screens being oriented about 90 degrees relative to each other, three screens being oriented in a T-shaped configuration, and four screens being oriented in a +-shaped configuration. In some embodiments, a plurality of screens may be secured to adjacent base components through attractive force. For example, as shown in FIG. 25D, the attractive component 610 (e.g., magnet or a ferromagnetic material that is attracted to a magnet) may be disposed along at least a portion of the vertically aligned slots 686, 688, such that the screen received in the slots 686, 688 may be secured in an upright position through the attractive force between the attactive component 610 and the edge of the screen. The screen may have two opposite edges, one edge including magnets and the other edge including a ferromagnetic material (e.g., metal) that is attracted to a magnet. In one embodiment, the screens have a width of 36 inches and a height of 72 inches, are 0.50 inches thick and weigh less than 10 lbs. Each of the screens includes a panel, which may be formed by a frame assembly 302 overlaid with a fabric cover 304. The screens have opposite sides 306, 308, opposite side edges 310, 312, a top edge 314 and a bottom edge 316. The screens may include rounded corners, and may be of different heights. As shown in FIG. 51, a screen 388 may have a polygonal shapes other than a rectangle, such as an irregular pentagon, with an angled edge 340 extending between a top edge 314 and one of the side edges 310, 312. Referring to FIGS. 41-49, a sheath 318, 320, configured in one embodiment as a tube made for example of fabric, extends along and defines each of the side edges 306, 308 of the screen. In one embodiment, the flexible sheath 320 located on one side edge 308 of the screen is shaped to receive a plurality of spacers 322 and magnets 324 stacked along a length thereof, while the sheath 318 on the other side edge 306 is shaped to receive a ferromagnetic material (attractive component 326), such as a metal rod or cable, meaning the material is attracted to magnets. A cable attractive component is flexible and is relatively soft during an impact, for example if the panel falls. In one embodiment, the sheath 318, 320, or pocket, is formed by folding a piece of fabric material and sewing the edge to form the pocket. The tube, or pocket, may be dimensioned to accommodate different sized magnets 324, spacers 322 and attractive components 326 (e.g. rods/cables), including for example having an interior cross-section of 0.25 inches in diameter. The magnets may have a cylindrical shape, or may be oblong, hexagonal or rectangular with rounded corners in cross-section. For example, as shown in FIGS. 52 and 53, one embodiment of a magnet 324 has an elongated body with a cross-section having an obround shape with opposite parallel sides 424 and opposite convexly curved or rounded ends 426.

Figure 42:
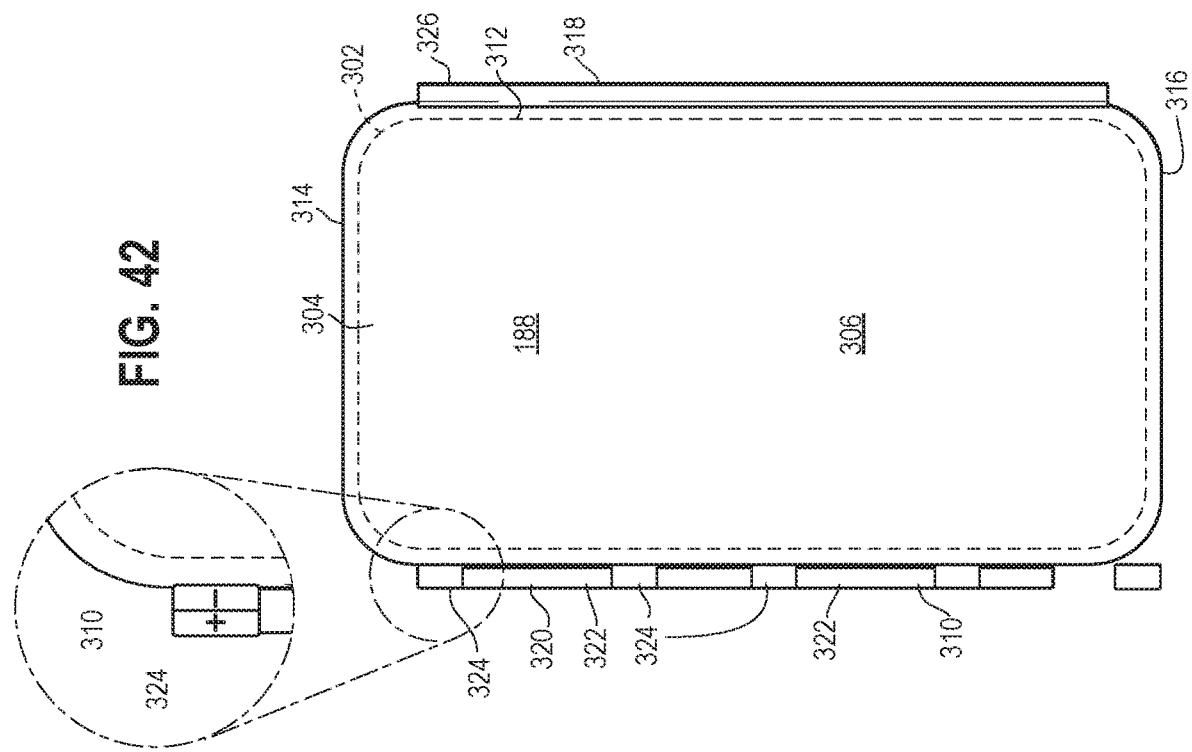
FIG. 42 is a front view of one embodiment of a screen accessory.
Figure 41:
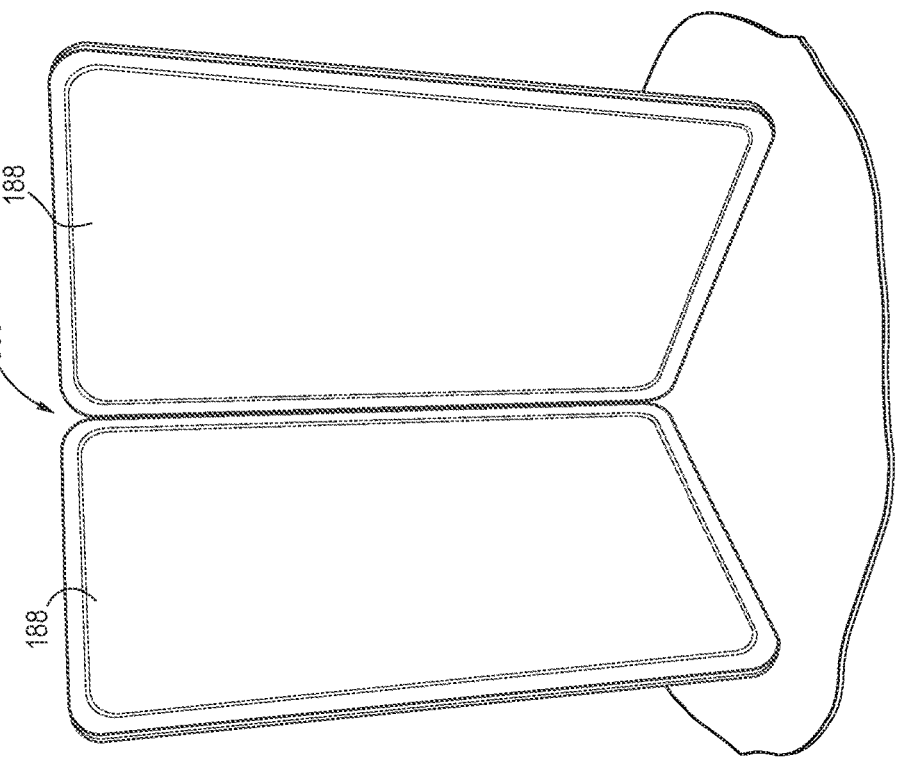
FIG. 41 is a front view of a pair of screens in a privacy screen arrangement.
Figure 44:
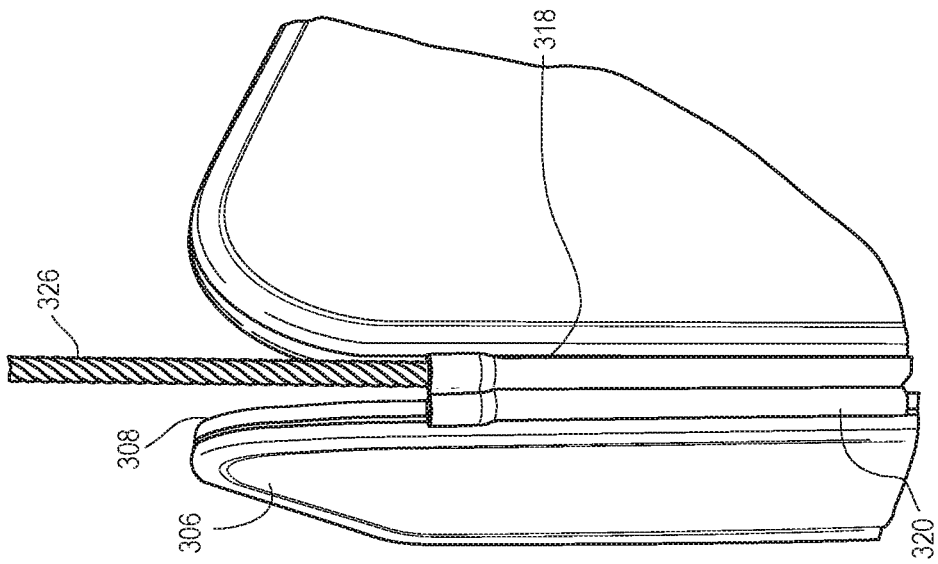
FIG. 44 is an enlarged partial view of the junction formed by the pair of screens shown in FIG. 41.
Figure 43:
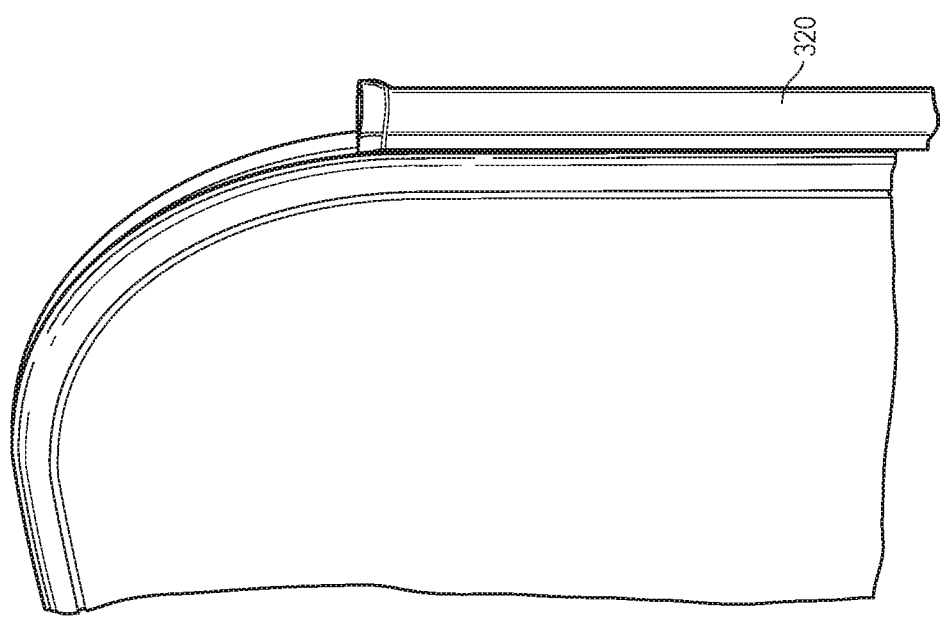
FIG. 43 is an enlarged partial view of the screen accessory.

Referring to FIGS. 42-44, in one embodiment, a cable attractive component 326 is inserted into the sheath 318 formed along one side edge 312 of the panel. The opposite sheath 320 is lined with a magnetic array. In one embodiment, the array includes a vertical stack of a plurality of magnets 324 (shown as 5) vertically spaced apart by a plurality (shown as 4) of non-magnetic spacers 322. The poles of the magnets 324 are aligned such that the positive poles are facing away from the panel.

Figure 45A:
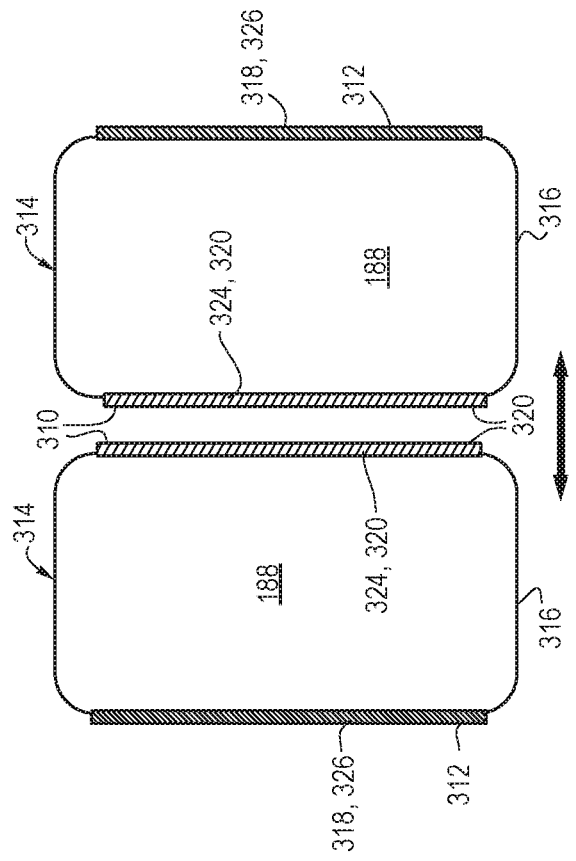
FIGS. 45A and B are front views of a pair of screens in a disengaged and engaged positions respectively.
Figure 45B:
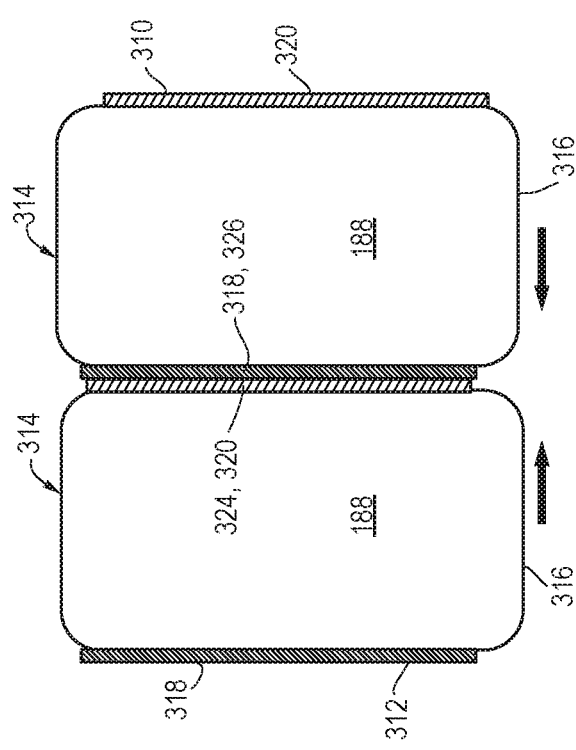

Referring to FIGS. 45A and B, the adjacent panels are "handed," meaning one side edge 310 is magnetic and the other side edge 312 is attractive. It should be understood that both side edges 310, 312' could be configured with magnets 324 and spacers 322 as shown in FIG. 48. In this embodiment, the magnets may be positioned with opposite polarities facing outwardly from the screen, or the magnets may be allowed to spin within the sheaths such that the poles self-align when connecting to an adjacent panel. At the same time, two adjacent magnetic side edges 310, each with an outwardly facing positive pole (or both with outwardly facing negative poles) magnetically repulse each other (FIG. 45B).

The magnets 324 and attractive components 326 couple adjacent screens without any additional user input or separate fasteners. Rather, the screens attract passively when in proximity. The cross sections of the attractive component 326, magnets 324 and spacers 322 allow the screens to be rotated into different screen arrangements. For example, as shown in FIGS. 46A-D, two connected screens may be rotated from a first position, wherein a first side 308 of a first screen is located adjacent a first side 308 of a second screen (FIG. 46A) to a second position (FIG. 46B) wherein the screens are orthogonal, to a third position (FIG. 46C) wherein the screens form an obtuse angle (e.g. 120 degrees), to a fourth position (FIG. 46D) wherein a second side 306 of the first screen is located adjacent a second side 306 of the second screen, providing a 360 degree sweep between the first and fourth positions. Of course, it should be understood that the screens may be located at any relative angle between the first and fourth positions. In essence, the connection between the magnets 324 and attractive component 326 acts as a pivot connection between the screens.

Referring to FIGS. 47A-D, 50 and 51, more than one screen, each having a side edge 310 with magnets, may be arranged around a panel having an attractive component along one side edge 312. Three panels may be arranged in different configurations, including without limitation a T-shape (FIG. 47B) or a Y-shape (FIG. 47C). In another arrangement, four panels, one with side edge 312 having an attractive component 326 and three with side edges 310 having magnets 324, may be coupled together in an X-shape as shown for example in FIG. 47D.

As shown in FIG. 50, one exemplary screen arrangement or configuration includes a plurality of screens 188 (shown as four) arranged end-to-end to define a spine, with the understanding that the screens may be aligned in a linear configuration, or angled relative to an adjacent screen when viewed from above. In addition, outrigger screens 350 may be coupled to the joint or connection arrangement 300 between a pair of screens to define additional spaces, with the spine screens 188 and outrigger screens 350 providing support for the free-standing screen configuration or assembly. As noted, the screens may be assembled in the desired configuration tool-free. The screens may be of different heights, and may have different shapes. As shown in FIG. 51, a workspace may be defined by a plurality of screens coupled along their edges and defining a perimeter 202 of a workspace, again, with the angled spine screens 188, 388 and outrigger screen 350 providing stability and allowing the configuration to be free standing. In other embodiments, the screens may be secured to adjacent structures, for example by way of magnetic attraction.

As shown in FIG. 49, various display items 330, such as documents, pictures, white boards, screen overlays, etc. may be secured to the panel by magnetic attraction between a mounting member 332 secured to the edge of the item and one of the magnets 324 arranged along the side edge 310 of the panel. In one embodiment, the mounting member 332 is configured as a clip engaging the edge of the display item 330. In this way, such items 330 may be easily and removably displayed without additional fasteners or penetration of the item.

Conversely, the screens may be secured to any ferromagnetic surface, such as a metal surface or structure. For example and without limitation, the screen may be releasably and magnetically coupled to metal (e.g., steel) cabinets, case goods, seating structures, beds, I-beams, support columns, mounting rails, or various magnetic whiteboards.

As is readily apparent from the disclosure, the various accessories, e.g., power cord, power block, screens, storage devices, personal bags, cups, etc., have different structures relative to the other accessories, but may releasably engage the same type of accessory interface. For example, the power block and cup, which have different structures, are both releasably engagable with the posts 124. Conversely, one type of accessory may releasably engage differently shaped accessory interfaces. For example, a screen may interface with the grooves 86, 88 on the pedestal table, the channels 134 in the cart and the spaces defined by the clips 142 secured to the tower and/or carts.

Workspace System:

Referring to FIGS. 1-11, various workspace configurations are shown as including a plurality of base components, including table base components 6, 8, 10, 18, cart base components 12, 14, 16, and tower base components 20.

In one embodiment, a workspace system includes first and second base components which are different configured, for example with one base component, e.g., a table 6 or a cart 12, having an uppermost surface vertically spaced from the uppermost horizontal surface of another base component, e.g., another table 8 or cart 14. Each of the first and second base components is configured with the same type of accessory interface, for example a post 124, rail 126 or clip 142. One of the first and second base components is also configured with another type of accessory interface different than the common accessory interface component secured to both of the first and second base components, for example another of a post, rail or clip. The system further includes at least one first accessory configured to be releasably engaged with the at least one first accessory interface connected to the first base component, wherein the at least one first accessory has a first structure, including for example a storage container, such as a bin 172 or cup 150, a screen 188, a power block 182 or cord 164, a utility pouch 158 or other structure. At least one second accessory is configured to be releasably engaged with the at least one first accessory interface connected to the first base component, wherein the at least one second accessory has a second structure different than the first structure, including for example another of a storage container, such as a bin or cup, a screen, a power cord, a utility pouch or other structure. At least one third accessory is configured to be releasably engaged with any of common accessory interfaces connected to the first and second base components, wherein the at least one third accessory has a third structure, including for example another of a storage container, such as a bin or cup, a screen, a power cord, a utility pouch or other structure, wherein the third structure is different than the first and second structures.

In another embodiment, at least one first accessory interface is fixedly connected to each of the first and second base components, wherein each of the at least one first accessory interfaces has a first shape, and at least one second accessory interface is fixedly connected to each of the first and second base components, wherein each of the at least one second accessory interfaces has a second shape, wherein the second shape is different than the first shape. At least one first accessory is configured to be releasably engaged with either of the at least one first accessory interfaces connected to the first and second base components, wherein the at least one first accessory has a first structure. At least one second accessory is configured to be releasably engaged with either of the at least one second accessory interfaces connected to the first and second base components, wherein the at least one second accessory has a second structure that is different than the first structure.

For example, in one embodiment, the first and second base components are two different tables 6, 8, having different worksurface heights. The first accessory interface may be configured as a post 124, while the first accessory may be configured as a storage container, such as a cup 150 or pouch 158 and the second accessory is configured as a power block 182 or the other of the cup or pouch. The second accessory interface may be configured as a rail 126, while the third accessory is configured as a storage container, such as a bin 172, or hanger 166. In other embodiments, the first and/or second accessory interfaces may be configured as one of the post, rail, clip or cord wrap, while the first, second and third accessories are configured as a storage container, such as a cup, pouch or bin, a power block, hanger or screen.

Posts 124 applied to different base components have the same shape, as do clips 142 applied to different base components, posts 93 applied to different base components, and rails 126 applied to different base components. Conversely, accessories with different structures (e.g., bags 220, pouches 158, power blocks 182, or cups 150) may be releasably engaged by accessory interfaces having the same shape (e.g., post 124). Likewise, accessories with different structures (e.g., screens 188, power blocks 182, bags 220, cups 150) may be releasably engaged by accessory interfaces having the same shape (e.g., clip 142), and accessories with different structures (e.g., screens 188, power blocks 182, bags 220, cups 150) may be releasably engaged by accessory interfaces having the same shape (e.g., post 93). As noted, the same shaped accessory interface components (e.g., rail or posts) may be applied to different base components, such as the table 6, pedestal table 18, tower 20, carts 12, 14, 16, etc. The system provides for easy and quick reconfiguration of the different components into a various workspace configurations. Finally, differently shaped accessory interfaces (e.g., post 124, post 93 and clip 142) may be releasably engaged by accessories having the same structure. For example, any one of a screen, cup, power block or bag may releasably engaged by differently shaped accessory interfaces.

Figure 11:
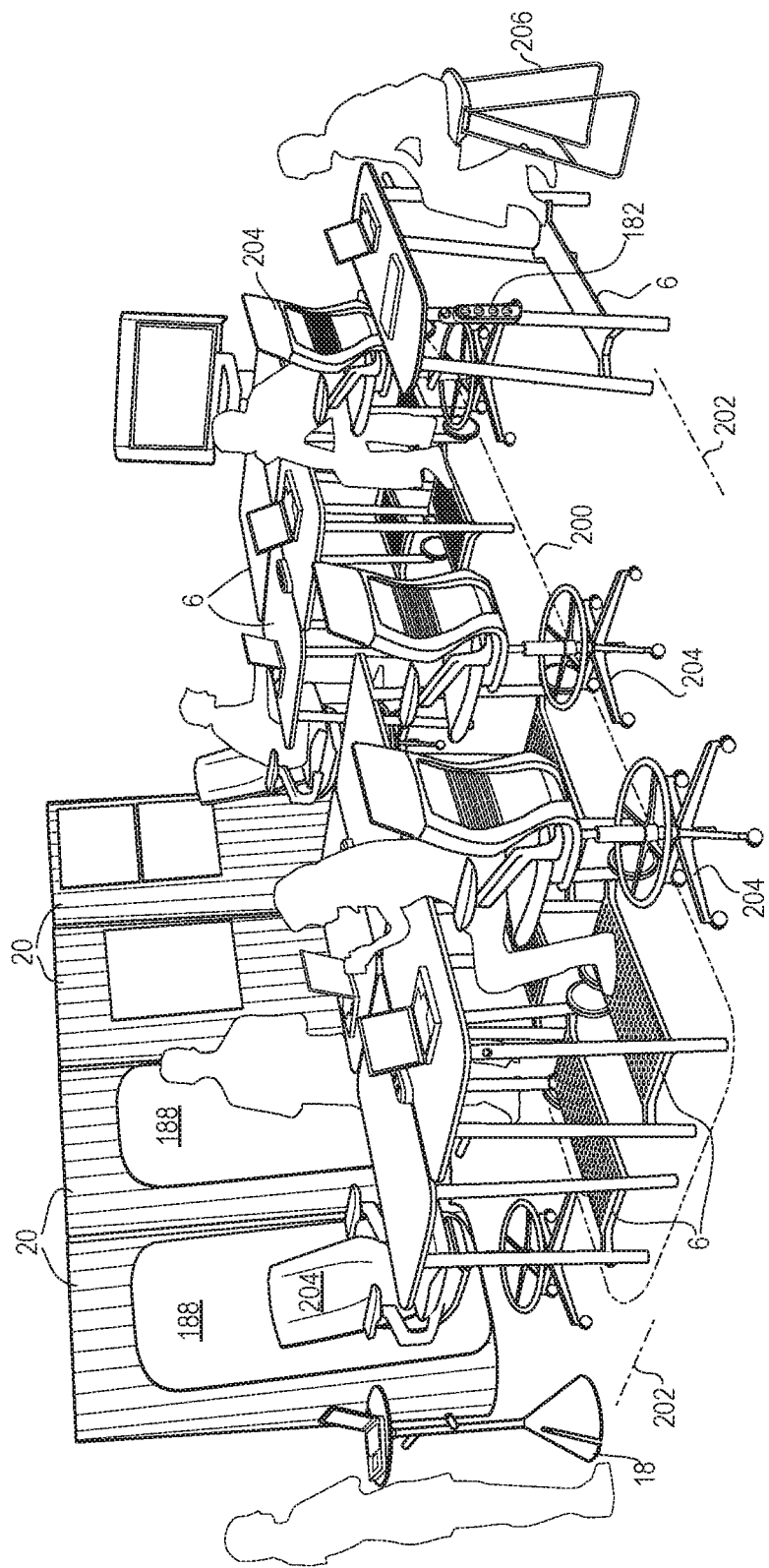
FIG. 11 is a perspective view of an eleventh workspace configuration.

In one embodiment, shown in FIGS. 1, 3, 5, 10 and 11, a workspace system includes a plurality of tables. At least two of the plurality of tables 6, 8, 10 are arranged end-to-end (FIGS. 10 and 11) or side-by-side (FIGS. 1, 3, 10 and 11) in a central location 200 of a workspace, for example with two formations of four tables arranged end-to-end and side-by-side as shown in FIGS. 10 and 11. The central location is defined as a closed area, for example the area defined by a projection of the perimeter of the grouping of tables, or a perimeter defined by the plurality of grouping of tables onto the floor, or the perimeter of a single base component. At least two perimeter base components are spaced apart from the central location to define a perimeter 202 of the workspace. The perimeter of the workspace is not necessarily a closed area, but rather may only be defined as a boundary (e.g., linear, curvilinear, curved, etc.) spaced apart from the central location 200, for example on one or more sides of the central location, with the an opposite side of the central location not be bounded by any component defining a perimeter. The perimeter is also not necessarily continuous, and base components defining the perimeter may be spaced apart, for example to allow ingress or egress to the workspace, but with the perimeter extending virtually between the base components.

It should be understood that the "central location" is not necessarily "centered" in an area bounded by a perimeter of the workspace, but rather may be located proximate one portion of the perimeter, but distal from another, and that the central area, perimeter and/or workspace are not necessarily symmetrical within a horizontal plane. In other embodiments, the central location defines the center of the workspace, with the perimeter base components arranged symmetrically around the central location, and may define a complete perimeter.

Figure 1:
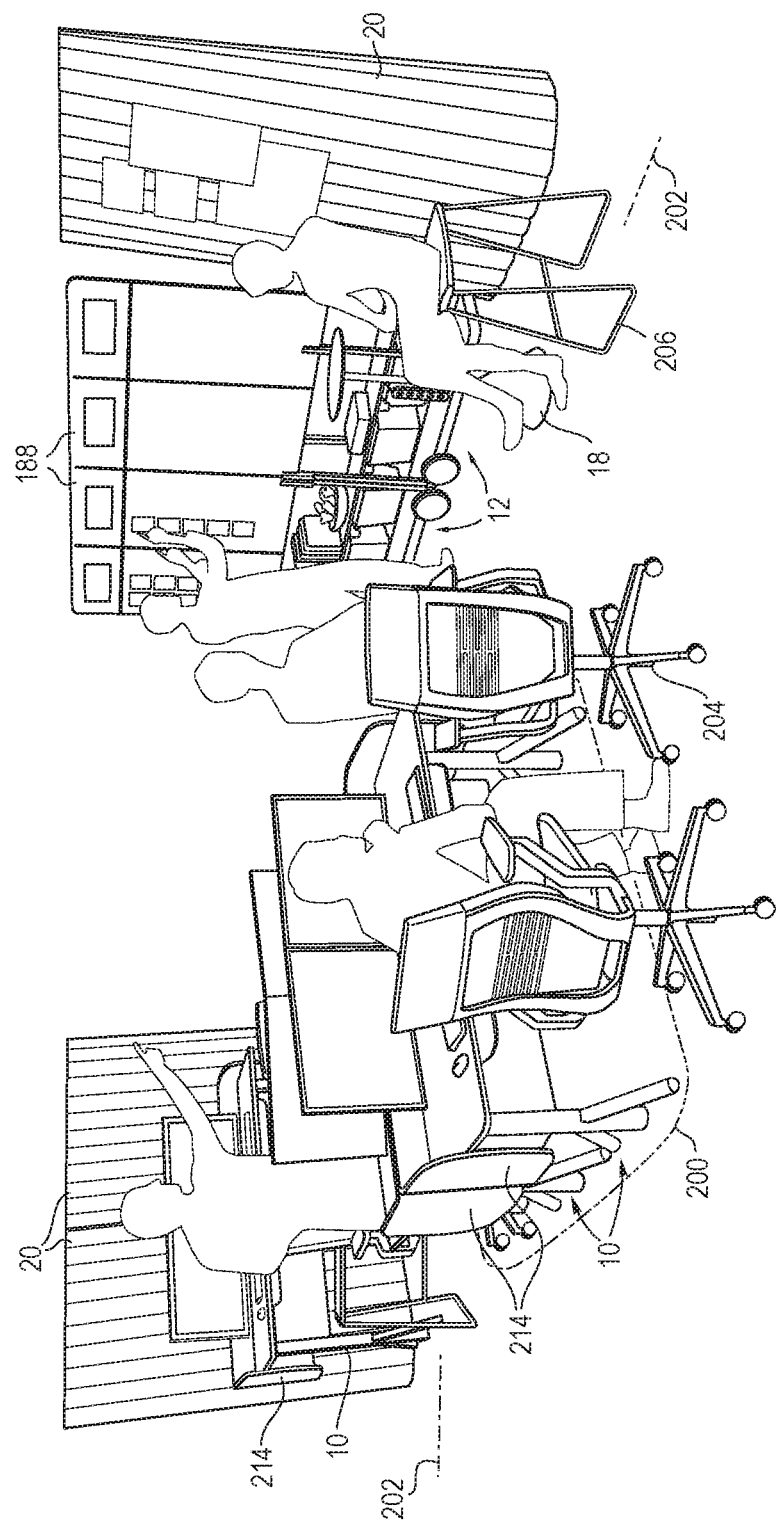
FIG. 1 is a perspective view of a first workspace configuration.

For example, as shown in FIG. 1 a pair of base components 10 is arranged side-by-side in a central location 200, with a pair of carts 12 and three towers 20 being spaced apart from the central location 200 and defining a perimeter of the workspace 202, for example along two sides of the central location 200. A pedestal table 18 and another table 10 are located within the workspace defined between the central location and perimeter. All of the tables 10 and carts 12 have wheels (and/or casters) 44, 102, 104 permitting relocation of the center or perimeter base components to another configuration. Chairs and stools 204, 206 may be arranged around or adjacent to the various base components depending on the desired functionality of the workspace. Various accessories are coupled to accessory interfaces fixed to the base components as disclosed above. For example, U-shaped screens 214 are arranged along the back side and ends of the table worksurfaces, with the screens providing both modesty and/or privacy to the user. Storage containers 172 are releasably engaged with rails 126 fixed to the tables and desks. A plurality of screens 188 are attached to the carts 12, for example releasably engaged by clips 142. A power block 182 is also disposed on a clip 142. This configuration may be well suited for a "stand-up" meeting (e.g., morning roll-call), which are timeboxed and intended to be short and to the point, for example 5 to 15 minutes.

Figure 2:
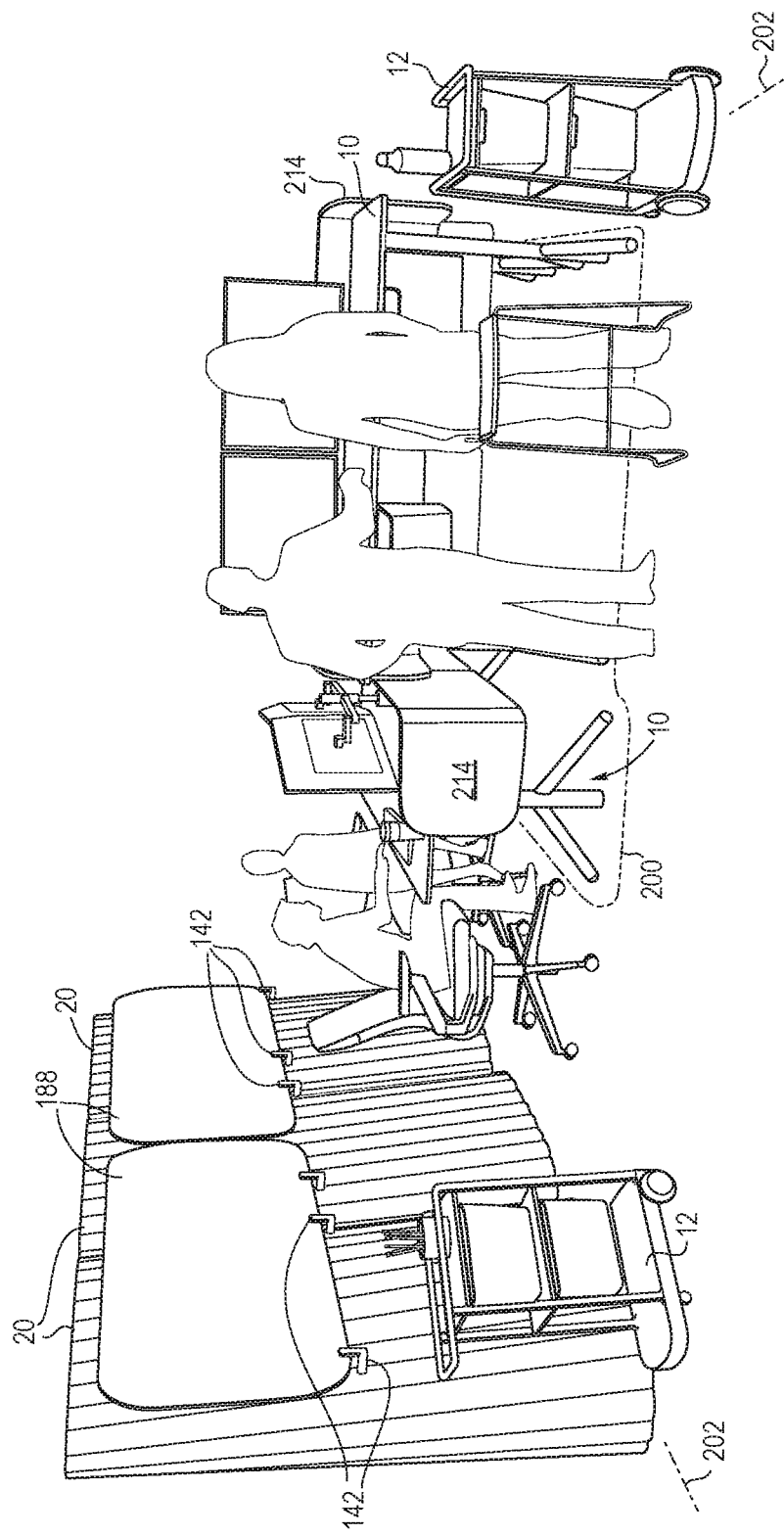
FIG. 2 is a perspective view of a second workspace configuration.

As shown in FIG. 2, a pair of tables 10 are arranged end-to-side in a T-shaped configuration to define a central location 200, with three towers 20 and a cart 12 spaced apart to define a perimeter 202 on opposite sides of the central location. Another cart 12 is disposed within the workspace. Screens 188 are releasably engaged by clips 142 secured to the towers 20. Storage containers are releasably engaged by rails fixed to the table and carts, with U-shaped screens also releasably engaged by the tables. This configuration is well suited for pairs of workers working at a common workstation, e.g., table, for example an agile software development technique where one worker writes code and the other reviews, with the roles reversing periodically.

Figure 3:
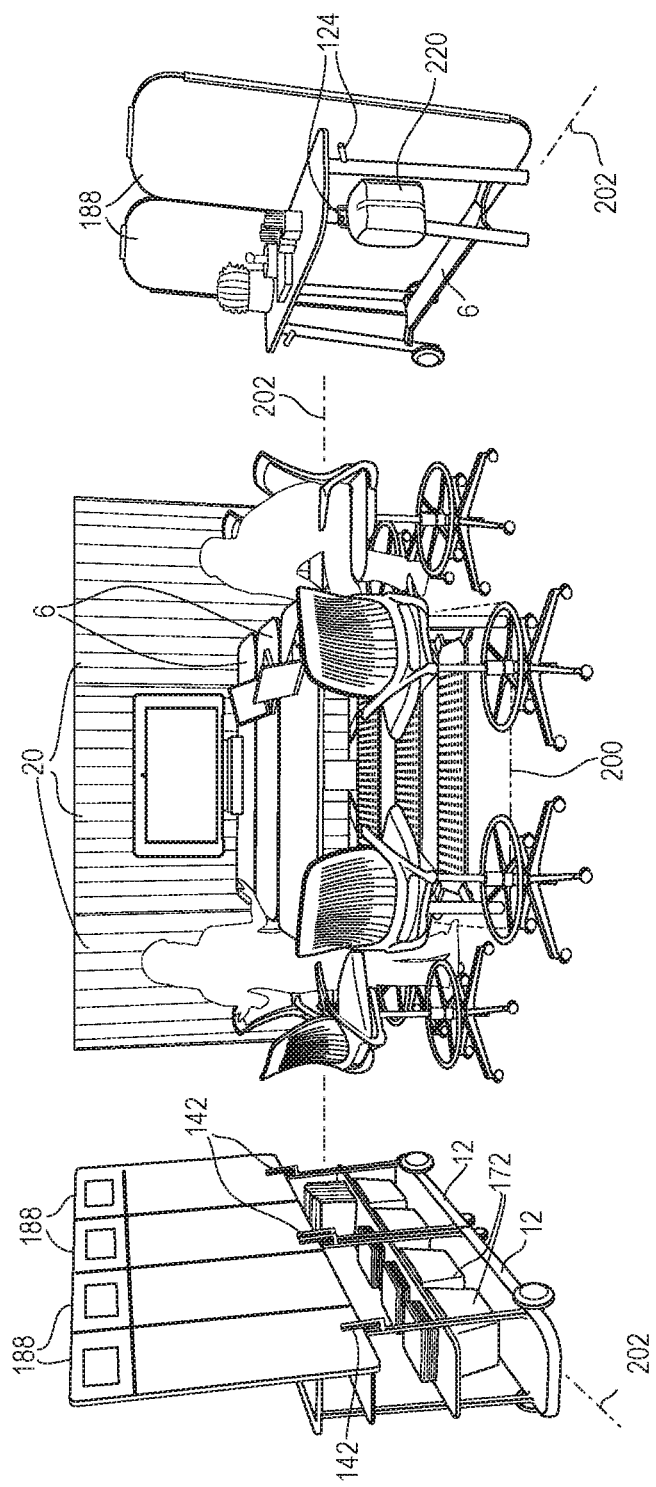
FIG. 3 is a perspective view of a third workspace configuration.

Referring to FIG. 3, three tables 6 are shown as arranged side-by-side to define a central location 200, with a plurality of towers 20, a table 6 and a pair of carts 12 being arranged to define a perimeter 202 of the workspace spaced apart on three sides of the central location 200. Screens 188 are supported by clips fixed to the carts, while additional screens 188 disposed against the perimeter table 6. A bag accessory 220 is secured to a post 124, while storage containers 172 are releasably engaged to rails on the carts. Chairs and/or stools 204, 206 may be arranged within the workspace. This configuration is well suited for planning, e.g., sprint planning, where a team meets to define and outline the scope of work to be completed during the sprint.

Figure 4:
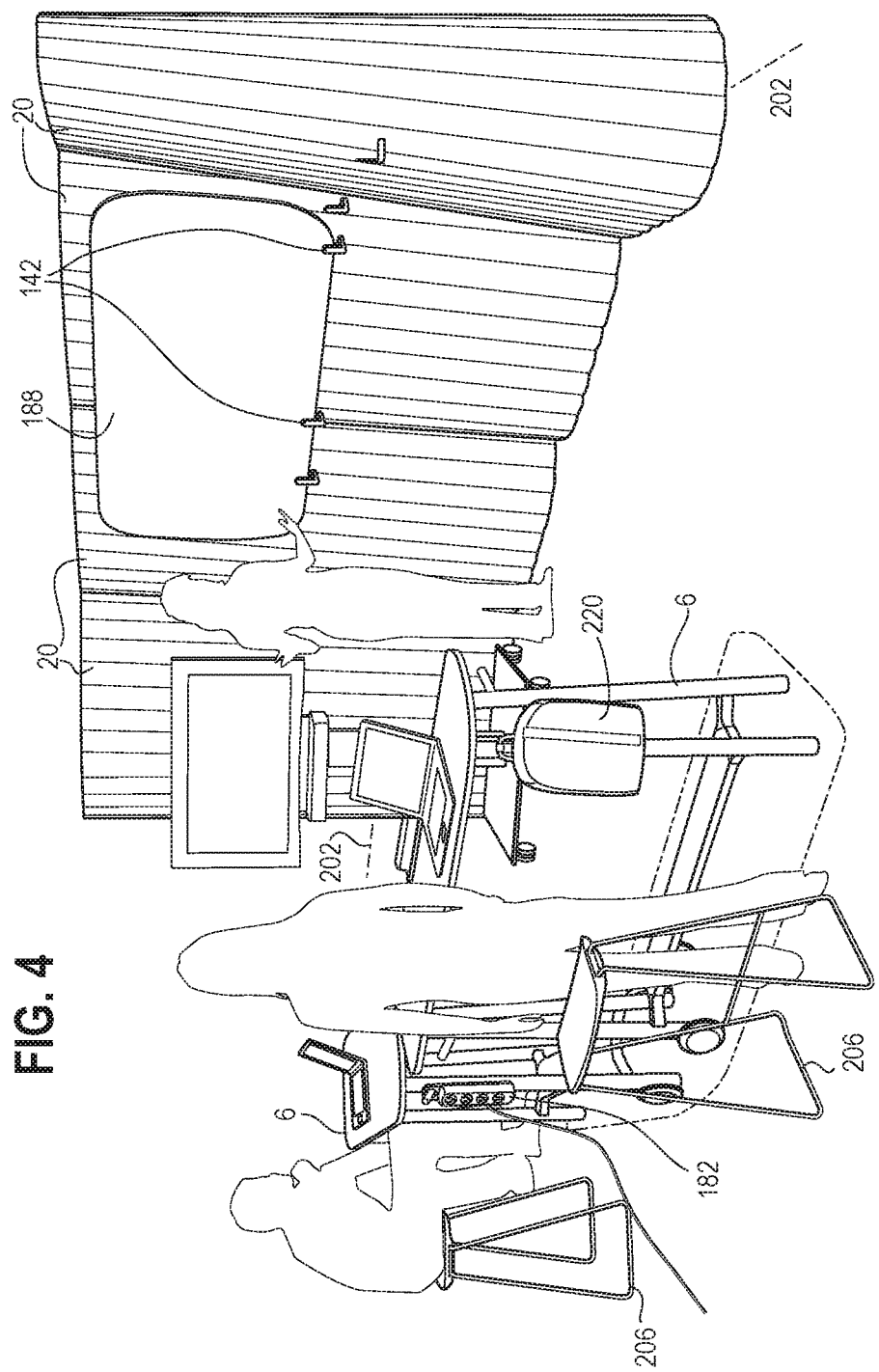
FIG. 4 is a perspective view of a fourth workspace configuration.

Referring to FIG. 4, a pair of tables are arranged end-to-end in a central location 200, with different accessories, power block 182, bag, etc. secured to a post accessory interface 124. A plurality of tower base components 20 define a perimeter 202, with a screen 188 supported by clip accessory interfaces 142 secured to one or more of the towers. Again, stools and/or chairs 206 may be arranged in the work space. This configuration is well-suited for a review session, for example at the end of a sprint, with the team reviewing the work that was or was not completed.

Figure 5:
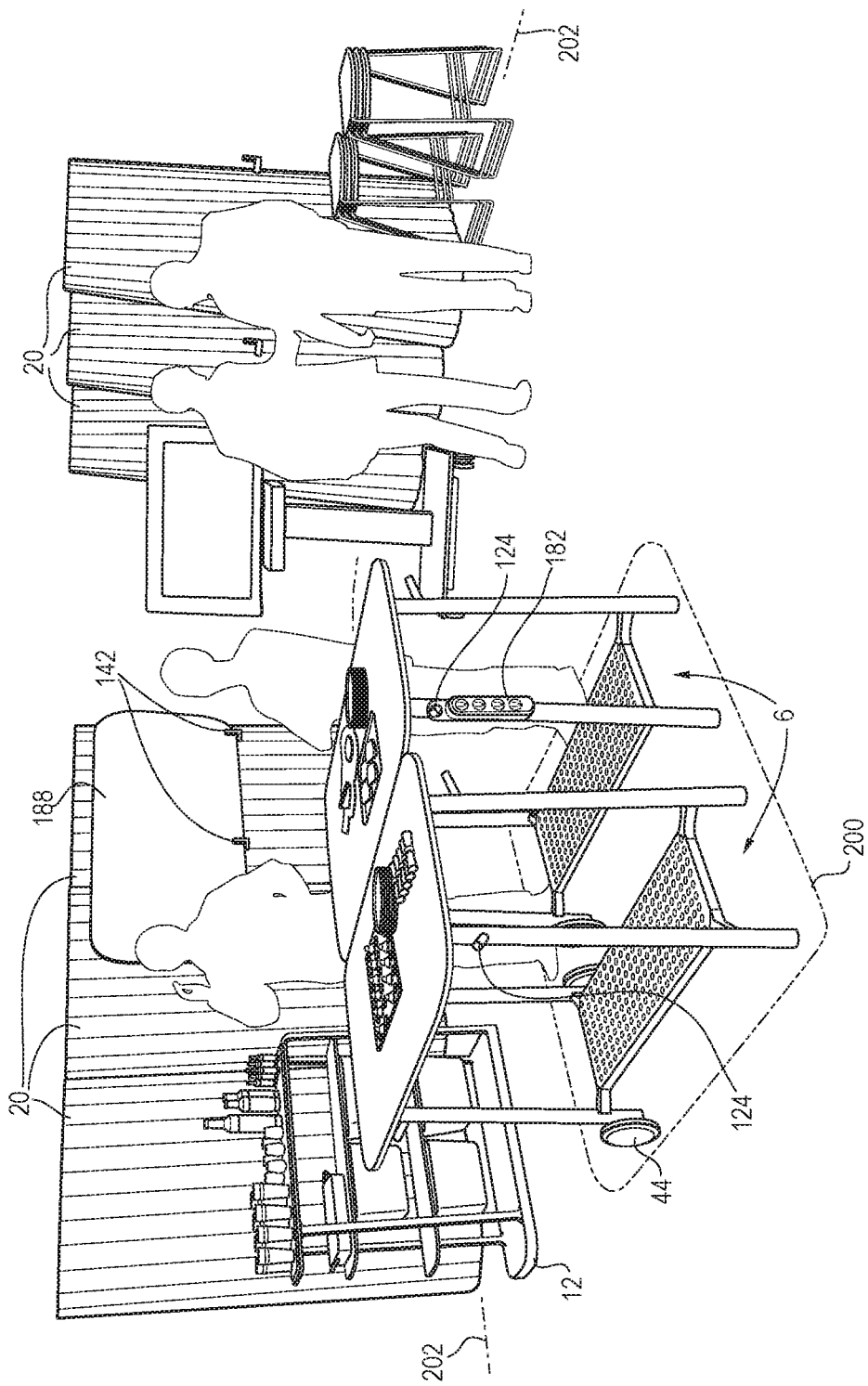
FIG. 5 is a perspective view of a fifth workspace configuration.

Referring to FIG. 5, a pair of tables 6 are arranged side-by-side in a central location 200, with towers 20 defining a perimeter 202 of the workspace. Accessories (e.g., power block, storage containers and screens) are releasably engaged by accessory interfaces (e.g., posts, rails and clips). A cart 12 is disposed in the workspace. This configuration is well suited for a social event, such as a team celebration, for example after completion of a sprint or product release.

Figure 6:
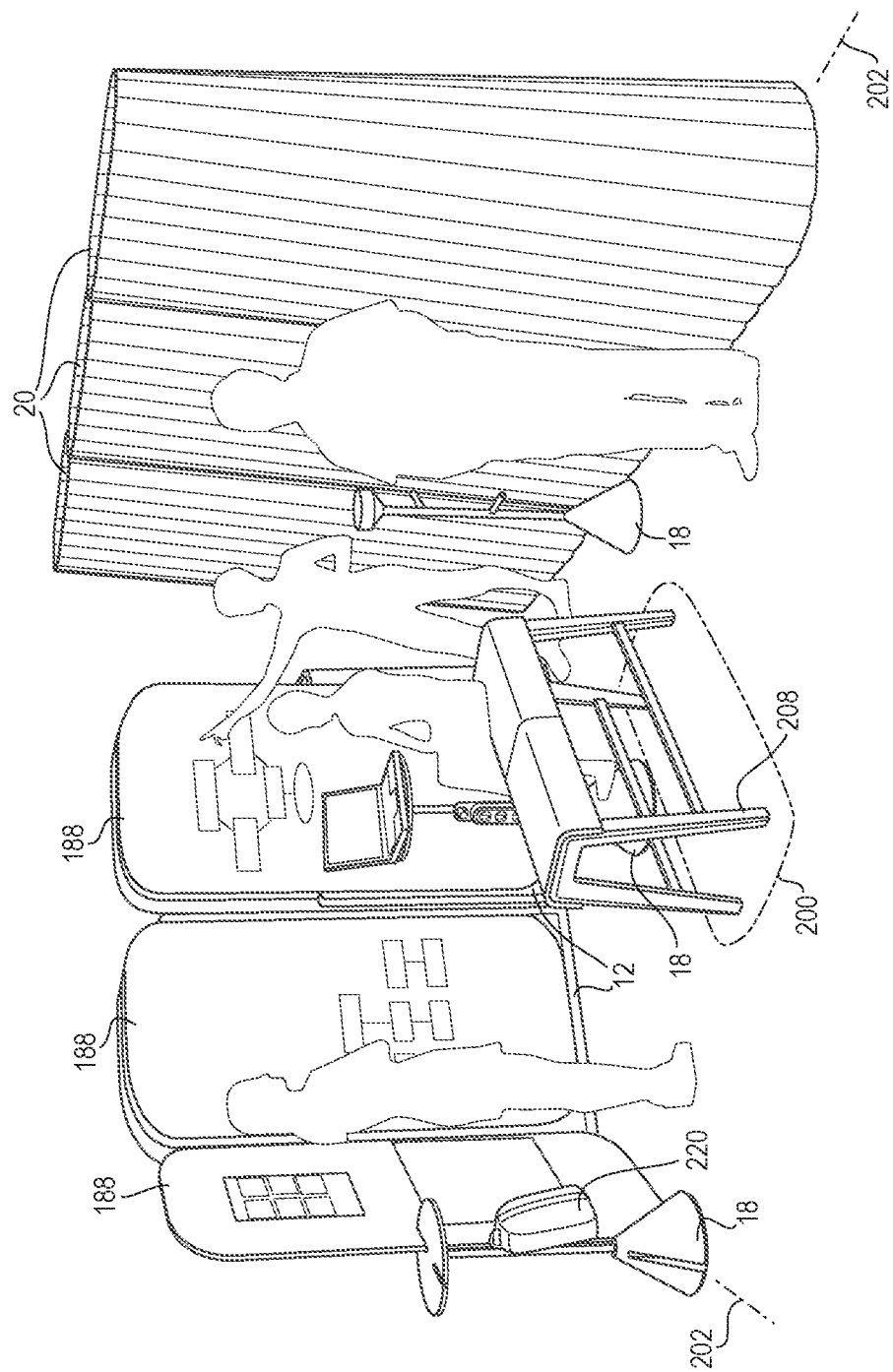
FIG. 6 is a perspective view of a sixth workspace configuration.

FIG. 6 shows a workspace with a center bench 208 defining a central location 200, and perimeter towers 200, a pedestal table 18, carts and screens 188 defining a perimeter

202. Other pedestal tables 18 are disposed in the workspace. Accessories, shown as bags 220 and power blocks 182, are releasably engaged by accessory interfaces, such as posts 124. This configuration is well suited for brainstorming, with multiple surfaces (writable and projected) for recording thoughts and ideas, with strategically located pedestal tables for holding laptops and other computing devices.

Figure 7:
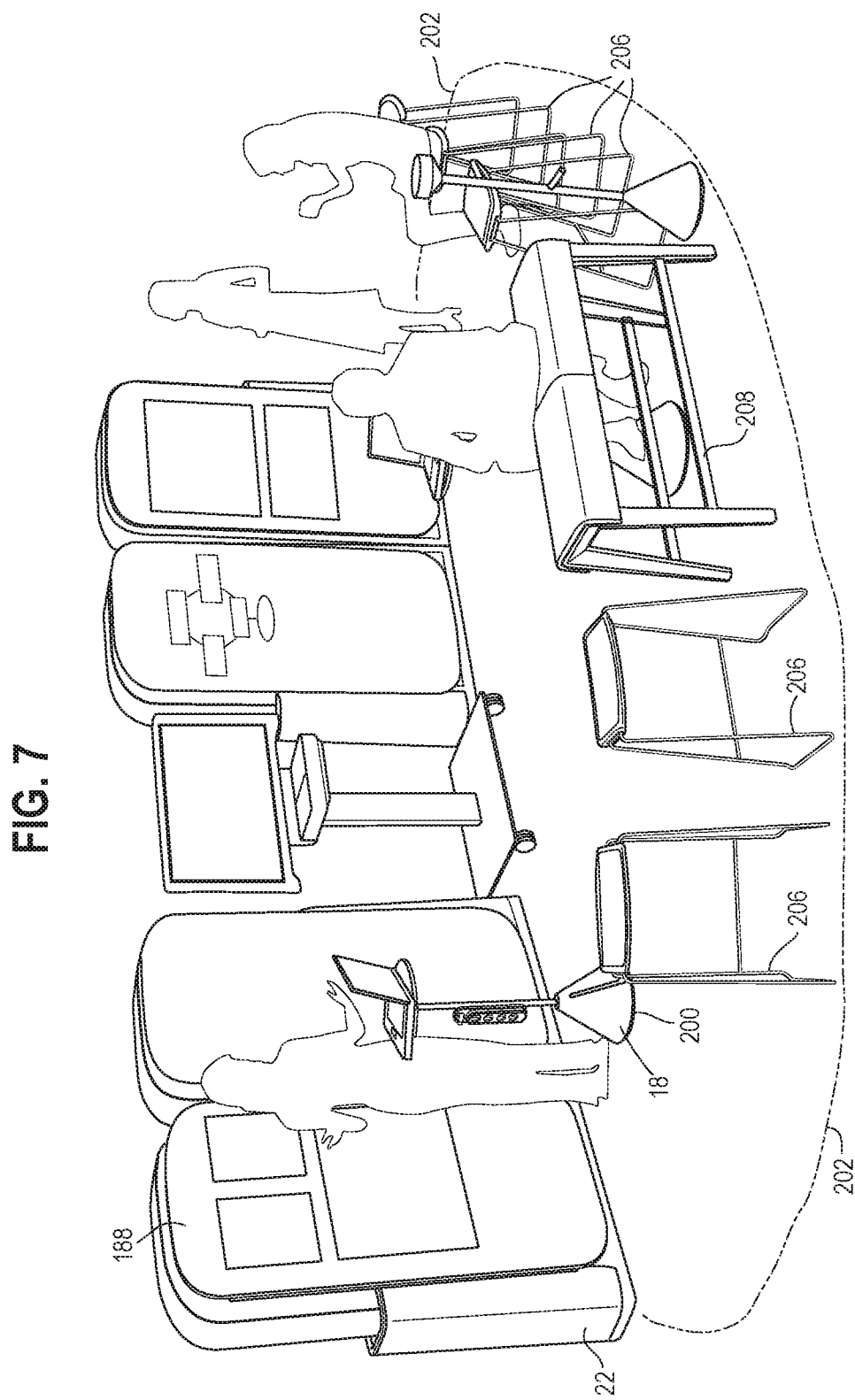
FIG. 7 is a perspective view of a seventh workspace configuration.

FIG. 7 shows a workspace configuration a pedestal table 18 defining a central location 200, and with seating components 206, 208 spaced apart from a plurality of carts supporting screens defining the perimeter 202. This configuration is well suited for a presentation, for example pitching and sharing, wherein key milestones may be presented to a selected audience.

FIGS. 8 and 9 show individual spaces, for example a table 6 at a central location and tower 20, a cart 12 and screens 188 defining a perimeter 202 of the workspace. FIG. 9 has a lounge chair 210 configured with a tablet worksurface 212 in a central location 200, with a cart 12 and screens 188 arranged to define a perimeter of the workspace. The adjacent screens of the two and three screen arrangements shown in FIGS. 8 and 9 may be connected to each other with the magnetic connection system 300 described herein.

FIGS. 10A and B show a plurality of tables 6 (shown as four) arranged end-to-end and side-by-side in central location 200. Carts 12, towers 20 and a pedestal table 18 are arranged around a perimeter 202 of the workspace. Screens 188 may be releasably engaged by the pedestal table and towers, with storage containers 150, 172, such as cups and bins releasably engaged by the carts and tables. This configuration is well suited for team members to work on individual tasks while collaborating and engaging in information exchanges and feedback. Being located close to peers while working alone allows the team to move faster and stay connected.

FIG. 11 discloses two groupings of tables 6 arranged end-to-end and side-by-side in a central location 200 defined by the two groupings. A table 6, pedestal table 18 and towers 20 defining a perimeter 202 of the workspace. As with other configurations, various seating alternatives 204, 206 are provided. As disclosed above, the base components may be configured with various accessory interfaces, allowing for releasable engagement with various accessories. This configuration is well suited for a workshop environment, with a team working to frame a problem and holding a workshop with the stakeholders.

As was previously explained, and should be readily understood, the various base components may be rearranged to define a workspace, which are not limited to the workspaces disclosed and discussed herein. Rather, the workspaces may include a single base component, or any combination of the various base components disclosed in FIG. 12. In systems including at least a pair of spaced apart base components, one of the base components may occupy the central location, with the other defining a perimeter location, for example when configured with a screen to define a natural boundary.

The user may easily reconfigure the workspace by moving the various base components to new locations. This is accomplished simply by lifting one end of the tables and rolling the tables on the wheels, by pushing the carts on the wheels/casters, and/or by pushing the height adjustable tables in the longitudinal direction such that the table rolls on the wheels. The towers may also be pushed, or rolled, to new locations. The pedestal tables, due to their light weight, may simply be picked up and set down at the new location.

The various base components, which are configured with fixed accessory interfaces, may be variously accessorized. For example, the individual users may hang various storage containers, including personal bags, on the posts, and/or relocate various bins to different rails. Screens may be arranged on the different base components, for example on the perimeter base components. If desired, a utility pouch may be arranged on a single table, or bridge between two tables, with power blocks being located at strategic and selected locations on any of the tables and/or carts. In this way, the various line-up of base components, accessory interfaces and accessories provides a highly versatile system that may be easily and quickly reconfigured to define a large number of different workspaces without the intervention of facility management, tools and/or skilled labor.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A workspace system comprising:
   a first base component having opposite ends and sides, wherein the first base component comprises a first frame, a first uppermost horizontal worksurface supported by the first frame, and a first pair of wheels connected to the first frame at one of the ends of the first base component and adapted to permit movement of the first base component relative to a support surface;
   a second base component having opposite ends and sides, wherein the second base component comprises a second frame, a second uppermost horizontal worksurface supported by the second frame, wherein the second uppermost horizontal worksurface is vertically spaced from the first uppermost horizontal worksurface, and a second pair of wheels connected to the second frame at one of the ends of the second base component and adapted to permit movement of the second base component relative to the support surface;
   at least one first accessory interface fixedly connected to the first base component, wherein each of the at least one first accessory interfaces has a first shape;
   at least one second accessory interface fixedly connected to each of the first and second base components, wherein each of the at least one second accessory interfaces has a second shape, wherein the second shape is different than the first shape;
   at least one first accessory configured to be releasably engaged with the at least one first accessory interface connected to the first base component, wherein the at least one first accessory has a first structure;
   at least one second accessory configured to be releasably engaged with the at least one first accessory interface connected to the first base component, wherein the at least one second accessory has a second structure different than the first structure; and
   at least one third accessory configured to be releasably engaged with any of the at least one second accessory interfaces connected to the first and second base components, wherein the at least one third accessory has a third structure, wherein the third structure is different than the first and second structures.

2. The workspace system of claim 1 wherein the first base component comprises a first table.

3. The workspace system of claim 2 wherein the second base component comprises a second table.

4. The workspace system of claim 2 wherein the second base component comprises a cart, wherein the second frame extends vertically above the second uppermost horizontal worksurface.

5. The workspace system of claim 1 further comprising:
a third base component having opposite ends and sides, wherein the third base component comprises a third frame, a third uppermost horizontal worksurface supported by the third frame, wherein the third uppermost horizontal worksurface is vertically spaced from the first and second uppermost horizontal worksurfaces, and a third pair of wheels connected to the third frame at one of the ends of the third base component;
wherein at least one of each of the first and second accessory interfaces are fixedly connected to third base components; and
wherein the at least one first and second accessories are configured to be releasably engaged with at least one first accessory interface connected to the third base component, and wherein the at least one third accessory is configured to be releasably engaged with the at least one second accessory interface connected to the third base component.

6. The workspace system of claim 1 wherein the at least one first accessory interface comprises one of a post or a clip.

7. The workspace system of claim 6 wherein each of the at least one first and second accessories comprises a screen, a bin, a cup, a power cord or a utility pouch, and wherein the at least one third accessory comprises a bin.

8. The workspace system of claim 7 wherein the at least one first accessory interface comprises a post extending upwardly and forming an acute angle with a vertical component of the first frame, and wherein each of the at least one first and second accessories comprises a power cord, a cup or a utility pouch.

9. The workspace system of claim 7 wherein the at least one first accessory interface comprises a clip coupled to the first frame, and wherein each of the at least one first and second accessories comprises a cup or a screen.

10. The workspace system of claim 1 wherein the first frame comprises a pair of leg portions each defining a longitudinal axis forming an acute angle relative to the support surface, and wherein the pair of wheels are mounted on ends of the leg portions and are rotatable about the longitudinal axes.

11. The workspace system of claim 10 wherein the first frame is height adjustable, wherein a vertical position of the first uppermost horizontal worksurface is adjustable.

12. The workspace system of claim 1 comprising a plurality of first base components, wherein at least two of the plurality of base components are arranged end-to-end.

13. The workspace system of claim 1 comprising a plurality of first base components, wherein at least two of the plurality of base components are arranged side-by-side.

14. The workspace system of claim 1 comprising a plurality of first base components arranged side-by-side and/or end-to-end in a center region of a workspace, and a plurality of second base components arranged around a perimeter of the workspace, and wherein the at least one second accessory comprises a screen releasably coupled to a least one of the plurality of second base components.

15. The workspace system of claim 1 further comprising a third base component comprising a tower having a width and a depth, wherein the depth is at least 30% of the width along a height of the tower, wherein the width of the tower is between 70 and 120% of the width of the first base component measured between the sides thereof, and wherein at least one of the width and depth of the tower tapers inwardly from a bottom to a top of the tower.

16. The workspace system of claim 1 further comprising a third base component comprising a lower base and an upper worksurface, wherein the base and worksurface comprise at least one set of vertically aligned slots, and further comprising a screen having an edge disposed in the slots wherein the third base component holds the screen upright.

17. The workspace system of claim 16 wherein the base and worksurface comprise first and second sets of vertically aligned slots oriented 180 degrees relative to each other, and further comprising first and second screens having edges disposed in the first and second sets of slots, wherein the first and second screens are held upright by the third base component in a planar relationship.

18. A workspace system comprising:
a first base component having opposite ends and sides, wherein the first base component comprises a first frame, a first uppermost horizontal worksurface supported by the first frame, and a first pair of wheels connected to the first frame at one of the ends of the first base component and adapted to permit movement of the first base component relative to a support surface;
a second base component having opposite ends and sides, wherein the second base component comprises a second frame, a second uppermost horizontal worksurface supported by the second frame, wherein the second uppermost horizontal worksurface is vertically spaced from the first uppermost horizontal worksurface, and a second pair of wheels connected to the second frame at one of the ends of the second base component and adapted to permit movement of the second base component relative to the support surface;
at least one first accessory interface fixedly connected to each of the first and second base components, wherein each of the at least one first accessory interfaces has a first shape;
at least one second accessory interface fixedly connected to each of the first and second base components, wherein each of the at least one second accessory interfaces has a second shape, wherein the second shape is different than the first shape;
at least one first accessory configured to be releasably engaged with either of the at least one first accessory interfaces connected to the first and second base components wherein the at least one first accessory has a first structure; and
at least one second accessory configured to be releasably engaged with either of the at least one second accessory interfaces connected to the first and second base components, wherein the at least one second accessory has a second structure, wherein the second structure is different than the first structure.

19. The workspace system of claim 18 wherein the first base component comprises a first table.

20. The workspace system of claim 19 wherein the second base component comprises a second table.

21. A workspace system comprising:
a plurality of tables each having opposite ends and sides, wherein the tables each comprise a first frame, a first uppermost horizontal worksurface supported by the first frame, and a first pair of wheels connected to the first frame at one of the ends of the table and adapted to permit movement of the table relative to a support surface, and a support leg connected to each of the first frames at the other of the ends of the tables, wherein at least two of the plurality of tables are arranged end-to-end or side-by-side in a central location of a workspace;

a plurality of perimeter base components having opposite ends and sides, wherein the perimeter base components each comprise a second frame, a shelf or worksurface supported by the second frame, and a second pair of wheels connected to the second frame at one of the ends of the perimeter base components and adapted to permit movement of the perimeter base component relative to the support surface, wherein at least two of the perimeter base components are spaced apart from the central location to define a perimeter of the workspace;

a storage container configured to be releasably connected to any of the perimeter base components or tables;

a screen releasably connected to at least one of the perimeter base components; and a post extending at an angle relative to each of the first frames.

22. The workspace system of claim 21 wherein the storage container comprises a first storage container, and further comprising a second storage container engaged by the post.

23. A workspace system comprising:

a plurality of tables each having opposite ends and sides, wherein the tables each comprise a first frame, a first uppermost horizontal worksurface supported by the first frame, and a first pair of wheels connected to the first frame at one of the ends of the table and adapted to permit movement of the table relative to a support surface, and a support leg connected to each of the first frames at the other of the ends of the tables, wherein at least two of the plurality of tables are arranged end-to-end or side-by-side in a central location of a workspace;

a plurality of perimeter base components having opposite ends and sides, wherein the perimeter base components each comprise a second frame, a shelf or worksurface supported by the second frame, and a second pair of wheels connected to the second frame at one of the ends of the perimeter base components and adapted to permit movement of the perimeter base component relative to the support surface, wherein at least two of the perimeter base components are spaced apart from the central location to define a perimeter of the workspace;

a storage container configured to be releasably connected to any of the perimeter base components or tables;

a screen releasably connected to at least one of the perimeter base components; and a rotatable clip connected to the each of the second frames, wherein the clip is rotatable about a horizontal axis.

24. The workspace system of claim 23 wherein the screen is engaged by the rotatable clip.

\* \* \* \* \*